(12) United States Patent
Gressel et al.

(10) Patent No.: US 8,107,622 B2
(45) Date of Patent: Jan. 31, 2012

(54) SYSTEM AND METHOD TO PRECLUDE MESSAGE MODIFICATION IN DATA AUTHENTICATION SYSTEMS THROUGH EFFICENT USE OF FEEDBACK IN CRYPTOGRAPHIC FUNCTIONS

(75) Inventors: Carmi David Gressel, Mobile Post Negev (IL); Gregory Van Bard, Hartsdale, NY (US); Orr David Dunkelman, Ramat Gan (IL); Avi Hecht, Nesher (IL); Ran Granot, Yavne (IL)

(73) Assignee: Fortress GB Ltd., London Greater London (GB)

( * ) Notice: Subject to any disclaimer, the term of this patent is extended or adjusted under 35 U.S.C. 154(b) by 261 days.

(21) Appl. No.: 12/439,556

(22) PCT Filed: Sep. 6, 2007

(86) PCT No.: PCT/IL2007/001101
§ 371 (c)(1),
(2), (4) Date: Jun. 3, 2009

(87) PCT Pub. No.: WO2008/029406
PCT Pub. Date: Mar. 13, 2008

(65) Prior Publication Data
US 2009/0304179 A1 Dec. 10, 2009

Related U.S. Application Data

(60) Provisional application No. 60/842,612, filed on Sep. 7, 2006, provisional application No. 60/928,616, filed on May 11, 2007.

(51) Int. Cl.
*H04L 9/28* (2006.01)
*H04L 9/32* (2006.01)
*G06F 17/10* (2006.01)

(52) U.S. Cl. .......................... 380/28; 713/181; 707/698
(58) Field of Classification Search .................... 380/28; 713/181; 707/698
See application file for complete search history.

(56) References Cited

U.S. PATENT DOCUMENTS

| 4,431,865 | A | * | 2/1984 | Bernede et al. ................ 380/44 |
| 6,556,158 | B2 | * | 4/2003 | Steensgaard-Madsen .... 341/131 |
| 2002/0114452 | A1 | * | 8/2002 | Hamilton ........................ 380/42 |
| 2003/0223580 | A1 | * | 12/2003 | Snell .............................. 380/28 |

* cited by examiner

OTHER PUBLICATIONS

International Preliminary Report on Patentability for PCT/IL2007/001101; mailed Apr. 7, 2009—7 pages.

*Primary Examiner* — Aravind Moorthy
(74) *Attorney, Agent, or Firm* — Roach Brown McCarthy & Gruber P.C.; Kevin D. McCarthy

(57) ABSTRACT

A data hashing system operative to hash an incoming string of message words is an object of the present invention. The system generates a hash value tag comprising a deterministic random number string which uniquely identifies the incoming string. The system comprises at least first and second register arrays, at least one 1-way functionality in at least pseudo-randomizing function; and a set of at least first and second orthogonal feedback word stream generators operative to generate a set of at least first and second orthogonal feedback streams of message words respectively, including applying respective permutations to the incoming string. Wherein the first and second feedback streams are combined into the first and second register arrays respectively, the at least pseudo-randomizing functionality accepts input from the register arrays and generates at least pseudo-random output which, in combination with a present word in the incoming string, is provided to the stream generators, and the first feedback stream is a first function of a present word in the incoming stream and the second feedback stream is a second function of a present and previous words, in the incoming stream.

24 Claims, 20 Drawing Sheets

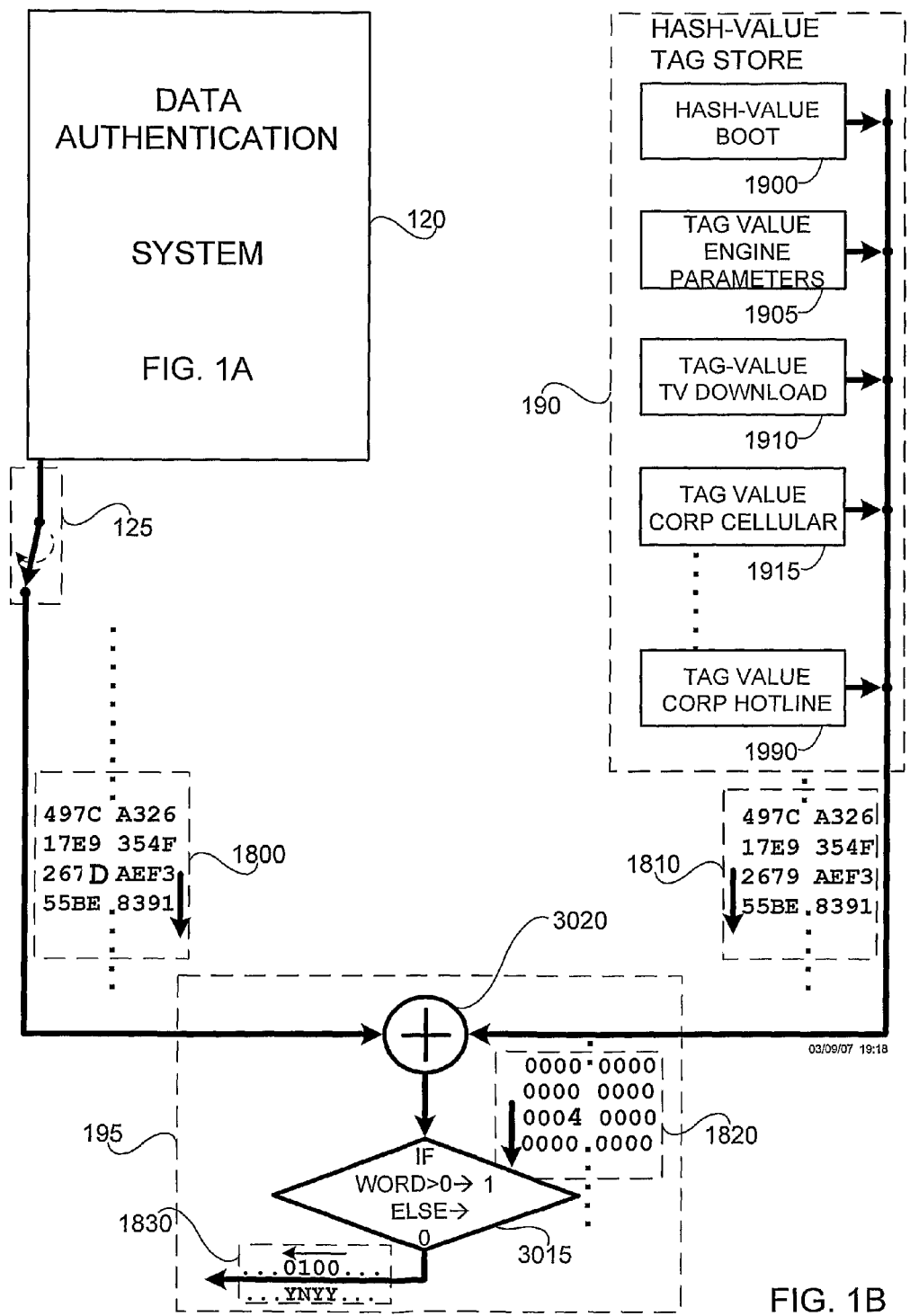

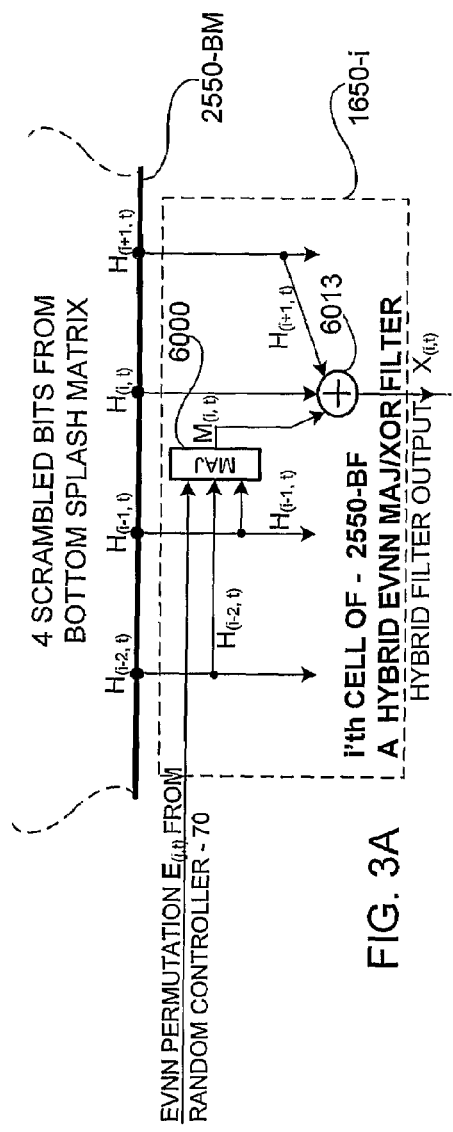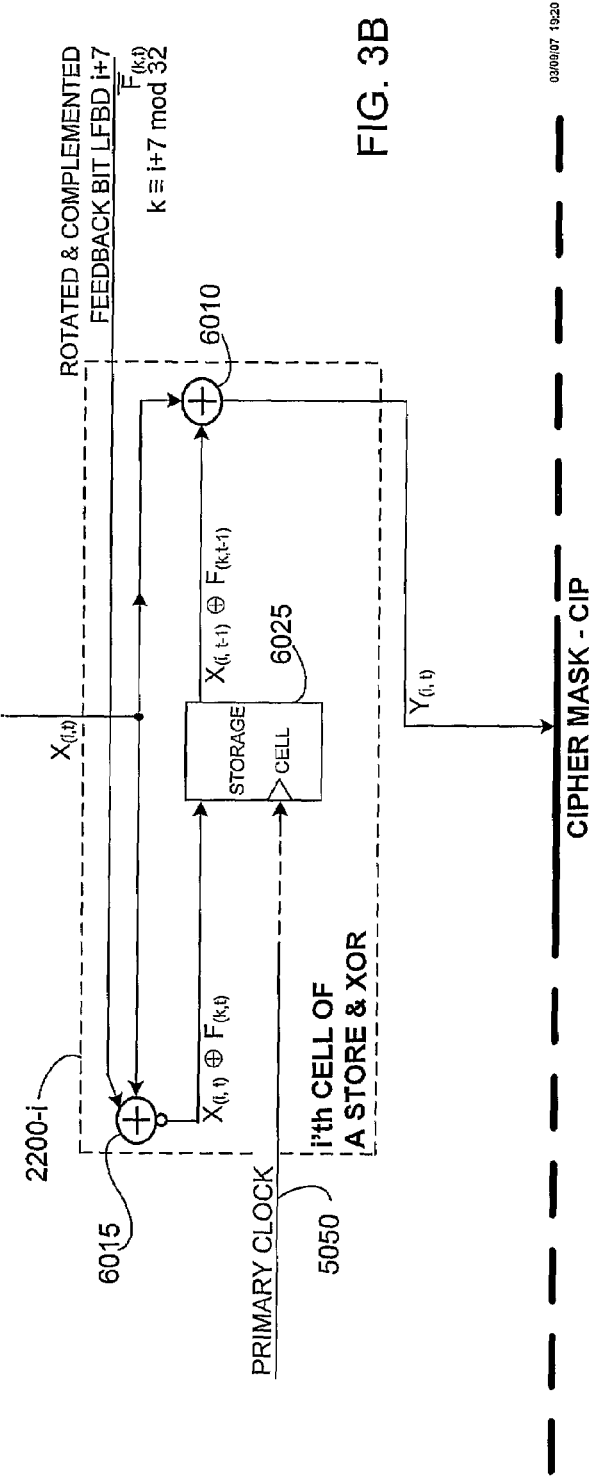
FIG. 3A
FIG. 3B

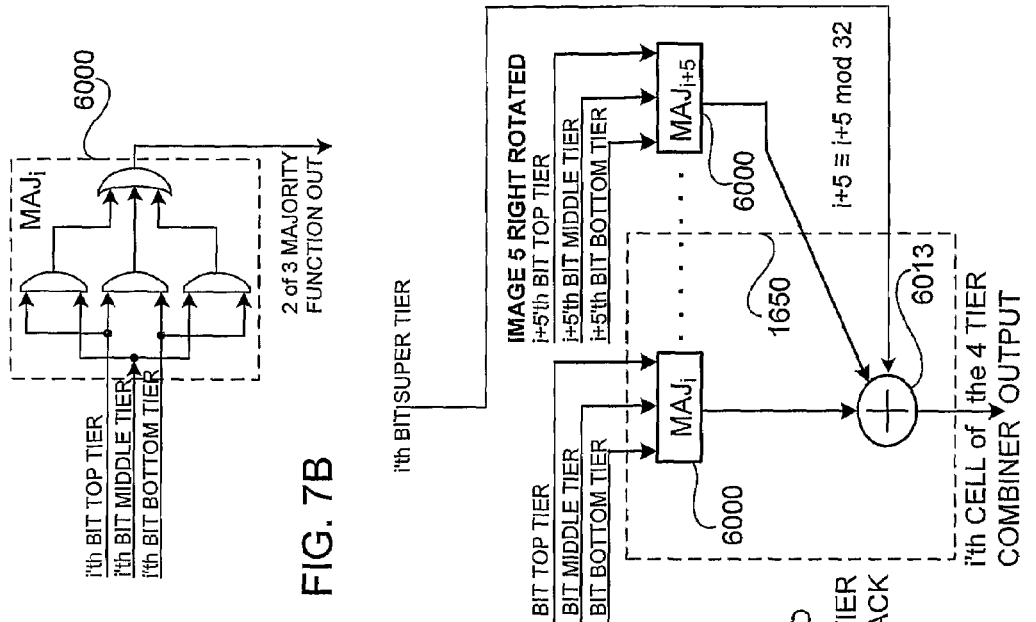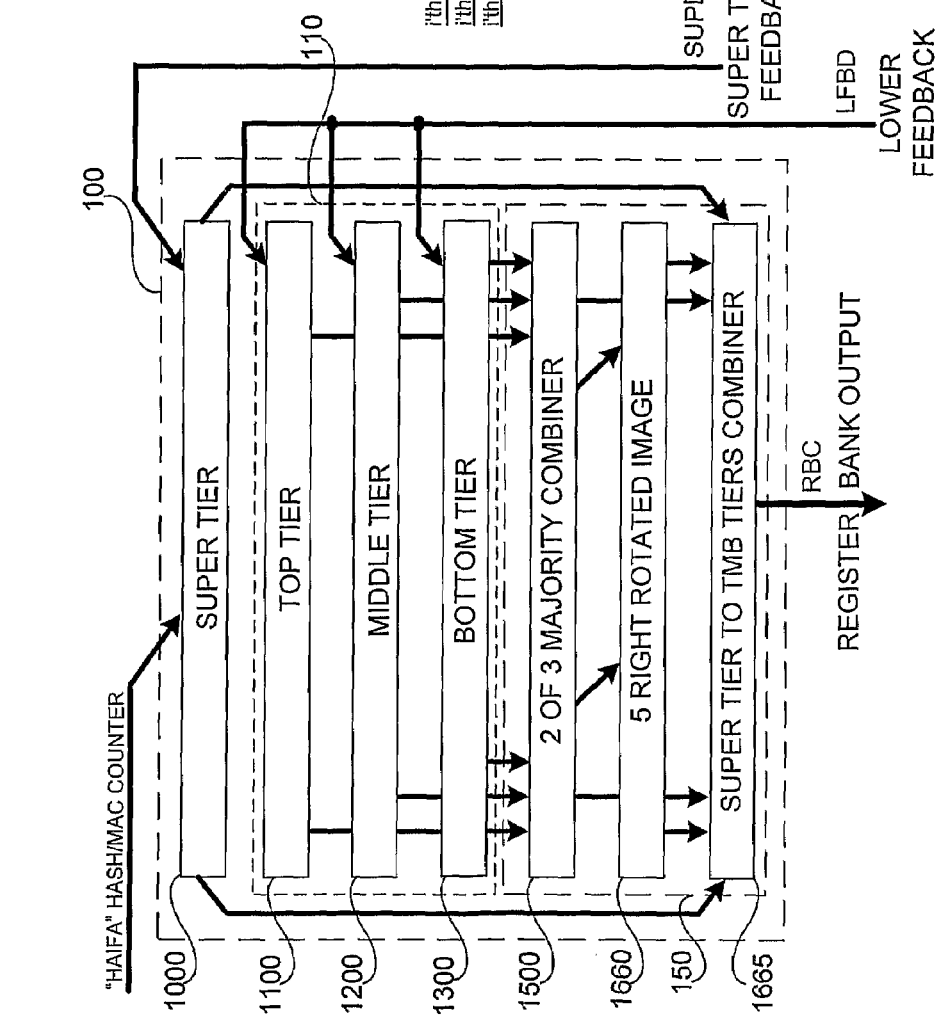
FIG. 7B
FIG. 7C
FIG. 7A

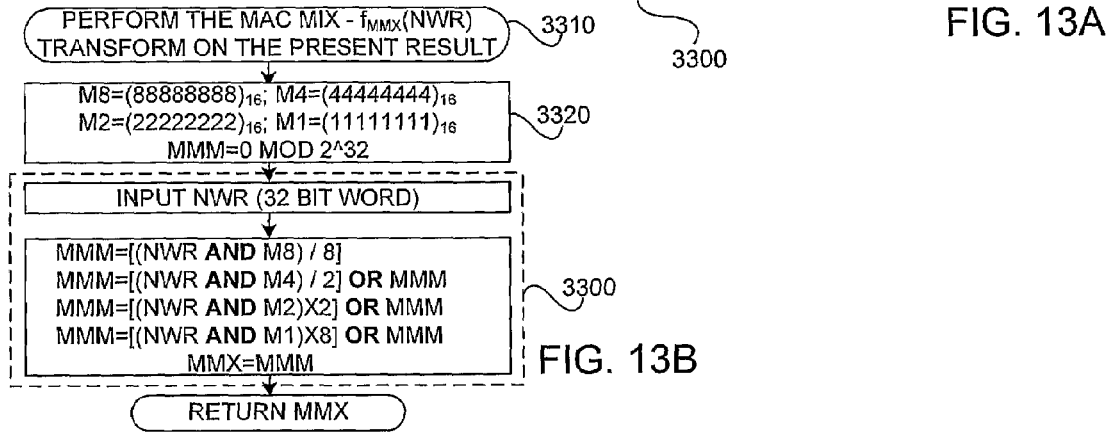
FIG. 13A
FIG. 13B
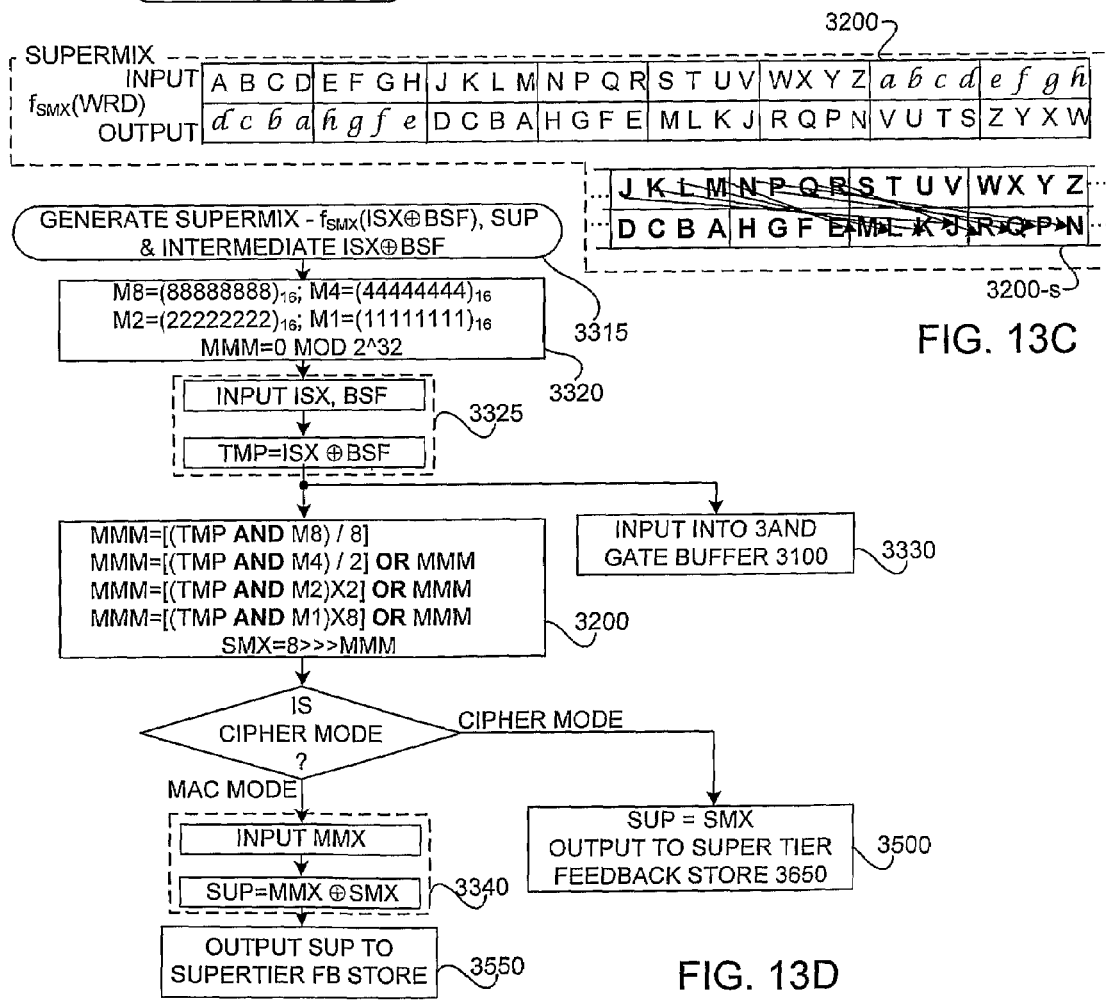
FIG. 13C
FIG. 13D

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 850 | CONTRIVED FALSE MESSAGE – 4 FAULT BITS – F⊕ SAME FAULT BITS IN REG BANK |||||||||||||||||||||||||||||||
| 8000 | A | B | C | D | E' | F | G | H | J | K' | L | M | N | P | Q | R | S | T | U | V' | W | X | Y | Z | a | b | c' | d | e | f | g | h |
| | CORRUPTED PREVIOUS RESULT – SAME FAULT BITS |||||||||||||||||||||||||||||||
| 8010 | A | B | C | D | E' | F | G | H | J | K' | L | M | N | P | Q | R | S | T | U | V' | W | X | Y | Z | a | b | c' | d | e | f | g | h |
| | CORRUPTED BITS IN RECONCILING MESSAGE – TO BE FAULT BITS IN RESULT STORE |||||||||||||||||||||||||||||||
| 8020 | φ | 0 | 0 | 0 | Π'E'| 0 | 0 | 0 | 0 | Π'K'| 0 | 0 | 0 | 0 | 0 | 0 | 0 | 0 | 0 | Π'V'| 0 | 0 | 0 | 0 | 0 | 0 | Π'c'| 0 | 0 | 0 | 0 | 0 |
| | FB WORD FAULT BITS = F⊕ SUM OF MESSAGE FAULT & PREVIOUS RESULT FAULT |||||||||||||||||||||||||||||||
| 8030 | φ | A | B | C | D E'| F | G | H J K'| L | M | N P Q | R | S | T U | V' W X Y | Z | a | b | c' | d | e | f | g ||||||||||||
| | 4 FAULT BITS F⊕ RECONCILE SHIFTED FAULT BITS IN TMB nLFSRs |||||||||||||||||||||||||||||||
| 8040 | φ | A | B | C | D | E' | F | G | H | J | K' | L | M | N | P | Q | R | S | T | U | V' | W | X | Y | Z | a | b | c' | d | e | f | g |
| | 4 FAULTY BITS, E', K', V' & c' IN THE TMB REGISTERS ARE RECONCILED |||||||||||||||||||||||||||||||
| 8050 | φ | 0 | 0 | 0 | 0 | E | 0 | 0 | 0 | 0 | K | 0 | 0 | 0 | 0 | 0 | 0 | 0 | 0 | V | 0 | 0 | 0 | 0 | 0 | 0 | c | 0 | 0 | 0 | 0 | 0 |
| | NO TRACE IN THE TMB nLFSRs WHEN 4 AUSPICIOUS MESSAGE BITS WERE MODIFIED |||||||||||||||||||||||||||||||

FIG. 14A

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 850 | CONTRIVED FALSE MESSAGE – 4 FAULT BITS – F⊕ SAME FAULT BITS IN REG BANK |||||||||||||||||||||||||||||||
| 8000 | A | B | C | D | E' | F | G | H | J | K' | L | M | N | P | Q | R | S | T | U | V' | W | X | Y | Z | a | b | c' | d | e | f | g | h |
| | FAULT BITS VIA PRESENT RESULT TRANSFORMED BY MAC MIX INTO SUPER TIER |||||||||||||||||||||||||||||||
| 8060 | D | C | B | A | H | G | F | E' | M | L | K' | J | R | Q | P | N | V' | U | T | S | Z | Y | X | W | d | c' | b | a | h | g | f | e |
| | RECONCILING MESSAGE BITS – TO BE MAC MIXED THEN NEXT FB TO SUPER TIER |||||||||||||||||||||||||||||||
| 8020 | φ | 0 | 0 | 0 | Π'E'| 0 | 0 | 0 | 0 | Π'K'| 0 | 0 | 0 | 0 | 0 | 0 | 0 | 0 | 0 | Π'V'| 0 | 0 | 0 | 0 | 0 | 0 | Π'c'| 0 | 0 | 0 | 0 | 0 |
| | SUPER TIER "ALLEGED RECONCILING" FB IS MAC MIXED RECONCILING MESSAGE |||||||||||||||||||||||||||||||
| 8070 | 0 | 0 | 0 | φ | 0 | 0 | E'Π'| 0 | K'Π'| 0 | 0 | 0 | 0 | 0 | Π'0| 0 | 0 | 0 | 0 | V' | c'Π'| 0 | 0 | 0 | 0 | 0 | 0 | 0 ||||||
| | SHIFTED SUPER TIER – BEFORE RECEIVING "ALLEGED RECONCILING" FEEDBACK |||||||||||||||||||||||||||||||
| 8080 | φ | D | C | B | A | H | G | F | E' | M | L | K' | J | R | Q | P | N | V' | U | T | S | Z | Y | X | W | d | c' | b | a | h | g | f |
| | 12 CORRUPTED BITS IN THE SUPER TIER – CAUSED BY 4 RECONCILED TMB BITS |||||||||||||||||||||||||||||||
| 8090 | φ | 0 | 0 | 0 | 0 | 0 | E' | P'E'| K'P'| K' | 0 | 0 | 0 | 0 | P' | V' | 0 | 0 | 0 | 0 | 0 | V' | c'P'| c' | 0 | 0 | 0 | 0 | 0 ||||
| | THE ORTHOGONAL SUPER TIER FEEDBACK DIFFUSED 4→12 FALSE BITS |||||||||||||||||||||||||||||||

FIG. 14B

SYSTEM AND METHOD TO PRECLUDE MESSAGE MODIFICATION IN DATA AUTHENTICATION SYSTEMS THROUGH EFFICENT USE OF FEEDBACK IN CRYPTOGRAPHIC FUNCTIONS

REFERENCE TO CO-PENDING APPLICATIONS

Priority is claimed from a 371 of international of PCT/IL2007/001101, filed on Sep. 6, 2007; which claims priority from U.S. Provisional Application No. 60/842,612, "A Feedback Strategy for the ZK-Crypt with Obviates Fraudulent Unkeyed Hash Collisions and Enhances Crypto-Complexity in Stream Cipher and True Random Number Generation", filed Sep. 7, 2006 and from U.S. Provisional Application No. 60/928,616, "Method and Apparatus for Increasing Unpredictability and for Secure Parallelization of Semiconductor Ciphers, Hashes and RNGs wherein Two Versions of Multi-bit Feedback are Reintegrated into Disparate Parts of a Digital Device", filed May 11, 2007

FIELD OF THE INVENTION

The present invention relates generally to systems and methods for data hashing, ciphering and random number generation.

BACKGROUND OF THE INVENTION

Numerous methods and systems for hashing are known, such as those described in Knuth, Donald (1973). *The Art of Computer Programming* vol. 3, Sorting and Searching, pp. 506-542.

Digital devices useful in conjunction with hashing systems are described in co-pending published PCT patent applications, WO 2005/101975 and WO 2007/0949628, also termed herein "975" and "628".

Applicant's World Wide Website located at fortressgb.com includes:
  a. A set of concept and circuit drawings describing the ZK-Crypt functions
  b. An article entitled "Understanding the ZK-Crypts—Ciphers for (Almost) all Reasons".
  c. An article entitled, "A Security Analysis of the ZK-Crypt".
  d. A software simulator of the physical Noise Generator used to establish safe circuit parameters for the Random Controller in certain preferred embodiments of this patent.

The disclosures of all publications and patent documents mentioned in the specification, and of the publications and patent documents cited therein directly or indirectly, are hereby incorporated by reference.

SUMMARY OF THE INVENTION

Certain embodiments of the present invention seek to provide methods for Obviating Message Modification in Data Authentication while Increasing Complexity and Parallelization Thereof.

Certain embodiments of the present invention seek to provide methods for generating separate dense feedback streams and/or a combination of dense and sparse feedback streams in a multiplicity of at least one deterministic random number generator core configured particularly as a data authenticator and/or as a stream cipher thereby to increase complexity and to obviate the generation of two data input strings which generate a resulting identical state condition of a multiplicity of deterministic random number internal binary state variables.

Certain embodiments of the present invention seek to provide configurations of multiple feedback streams circulating data in deterministic random number generator cores operative to be used in data authentication or cipher apparatus; thereby to increase diffusion of malicious or unintended changes in the source of the feedback and in particular the input binary data authentication strings, to obviate malicious or unintended Message modification.

Certain embodiments of the present invention seek to provide enhancement for single and for multi-purpose digital security modules with parallel feedback; operable to increase complexity and to provably and intuitively obviate malicious or unintended data modification in unkeyed and keyed hashing methods and apparatus.

A Hash function is typically an efficient one-way compression of longer binary strings into fixed length strings, typically called Hash-Values (for hashes, keyed hashes or MACs), or Tags (typically for keyed hashes or MACs). In this document, Hash-Value and Tag are used interchangeably, and often in combination, Hash-Value Tag. In such data authentication systems, a user must be reasonably assured that any change in the binary input string, large or small, renders a false hash value. Typically, hash functions do not involve secrets, are publicly known, and a potential attacker knows the process of compression. The hash value, to be checked against the single value previously known hash value of the original binary string, is designed to reasonably assure a user of the authenticity of the data. A hash function, in which a secret key is used to initiate the apparatus, enables a user who knows both the secret key and the true hash-value to determine the integrity and, typically, with a level of assurance, the origin of the "hashed" data. An apparatus with a secret key is typically classified as a MAC, a Message Authentication Code; or an HMAC, a Hashed MAC. For historic reasons, in this patent an Engine is in MAC Mode, when the feedback streams are a function of the Cipher Mask XORed to the Message Word, where in some instances the Message Word is equal to zero.

Both Hash and MAC functions use deterministic random number generator, DRNG, cores to produce pseudo-random internal values. These internal values are then combined with binary data input strings wherein the combination is fed back and diffused into the state variables of the DRNG. In this patent the DRNG typically refers to the total circuitry which executes Hash and Stream Cipher functions as an Engine. The Engine is viewed in three major parts, the Random Controller, which regulates permutations in the larger part of the Engine, the 32 Bit Word Manipulator, which is referred to generically as the Word Manipulator (which includes the Register Bank and Data Churn) and the Result & Feedback Processor. This document is designed first and foremost based on the operations of the Word Manipulator and the Result and Feedback Processor, which is fed by and feeds back orthogonal diffusing vectors to the Word Manipulator. For the purposes of explaining the principals of orthogonal feedback streams it is assumed that the Random Controller is irrelevant during the well planned adversarial attack; as the astute Adversary has probably chosen a favorable window for attack. The two sets of tiers in the Register Bank are each two subset DRNGs and the Data Churn is also referred to as a subset DRNG. This is compliant with engineering nomenclature, wherein the nLFSRs in the Register Bank are referred to as pseudo-random number generators; and the diffusive correlation immunizing hybrid filters and displacement matrices in the Data Churn constitute efficient DRNGs.

Two or more data authentication feedback streams are defined as orthogonal if a sequence of Message Words causes one stream to successfully corrupt and reconcile one section of tiers in the Register Bank; wherein the second feedback stream simultaneously irreconcilably corrupts at least one other section of the Register Bank for every possible corrupting Message Word. This is intuitively obvious, but difficult to prove logically, in all cases. Included are a flow chart and two source C codes, which check and prove orthogonality for all possible $2^{32}$ false message words, for shift registers and for rotating registers. The proof for static memory store registers is included separately, where the two Orthogonal feedback functions are simply the two stored feedback 32 bit words:

A=Present (Cipher Mask XOR Message Word); SUP, and
B=A XOR Previous (Cipher Mask XOR Message Word), LBF.

Dense feedback, especially wherein all feedback words are simple rotated versions of the same Results, generates strongly correlated output Cipher Mask words, and resulting poor statistics. Hence in certain preferred embodiments the feedback sources of each stream are typically uncorrelated and permuted. In certain preferred embodiments, the Result is the XOR sum of the Cipher Mask, the output of the 32 bit Data Manipulator, a DRNG, and the Message Word. The output of the Result store is the Previous Result. The input to the Result store is the Present Result.

The inventive step in this patent assures orthogonality when two or more disparate feedbacks streams are XOR summed to two or more sets of static, rotating or shifting registers; e.g., static memory stores, nLFSRs, LFSRs, simple shift registers and/or rotating registers.

One stream is sourced from at least the XOR sum of a Previous and a Present Result Word; i.e., the Lower Feedback in certain preferred embodiments, and the second source is a function of at least the Present Result word, and is only affected by false bits in a Present Result word; i.e., the Super Tier Feedback in certain preferred embodiments. The first false Message Word uniquely affects the Present Result only, hence both feedbacks affect the same number of indexed bits in each Register set. Register bits are indexed from left to right, 0 to 31, wherein 31 is the MS (most significant) register bit.

In order that an attack may succeed, on the next clock cycle, both feedback streams typically simultaneously reconcile all falsified bits in their respective registers.

In the next clock cycle a second false Message Word must be contrived to reconcile falsified bits in at least one of the register sets. In order to generate a reconciling word for the Lower Feedback, the known unique feedback word is the XOR sum of the falsified Previous Result (with the same false bits as the previously falsified Message Word) and falsified Present Result output words (with the same false bits as the presently falsified Message Word).

The Super Tier Feedback is the new falsified Message Word bits reflected in the Present Result only. In certain preferred embodiments, this second feedback may or may not reconcile previously generated false bits in the Super Tier, but provably leaves a trace of false bits.

If the receiving register sets are static, same index false bits (now reconciling bits) are typically XOR summed on the second clock to the Lower Feedback register set. In such a case, the Message Word is true (no falsified bits), as the previous Message Word false bits residing on the output of the Result store, reconcile the Lower Feedback register set.

In such a case, the Message Word is true (the Present Result is true); therefore all false bits in the Super Tier from the previous clock typically remain.

As certain preferred semiconductor embodiments of the Engines typically occupy a small fraction of a chip area, implementing two or more Engines on new semiconductor devices with CPUs, to enable fast, compact, state of the art, low current consumption for:

True Random Number Generation;
En/Decryption (Stream Cipher); and,
Data Authentication (Hash or MAC)

Efficient methods of concatenating preferred embodiment Engines to increase throughput and complexity for highest security are shown, paving the way to highest security applications, and simultaneous Decryption and Data Authentication.

The robust feedback schemes, where at least two orthogonal feedback streams are generated by at least one DRNG are described. Stated differently, in certain preferred embodiments two or more feedback streams are orthogonal feedbacks wherein for any change in any state variables in either the Word Manipulator or the Result & Feedback Processor, the two or more feedback streams each changes different sections of state variables in the Engine such that later feedback changes typically cannot reconcile the Engine to a previous valid state. There is typically no way that an adversary can change one or more Message Words; followed by valid Message Words, without leaving a random irreconcilable trace in the state variables of the Engine. E.g., in a hash digest an adversary cannot move or remove a decimal point, and then change another one or small number of Message Words without corrupting the Engine's state variables; thereby typically deterministically causing a subsequent false Hash Value Tag.

For a single bit change in a Message Word, the mutual source of both orthogonal feedback streams in the single Engine preferred embodiments, deterministically affects (diffuses into) the equations of an average of more than 160 Engine binary state variables in a first false Message Word cycle. In a linked concatenated plurality of at least two Engines, a single change in one Engine typically propagates spontaneously in an uncontrollable chain reaction.

Typical linear parallel feedback in DRNGs degenerates output statistics measured with DieHard. Adding a second orthogonal feedback stream obviated message modification and improved both TRNG (True Random Number Generation) and Stream Cipher statistics.

Typically, an adversary, in his efforts to gain value, attempts a simple ploy of changing only a few bits of a message; where he knows how the Hash or MAC DRNG is designed, and has a good idea of how to reconcile binary state variables to a valid state. Weaknesses in two single track feedback reduced architecture versions of a preferred embodiment are shown which invite malicious attempts to generate a "second preimage" attack; i.e., a modified data input string that subsequently reconciles state variables of the DRNG to a typically identical or close to identical state.

A definition of a pre-image resistant hash function $f(\cdot)$, given x, it is hard to find x' such that $f(x)=f(x')$. In these practical cases, the Adversary wants x to closely resemble x'; e.g., a long text resembles the original, except for a few numbers which could be falsified. For an astute hacker to generate this type of meaningful pre-image, she must first generate at least one fraudulent Message Word to corrupt at least a portion of the Register Bank, and then generate a Message Word sequence which must successfully reconcile typically all of the hundreds of internal variables of the Engine to an original condition.

Such a ruse cannot work in a single feedback stream embodiment; wherein one Message Word's fault bits appear in two consecutive clock cycles. However, the scam demonstrates a weakness that is conclusively remedied by a second orthogonal feedback.

It is shown that concatenating Engines with linked feedback streams enormously increase complexity and potentially multiply single Engine speeds at a low cost.

If there are only two concatenating devices the feedback interlinking system is called a feedback swap, wherein the Left Engine switches in its Right Hand neighbor's Right Lower Feedback to replace its Left Lower Feedback which is fed into the Right Hand Engine. If more than two Engines are involved all, except the "last" MS (most significant) Engine, feeds its Lower Feedback to replace its near neighbor's Lower Tier Feedback; wherein the MS Lower Feedback is fed into the LS (Least Significant) Engine.

Any attempt to modify one Message Word in one Engine results in corrupting its own Super Tier and its neighbor's TMB (Top, Middle and Bottom) Tiers and Data Churn. Any attempt to reconcile, typically entails further corrupting of at least one of the two Engine's Register Bank.

In another preferred embodiment, if two or more Engines are interlinked, all engines, except the "last" MS Engine, feed their Super Tier Feedback XOR summed to their near neighbor's Super Tier Feedback; where only the LS Engine XOR sums its Cipher Mask Count (HAIFA) with its own Super Tier feedback The maximum speed attainable, and the current consumption of concatenated units is typically a linear function of the number of Engines. The cryptocomplexity is typically an exponential function of significant binary variables in the Engines.

A Cipher Mask Counter is used to generate interrupts and to synchronize and paginate transmissions. In data authentication regimes, the counter output is XOR summed to the value in the Super Tier Register to assure that at each clock cycle a valid state includes the index number of the Cipher Mask. This scheme was suggested by "HAIFA" to prevent preassembling false Messages in sections to be moved at will in a final false Message stream.

Having two or more configurable identical Engines, with and without optional Lower Feedback concatenation, has additional advantages. Organized as two Engines which optionally can accept the same input data, one half of the Engines can hash while the other half decrypts. Except for initialization, and final generation of the Hash-Value Tag, both Engines receive the same input data, wherein only the clear text value is output from the decrypting Engine. During the following verification sequence only the MAC Mode Engine or linked Engines are read. At the end of the verification step, the user typically knows if the clear text is valid. Typically, only then, error correction is necessary on clear text. As Stream Ciphers do not propagate errors, as opposed to Block Ciphers in feedback mode, error correcting clear text only when necessary is less costly than error correcting/detecting all cipher text, as conventionally done in block cipher encryption.

The suggest Hash-Value Tag calls for 16 unread scrambles which may be pre-appended to the presently defined Hash-Value Tag., potentially adding 512 bits to the tag length.

Classic Attacks on a Hash or a MAC are now described. The classic attack on a MAC apparatus is simple. Complement (flip) bits in a Message in one clocked cycle and then in a subsequent clock cycle flip the same index bit—it can happen that the second flipped bit reconciles the falsified bit; without leaving a trace in any of the Engine variables. This is typically the first attack used by an attacker with no knowledge of the Engine architecture. An adversary who has knowledge of certain preferred embodiments uses the same concept, and assures that most significant cells of nLFSRs is not complemented, and realizes that the first cut corrupted bits move right one cell at the next clock.

To show the efficacy of the dual feedback system, fault vectors are generated typically wherein defined bits in a Word are false. The XOR symbol is used to demonstrate corruption and reconciliation of binary variables. A False bit means a bit of opposite polarity (complemented) from a True bit; therefore if a true binary value, T, is equated to "0", and F a false value to "1" then conventional XOR logic holds as:

$$T \oplus T = T;\ T \oplus F = F;\ F \oplus T = F;\ \text{and}\ F \oplus F = T.$$

If a Message bit is false and is encoded (XORed to assure a change in the feedback) with a true bit of a Cipher Mask, the result is the opposite polarity of the truth, hence false. If a new false feedback bit is XORed to the corrupted (false) bit(s), the resulting bit or bits (assuming that three or four same index bits in the Register Bank were corrupted) is/are all be reconciled, with no apparent trace left in the Register Bank.

As stated above, attacking certain preferred embodiments of this patent is more complicated, as the attacker is "shooting at moving targets". The active components of the Tiers of the Register Bank are nLFSRs which when clocked move bits from a left hand cell into a right hand cell. Because of the structure of the nLFSRs, all cells except the MS (most significant cell) of an nLFSR can be flipped (falsified) on one clock cycle, and then reconciled on the next clock cycle. That means that potentially 28 of the 32 Message Word bits are auspicious (for the attacker) which can be falsified and then reconciled by two consecutive false Message Words. The clocked tiers in the Register Bank that are falsified, right shift bits one cell at every clock. If the attacker complements bit(s) in a shift register, she must reconcile the bit(s) a cycle (or a small number of cycles) later as falsified bit are shifted into new positions.

A Hash/MAC Attack of this Type is Successful if:
  a) one or more falsified bits complemented in one or more Message Word can be inserted in a Message sequence followed by a second reconciliation Word or Word sequence contrived such that the following sequence of Messages reconciliates sufficient binary state variables in the Engine, to assure that a true Hash-Value Tag can be generated; or,
  b) the adversary can choose a likely candidate Message Word to falsify and subsequently generate an auspicious word containing only error bits that do not cause subsequent propagation of false signals into the Random Controller, or leave traces (irreconcilable falsified bits) in the Register Bank, the Data Churn or the Result/Feedback Processor; and,
  c) after generation of the first falsifying/reconciling Message Word pair (or short sequence), subsequent Message Words can be generated which cause valid feedback (the same feedback sequence generated in the original Message string digest) to maintain components that normally retain "historical evidence of false words" (the Register Bank and Store & XORs) in a valid condition, so that at the end of the Message Word string digest the binary variables are in the true unextended condition and can generate a true Hash-Value Tag.

The attacker has the best chance of success, if she reconciles the falsified bit(s) on the immediately following clock cycle. As can be seen in certain preferred embodiments in the Description of the Figures—assume that an attacker has falsified the LS bits in the Register Bank, and she waited 16 cycles to insert a reconciling word. On the 12th cycle the falsified bit has corrupted the Top Left nLFSR as the moving false bit corrupted the MS nLFSR feedback bit; on the 14th cycle it has corrupted the Bottom Left nLFSR; and on the 15th cycle it has corrupted the Left Super Tier nLFSR. It is also mandatory that the corrupted tiers shift together for the reconciliation bit to be able to re-complement all falsified bits. In certain preferred embodiments, the same tiers rarely rotate together for more than five consecutive Primary Clock cycles.

Many Message Words are valid candidates to enable the two step falsifying and rectification of the Register Bank without affecting the Random Controller. In the two step sequence, in a preferred embodiment, up to 28 bits of candidate words can be falsified without complementing the MS (internal feedback bits) of the Register Bank nLFSRs. In a generalizing case of a 32 bit architecture, wherein all nLFSRs are 32 bit long, up to 31 bits can be corrupted.

In these analyses, it is assumed that the adversary has chosen a most auspicious word that corrupts the Register Bank, the Data Churn and the Result Store, on the first cycle, and reconciles the Register Bank on the next cycle. As described herein, typically, even if she "contrived" the best of all possible words, the attack does not work.

The feedback tracks linearly aberrate (change from the "expected") binary state variables in the Register Bank and the Data Churn. In MAC Mode, a complemented bit in a valid Message Word complements indexed bit in the clocked tiers of the Register Bank two clock cycles later. Flipped Message Word bits are inserted into the Feedback Stores on the next clock. Two clocks later the flipped bits affect the Register Bank and the Data Churn. Only tiers that are clocked are affected by feedback. For simplicity it is assumed that all four Tiers are clocked together. If the i'th bit is complemented, at the next clock the i'th bit is shifted into the i+1'th cell(s). As the complemented bit is shifted into the i+1'th cell, it can simultaneously be re-complemented by a false complemented feedback bit in the next clock cycle. In this most efficient method, the second false reconciling Message Word reconciles the Register Bank (in Single Feedback mode), immediately. In certain preferred embodiments, attempts at reconciling false bits with a wait of more than two cycles is even less tractable, as internally generated feedback (not reconcilable by attacker generated Message Words) typically uncontrollably corrupts the Super Tier and the Data Churn.

An attack on the unenhanced embodiment commences with an altered Message Word submitted at stage t=$t_{i-1}$ (acting on the register bank at the i+1'th stage); and at stage t=$t_i$ a retrieval word is submitted to revert the Register Bank to a valid state at the i+2'th stage; contrived message words are input so that at stage t=$t_{i+7}$ all variables in the Data Manipulator have reverted to the original sequenced values for both previous valid and previous fraudulent Message Words; assuming that the minimal preconditions have been fulfilled. Therefore, after the i+7'th contrived Message Word is enacted, all original Message Words are valid; and the final resulting Hash-Value Tag on the valid and fraudulent "Authenticated Message Strings" are identical.

If at the end of the Message Digest, all variable polarities are in the valid state, the Hash-Value Tag is valid, regardless of any previous events.

Note again, the total status of all state variables cannot be rectified if any of the index bits 12, 14, 15, 17 and/or 31 of the first fraudulent Message Word has been complimented. In such cases, at least one nLFSR MS cell causes a faulty unretrievable One to Many nLFSR permutation. Note also, as the Register Bank tiers "accept" the fraudulent word, they execute a one cell rotate at each clock, such that the "retrieving" false vector whose function is to rectify all complemented values in the Register Bank, is generated on the next clock cycle. Therefore, only 27 or 28 of the 32 Message Bits can successfully be complemented on the first fraudulent Message Word. These 27 or 28 bits are potentially "auspicious bits". In the enhanced feedback version of this invention, a fraudulent word immediately causes irretrievable variable complementations in the Register Bank, the Data Churn and the Result/Feedback Processor; and typically in a few clock cycles corrupts the Random Controller.

An auspicious stage is one condition of the Engine variables where it is potentially possible to complement some or all of the above mentioned 28 bits of a valid Message word, and subsequently successfully reconcile the Register Bank to its original state with a second fraudulent Message Word on the next clocked stage. Once having successfully changed one bit of a Message Word, changing up to 28 bits of the Message Word is a trivial exercise for an adversary who knows the initial condition of the unenhanced embodiment.

During the window of auspicious changes, a necessary condition is that there are no uncontrollable changes in the Register Bank or Random Controller for two clocked cycles.

This means, at least, that the following conditions are observed for a successful attack which commences with the submission of the i−1'th Message Word:

1) MS bits of the 8 Register Bank nLFSRs are never permuted by the first faulty word; e.g., the adversary can only permute up to 28 auspicious bits;
2) that for the two critical clocked cycles, i+1'th and i+2'th cycles, only the same tiers are activated, most typically, all four tiers; since otherwise the proper reversions are not effected on all of the i+1'th clock cycle affected tiers; and,
3) the serial feedback string from the Top Splash Matrix to the Splash Selector, is not changed for the i+2'th or the i+3'th clocked cycles.

During the i+2'th to 1+6'th critical clocks, any changes in the Data Churn are temporal and irrelevant, iff the relevant Message Words are properly contrived, as a reconciled Register Bank quickly reconciles the Data Churn, if valid sustainable feedback is generated.

There is thus provided, in accordance with certain embodiments of the present invention, a data hashing system operative to hash an incoming string of message words, thereby to generate a hash value tag comprising a deterministic random number string which uniquely identifies the incoming string of message words, the system comprising at least first and second register arrays; at least one 1-way at least pseudo-randomizing functionality; and a set of at least first and second orthogonal feedback word stream generators operative to generate a set of at least first and second orthogonal feedback streams of message words respectively, including applying respective permutations to the incoming string of message words, wherein the first and second feedback streams are combined into the first and second register arrays respectively; wherein the at least pseudo-randomizing functionality accepts input from the register arrays and generates at least pseudo-random output which, in combination with a present word in the incoming string, is provided to the stream generators, and wherein the orthogonal feedback streams are characterized in that every possible modified incoming string of message words which differs by at least a single word from an original incoming string of message words has at least one of the following two characteristics (a) and (b):

a. the modified incoming string causes a corrupting first feedback stream generated by applying a permutation to the modified incoming string, when combined into the first register array, to corrupt the first register array, relative to the same first register array into which a non-corrupting first feedback stream, generated by applying the permutation to the original incoming string, has been combined; and/or b. the modified incoming string includes at least one reconciling word which enables the modified incoming string, when permuted to form one first feedback stream which is combined into the first register array, to reconcile the first register array relative to the same first register array into which a modified first feedback stream, formed by permuting the original incoming string of message words, has been combined, however the at least one reconciling word in the modified incoming string of message words causes a corrupting second feedback stream generated by applying a permutation to the modified incoming string, when combined into the second register array, to corrupt the second register array, relative to the same second register array into which a non-corrupting second feedback stream, generated by applying the permutation to the original incoming string, has been combined.

Further in accordance with certain embodiments of the present invention, the system also comprising first and second functionalities associated with the first and second register arrays respectively, wherein at least one of the first and second functionalities comprises a one-way randomizing functionality.

Still further in accordance with certain embodiments of the present invention, the first and second feedback streams are XOR summed into the first and second register arrays respectively.

Further in accordance with certain embodiments of the present invention, at least one of the first and second register arrays comprises at least one non-linear feedback register.

Additionally in accordance with certain embodiments of the present invention, the first feedback stream is a first function of a present word in the incoming stream and wherein the second feedback stream is a second function of the present word, and of a previous word, in the incoming stream.

Further in accordance with certain embodiments of the present invention, at least one of the first and second register arrays comprises a set of at least one non-linear feedback shift registers.

Still further in accordance with certain embodiments of the present invention, an output of the non-linear feedback register is rotated, thereby to form an image of the output which is recombined with the output of the non-linear feedback register.

Further in accordance with certain embodiments of the present invention, the image of the output is randomly recombined with the output of the non-linear feedback register.

Still further in accordance with certain embodiments of the present invention, at least one of the first and second register arrays comprises six different non-linear feedback registers arranged in three concatenated pairs.

Further in accordance with certain embodiments of the present invention, for each of the three pairs, an output of the pair of non-linear feedback registers is rotated, thereby to form an image of the output which is recombined with the output of the pair of non-linear feedback registers, thereby to generate three tiers, each comprising a respective one of the three concatenated pairs of non-linear feedback registers.

Still further in accordance with certain embodiments of the present invention, an output of the three tiers is combined in a 2-of-3 majority combiner.

Further in accordance with certain embodiments of the present invention, the system also comprises a message counter generating a binary output which is XOR-summed to at least one of the first and second feedback streams.

Still further in accordance with certain embodiments of the present invention, there is provided a pair of first and second data hashing systems as described above, wherein at least one of the first and second feedback streams is swapped between the first and second data hashing systems such that at least one feedback stream entering at least one of the register arrays in the first hashing system is generated by the second hashing system whereas at least one feedback stream entering at least one of the register arrays in the second hashing system is generated by the first hashing system.

Further in accordance with certain embodiments of the present invention, a sequence of data hashing systems as described above is provided, wherein at least one feedback stream entering at least one of the register arrays in each hashing system in the sequence is generated by the next hashing system in the sequence and wherein at least one feedback stream entering at least one of the register arrays in the last hashing system in the sequence is generated by the first hashing system in the sequence.

Still further in accordance with certain embodiments of the present invention, at least one 1-way at least pseudo-randomizing functionality comprises stream cipher functionality.

Further in accordance with certain embodiments of the present invention, the feedback word stream generators receive inputs from the stream cipher functionality and are independent of the incoming stream of message words.

Still further in accordance with certain embodiments of the present invention, the system also comprises clock apparatus which randomly regulates at least one of the register arrays, the randomizing functionality, and the feedback stream generators, thereby to provide true randomness.

Also provided, in accordance with certain embodiments of the present invention, is a data hashing method operative to hash an incoming string of message words, thereby to generate a hash value tag comprising a deterministic random number string which uniquely identifies the incoming string of message words, the method comprising providing at least one 1-way at least pseudo-randomizing functionality; and using a set of at least first and second orthogonal feedback word stream generators to generate a set of at least first and second orthogonal feedback streams of message words respectively, including applying respective permutations to the incoming string of message words, wherein the first and second feedback streams are combined into first and second register arrays respectively, wherein the at least pseudo-randomizing functionality accepts input from the register arrays and generates at least pseudo-random output which, in combination with a present word in the incoming string, is provided to the stream generators, and wherein the orthogonal feedback streams are characterized in that every possible modified incoming string of message words which differs by at least a single word from an original incoming string of message words has at least one of the following two characteristics (a) and (b):

a. the modified incoming string causes a corrupting first feedback stream generated by applying a permutation to the modified incoming string, when combined into the first register array, to corrupt the first register array, relative to the same first register array into which a non-corrupting first feedback stream, generated by applying the permutation to the original incoming string, has been combined; and/or b. the modified incoming string includes at least one reconciling word which enables the modified incoming string, when permuted to form one first feedback stream which is combined into the first register array, to reconcile the first register array relative to the same first register array into which a modified first feedback stream, formed by permuting the original incoming string of message words, has been combined, however the at least one reconciling word in the modified incoming string of message words causes a corrupting second feedback stream generated by applying a permutation to the modified incoming string, when combined into the second register array, to corrupt the second register array, relative to the same second register array into which a non-corrupting second feedback stream, generated by applying the permutation to the original incoming string, has been combined.

Further provided, in accordance with certain embodiments of the present invention, is a data hashing method operative to hash an incoming string of message words, thereby to generate a hash value tag comprising a deterministic random number string which uniquely identifies the incoming string of message words, the method comprising providing at least one 1-way at least pseudo-randomizing functionality; and using a set of at least first and second orthogonal feedback word stream generators to generate a set of at least first and second orthogonal feedback streams of message words respectively, including applying respective permutations to the incoming string of message words, wherein the first and second feedback streams are combined into first and second register arrays respectively, wherein the at least pseudo-randomizing functionality accepts input from the register arrays and generates at least pseudo-random output which, in combination with a present word in the incoming string, is provided to the stream generators, and wherein the first feedback stream is a first function of a present word in the incoming stream and wherein the second feedback stream is a second function of the present word, and of a previous word, in the incoming stream.

Additionally provided, in accordance with certain embodiments of the present invention, is a data hashing system operative to hash an incoming string of message words, thereby to generate a Hash-Value Tag comprising a deterministic random number string which uniquely identifies the incoming string of message words, the system comprising at least first and second register arrays; at least one 1-way at least pseudo-randomizing functionality; and a set of at least first and second orthogonal feedback word stream generators operative to generate a set of at least first and second orthogonal feedback streams of message words respectively, including applying respective permutations to the incoming string of message words, wherein the first and second feedback streams are combined into the first and second register arrays respectively, wherein the at least pseudo-randomizing functionality accepts input from the register arrays and generates at least pseudo-random output which, in combination with a present word in the incoming string, is provided to the stream generators, and wherein the first feedback stream is a first function of a present word in the incoming stream and wherein the second feedback stream is a second function of the present word, and of a previous word, in the incoming stream.

The following terms, where used, are intended to include, at least as an alternative, the following meanings respectively:

Orthogonal: A set of more than two feedback streams are orthogonal if each pair of feedback streams within the set is orthogonal. A pair of feedback streams is orthogonal if every possible modified incoming string of binary words which differs by at least a single word from an original incoming string of binary words has at least one of the following two characteristics (a) and (b):

a. the modified incoming string causes a corrupted first feedback stream generated by applying a permutation to the modified incoming string, when combined into the first randomizing functionality, to corrupt the first randomizing functionality, relative to the same first randomizing functionality into which a non-corrupted first feedback stream, generated by applying the permutation to the original incoming string, has been combined;

b. the modified incoming string includes at least one reconciling word which enables the modified incoming string, when permuted to form one first feedback stream which is combined into the first randomizing functionality, to at least partially reconcile the first randomizing functionality relative to the same first randomizing functionality into which a modified first feedback stream, formed by permuting the original incoming string of binary words, has been combined, however the at least one reconciling word in the modified incoming string of binary words causes a corrupting second feedback stream generated by applying a permutation to the modified incoming string, when combined into the second randomizing functionality, to corrupt the second randomizing functionality, relative to the same second randomizing functionality into which a non-corrupting second feedback stream, generated by applying the permutation to the original incoming string, has been combined.

XOR, XOR summation: Addition modulo two of 2 single bits or the bitwise modulo 2 addition of the same index bits of two words, the process typically denoted by the "$\oplus$" symbol; e.g., $1\oplus=0$; $1\oplus0=1$; $1010|1100=0110$.

Scramble: A deterministic permutation designed to increase adversarial intervention.

Corrupt: Given two copies A and B of a functionality storing and employing a plurality of state variables, copy A is said to have been corrupted if at least one of the state variables has been flipped relative to copy B.

Reconcile: Given a corrupted copy A and a true copy B of a register storing a plurality of state variables, copy A having been corrupted by flipping a subset of the plurality of state variables relative to the values assigned to the same state variables in copy B, copy A is said to have been reconciled if all variables in the subset have been restored to their true values i.e. to the values assigned to these variables in copy B.

Data authentication: Confirmation that at least one characteristic, such as content and/or identity of originator, of a given body of data, also termed herein a "Message" and typically comprising a binary string, has not been modified.

Digestion: Applying a one-way function to incoming data in a way that each Message bit is reflected in a change of the Engine variables.

Time and Clock Cycles: Time, generally refers to the typically constant relation of states in variables, whereas Clock Cycles typically relate explicitly to a sequence of typically asymmetric events regulated by the Host. Hence, t+1 generally relates to a state one clock cycle later.

Any suitable processor, display and input means may be used to process, display, store and accept information, including computer programs, in accordance with some or all of the teachings of the present invention, such as but not limited to a conventional personal computer processor, workstation or other programmable device or computer or electronic computing device, either general-purpose or specifically constructed, for processing; a display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention.

Any trademark occurring in the text or drawings is the property of its owner and occurs herein merely to explain or illustrate one example of how an embodiment of the invention may be implemented.

BRIEF DESCRIPTION OF THE DRAWINGS

Certain embodiments of the present invention are illustrated in the following drawings:

FIG. 1B is a simplified functional block diagram illustration of a data authentication system using the data hashing system of FIG. 1A, all in accordance with certain embodiments of the invention.

FIG. 3 is a simplified block diagram illustration of a single cell of the applicant's proprietary word length hybrid MAJ/3XOR non-linear/linear filter coupled to applicant's proprietary Store & XOR cell operative to receive a single feedback bit.

FIG. 7A is a simplified block diagram illustration of a basic architecture of the Register Bank of certain preferred embodiments. The output of the TMB (Top, Middle and Bottom) Tier outputs are combined in the 32 cells of the non-linear 2 of 3 Majority gates (MAJ in the drawings) depicted in FIG. 7B. FIG. 7C depicts a cell of the hybrid 4 tier combiner.

FIGS. 13A-13D are simplified block diagram illustrations of the hardware and software implementations of the two displacement filters which comprise the transforming elements of the Super Tier feedbacks.

FIG. 14A is a simplified block diagram illustration of an example which typifies a message modification attack wherein four bits are complemented (a modified message) in one Primary Clock cycle, and in the next cycle, the modified bits in the TMB section of the Register Bank are reconciled; leaving no trace of the "criminal" modification in the Message Word stream.

FIG. 14B is a simplified block diagram illustration of how the same four bit aberrated message modification attack complements an orthogonal set of bits in the Super Tiers. In the next Primary Clock cycle, the modified bits in the TMB Tiers are reconciled; whereas 12 falsely complemented bits leave an impossible to reconcile trace of the "criminal" modification in the Super Tier.

DETAILED DESCRIPTION OF CERTAIN EMBODIMENTS

Figure 6:
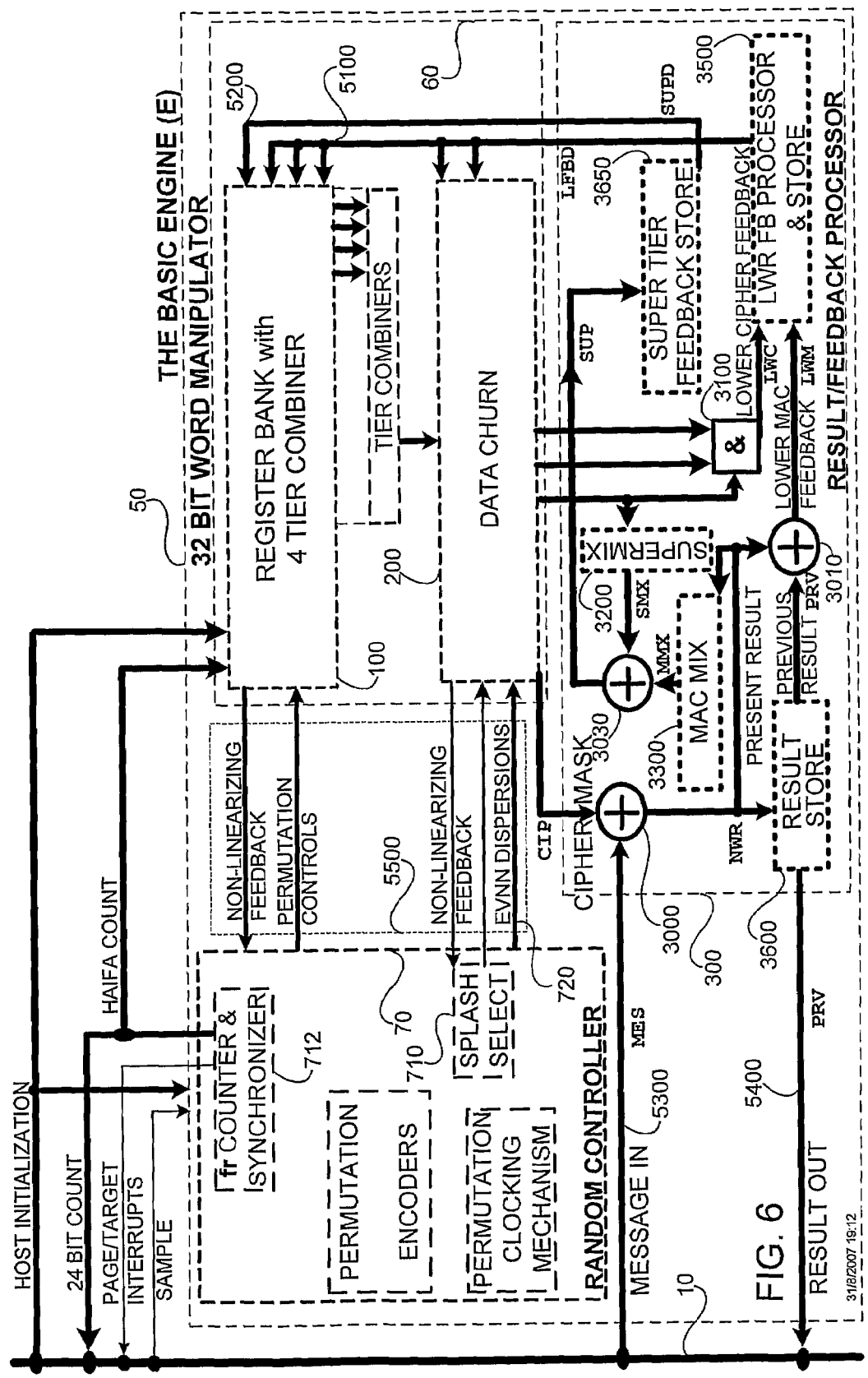
FIG. 6 is a simplified block diagram illustration of the Engine in certain preferred embodiments of this patent, showing the three main components of the Basic Engine; i.e., the 32 Bit Word Manipulator, which includes the Register Bank and the Data Churn, the Result/Feedback Processor, and the Random Controller.

In all of the adversarial attacks described herein, it is assumed that the attacker has auspiciously chosen the time and the corrupting bits, so that the Random Controller 70 shown explicitly in FIG. 6, is not adversely affected by binary state variables in either the Register Bank 100 or the Data Churn 200. This is a reasonable assumption, as any changes of Random Controller variables typically irreconcilably corrupt the permutations in the 32 Bit Word Manipulator, thereby eliminating any chance of success.

In the illustrated embodiment, data lines connecting modules of the 32 Bit Word Manipulators and the Result/Feedback Store are typically single word, typically 32 bit transmission lines or word sized busses.

Note that
1) All false or probably false variable words are designated in Bold, e.g., $CIP_{j+3}$. Provably false variables are underlined herein, e.g., $\underline{MES_{j+1}}$.
2) Often it cannot be demonstrated that a single word variable is false (or true), but the expression can be shown to be false, where an expression shown to be false is indicated by underscoring, e.g., $\underline{CIP_x \oplus MES_x}$.

Figure 1A:
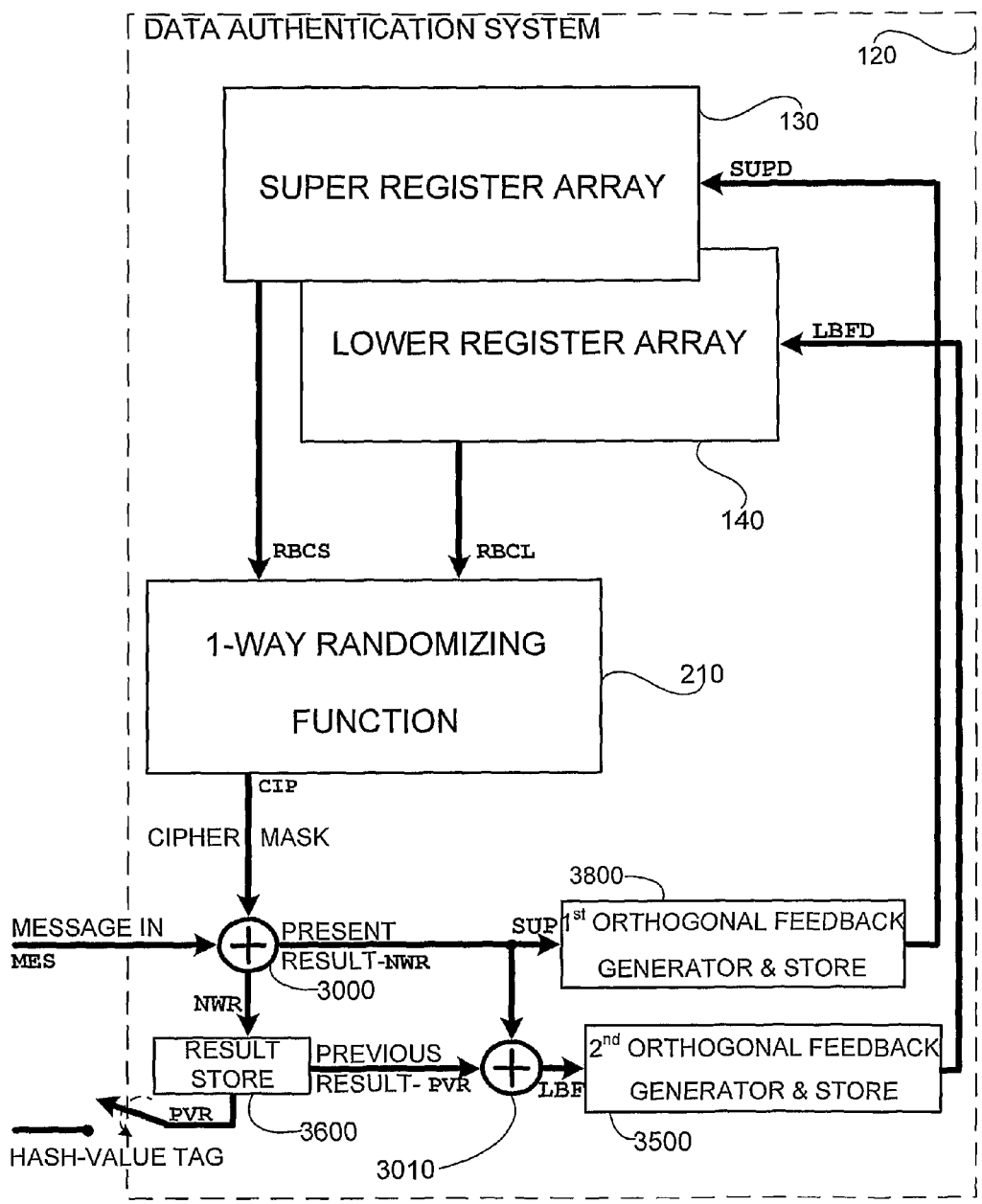
FIG. 1A is a simplified functional block diagram illustration of a data hashing system constructed and operative in accordance with an embodiment of the present invention.

FIG. 1A is a simplified block diagram of a Deterministic Random Number Generator configured as a Data Authentication System 120 operative to accept a string of Message Words which uniquely aberrate the state variables of Data Authentication System 120 such that subsequent to the aberration of the plurality of state variables of Data Authentication System 120; Data Authentication System 120 is in a uniquely defined state, operative to generate a unique deterministic random number string, which typically cannot be generated by another reasonably computable Message Word string; and especially in instances typified by a simply modified Message string; e.g., " . . . sum of $5.00 . . . " changed to " . . . sum of $500.00 . . . " in a meaningful valid Message string.

Typically, valid sequences of Message Words MESs are input to the Data Authentication System 120. At clock cycle k, a valid Message Word $MES_k$ is input into (word wise) XOR gate 3000 to be summed to a pseudo-random word $CIP_k$, the output of the 1-Way Randomizing function 210 thereby outputting a Present Result $NWR_k$. Present Result $NWR_k$ is to be stored in the next clock cycle in the Result Store 3600; $NWR_k$ is input as the $SUP_k$ to be functionally affected, stored and transmitted on the next clock cycle by the $1^{st}$ Orthogonal Feedback Generator & Store 3800; and is input into the (wordwise) XOR gate 3010 to be summed to the Previous Result $PVR_k$. The output of XOR gate 3010 is input as $LBF_k$ to be functionally affected, stored and transmitted in the next clock cycle by the $2^{nd}$ Orthogonal Feedback Generator & Store 3500.

The $1^{st}$ and $2^{nd}$ Orthogonal Feedback Generator & Store 3800 and 3500 processes may be any linear function process, including simply storing the input at one clock cycle, and transmission of the same input word without change, once clock cycle later; e.g., the value $SUP_x$ is identical to the value $SUPD_{x+1}$ one clock cycle later; the value $LBF_x$ is identical to the value $LBFD_{x+1}$ one clock cycle later. Output of the $1^{st}$ Orthogonal Feedback Generator & Store 3800 SUPD, is input into Super Register Array 130 on the next clock cycle. Output of the $2^{nd}$ Orthogonal Feedback Generator & Store 3500 SUPD is input into Lower Register Array 140 on the next clock cycle.

The Super and Lower Register Arrays 130 and 140 respectively are composed of memory registers wherein SUPD and LBFD are XOR summed into internal values of the Super and Lower Register Arrays 130 and 140. The Super and Lower Register Arrays 130 and 140 may be configured in a large plurality of ways, with included permutations, so long as every bit of SUPD and LBFD affect the state variable equations of the register arrays. The outputs of the Super and Lower Register Arrays 130 and 140 are RBCS and RBCL, respectively to be input into the 1-Way Randomizing Function 210.

The 1-Way Randomizing Function 210 comprises, typically, of logic and memory wherein each bit of the RBCS and RBCL words diffuse into the binary equations of the output the Cipher Mask CIP.

A false bit in the Message In Word MESS is only reflected in the x+2'th clock Cipher Mask CIP. Therefore, a sequence of two Message Words $\underline{MES_j}$ and $\underline{MES_{j+1}}$ can first corrupt (change a true bit or bits to a false bit or bits) and then reconcile (flip the corrupted bit(s) back to the valid state), without being affected by $CIP_j$ or $CIP_{j+1}$.

To prove the efficacy of the dual feedback system, fault vectors are generated typically wherein defined "1" bits in the vector are false and bits defined as "0" are true. The XOR symbol is used to demonstrate corruption and reconciliation of binary variables. False means opposite polarity (complemented) True; therefore if a true binary value, T, is equated to "0", and F a false value to "1" then conventional XOR logic holds as:

$$T \oplus T = T; \; T \oplus F = F; \; F \oplus T = F; \text{ and } F \oplus F = T.$$

If a Message bit is false and is encoded (XORed to assure a change in the feedback) with a true bit of a Cipher Mask $CIP_j$, the result is the opposite polarity of the truth, hence false. If the next Message Word causes a new false feedback bit or bits to be XORed to the corrupted (false) bit(s), and to all of them and to them only, the resulting bit or bits are reconciled, leaving no apparent trace.

The input equation to the $1^{st}$ Orthogonal Feedback Generator & Store 3800 at time t is:
1) $SUP_t = CIP_t \oplus MES_t$—which is quite simple. In such attacks SUP is known, and except for small corrupt/reconcile sequences, is the valid original feedback. The attacker can change MES at will.

The input equation to the $2^{nd}$ Orthogonal Feedback Generator & Store 3500 at time t is:
2) $LBF_t = CIP_t \oplus MES_t \oplus CIP_{t-1} \oplus MES_{t-1}$.

conversely, the in those instances where a Message Word at time j+1 causes a faulty output to generate a fault in both the Super and Lower Register Arrays rearranging equations 1) and 2):

3) $MES_{j+1} = CIP_{j+1} \oplus SUP_{j+1}$—bitwise XOR causes same bits to be flipped in the false Message and in the falsified Feedback.

and the false vector for $LBF_{j+1}$ will be the same as for $SUP_{j+1}$ as the previous Message Word and the previous Cipher Mask were true:

4) $MES_{j+1} = CIP_{j+1} \oplus LFB_{j+1} \oplus CIP_j \oplus MES_j$.

Assume that Adversary desires to reconcile the Super Register Array 130. He must use the same Message Word and generate identical $SUP_{j+2}$ feedback to reconcile the Super Register Array 130. Therefore:

5) The false vector of $MES_{j+2}$=the false vector of $MES_{j+1}$ and therefore the false vector of $SUP_{j+2}$=the false vector of $SUP_{j+1}$ to reconcile the falsified bits in the Super Register Array 130.

However, if the false vector of $MES_{j+2}$=the false vector of $MES_{j+1}$;

the $2^{nd}$ Orthogonal Feedback Generator & Store 3500 will generate from equation 2):

6) $LBF_{j+2} = CIP_{j+2} \oplus MES_{j+2} \oplus CIP_{t-1} \oplus MES_{j+1}$ wherein the $LBF_{j+2}$ two clock later will be the original "true" valid feedback vector which does not reconcile the corrupted binary state variables in the Lower Register Array 140.

if the Adversary attempts to generate a rectifying vector for the Lower Register Array 140, he would send the original Message $MES_{j+2}$ at clock j+2, therefore from equation 2):

7) $LBF_{j+2} = CIP_{j+2} \oplus MES_{j+2} \oplus CIP_{j+1} \oplus MES_{j+1}$, repeating the previous false vector, which resides in the Result Store 3600.

consequently from equation 1), at the j+1'th clock wherein the Message Word and the Cipher Mask are both original values, the Super Register Array will not be reconciled as:

8) $SUP_{j+2} = CIP_{j+2} \oplus MES_{j+2}$. The variables are all true original variables, and the feedback to the Super Register Array 130 is the original uncorrupted feedback, which cannot reconcile the corrupted bits in the Super Register Array 140.

Figure 15:
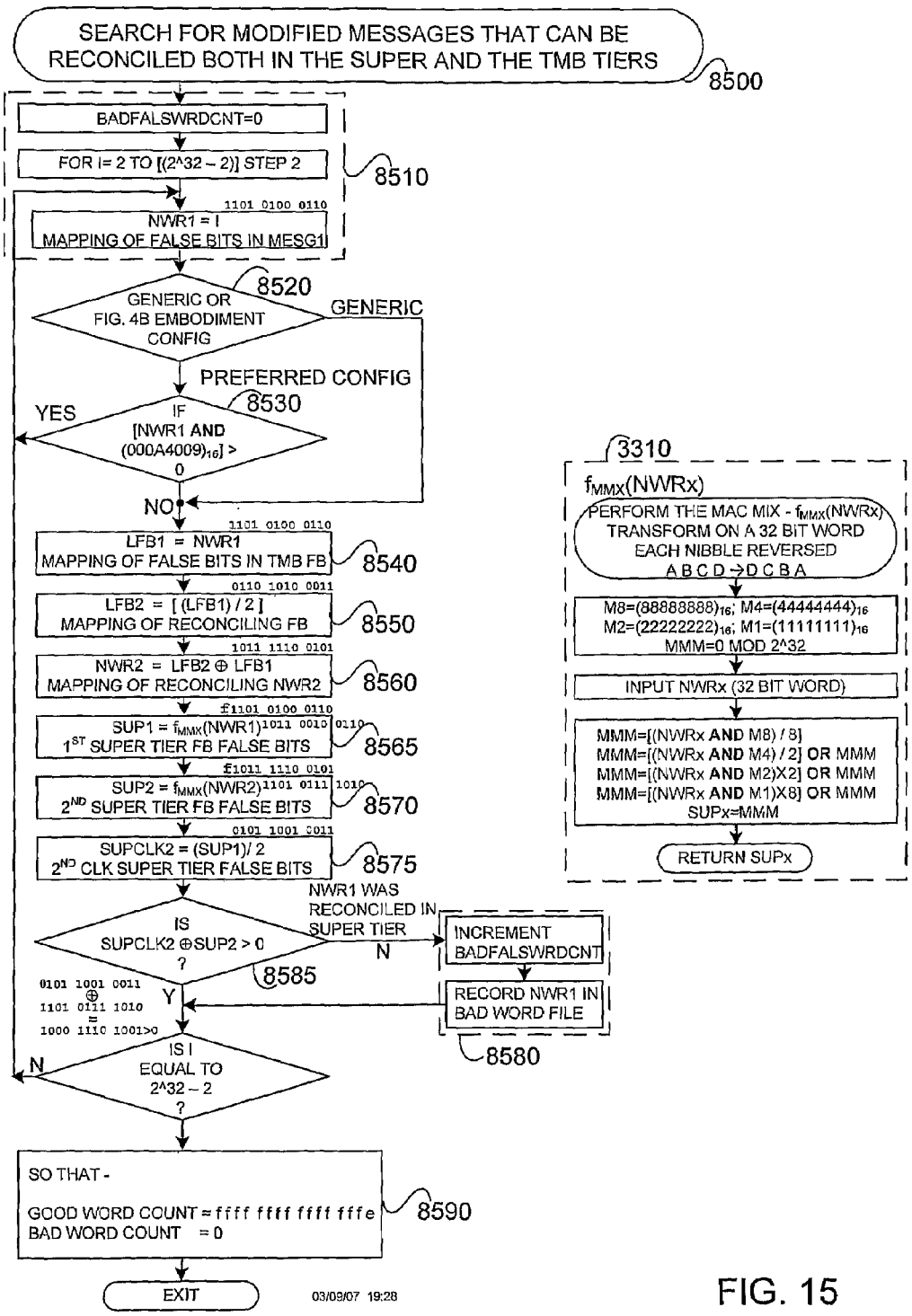
FIG. 15 is an explicit flow chart of the method which describes the orthogonality of the MAC MIX Feedback and the Lower Feedback for all possible Message Word modifications, typically for all generic subsets of nLFSR configurations in the Register Bank; i.e., all $2^{31}$ possible false Message Words.

In the flow chart of FIG. 15 function $f_{MMX}(NWR_x)$ 3310 can be replaced by any linear transformation, including outputting the previously clocked input word, without affecting the protection to be shown herein. A beneficial condition for a Data Authentication System is that a change of a bit in a Message word immediately diffuses into the inputs of the binary equations of a plurality of state variables in the Super and Lower Register Arrays 130 and 140 and into the 1-Way Randomizing Function 210.

As seen, FIG. 1A is a simplified functional block diagram illustration of a data hashing system constructed and operative in accordance with an embodiment of the present invention. As shown, the data hashing system operative to hash an incoming string of message words, thereby to generate a hash value tag comprising a deterministic random number string which uniquely identifies the incoming string of message words.

The system typically includes first and second register arrays, at least one 1-way at least pseudo-randomizing functionality; and a set of at least first and second orthogonal feedback word stream generators operative to generate a set of at least first and second orthogonal feedback streams of message words respectively. The feedback word stream generators typically apply respective permutations to the incoming string of message words as described in detail herein. The first and second feedback streams are combined into the first and second register arrays respectively. The at least pseudo-randomizing functionality typically accepts input from the register arrays and generates at least pseudo-random output which, in combination with a present word in the incoming string, is provided to the stream generators.

The orthogonal feedback streams are typically characterized by orthogonality, in that every possible modified incoming string of message words which differs by at least a single word from an original incoming string of message words has at least one of the following two characteristics (a) and (b):

a. the modified incoming string causes a corrupting first feedback stream generated by applying a permutation to the modified incoming string, when combined into the first register array, to corrupt the first register array, relative to the same first register array into which a non-corrupting first feedback stream, generated by applying the permutation to the original incoming string, has been combined; and/or b. the modified incoming string includes at least one reconciling word which enables the modified incoming string, when permuted to form one first feedback stream which is combined into the first register array, to reconcile the first register array relative to the same first register array into which a modified first feedback stream, formed by permuting the original incoming string of message words, has been combined, however the at least one reconciling word in the modified incoming string of message words causes a corrupting second feedback stream generated by applying a permutation to the modified incoming string, when combined into the second register array, to corrupt the second register array, relative to the same second register array into which a non-corrupting second feedback stream, generated by applying the permutation to the original incoming string, has been combined.

Typically, the first feedback stream is a function of a present word in the incoming stream and the second feedback stream is a function (typically a different function) both of the present word and of a previous word, in the incoming stream.

FIG. 1B is a simplified block diagram of a Tag validation system operative to certify the Tag output of the Data Authentication System 120 of FIG. 1A. The apparatus consists of the Data Authenticating System 120 of FIG. 1A, and a Tag validating system comprising:

a) a switch 125 which is closed to output the Hash-Value Tag subsequent to the Hash Digesting sequence;

b) a Hash-Value Tag validator 195 to compare computed Tags against stored Tags;

c) a Hash-Value Tag Store 190, operative to simultaneously output true Hash-Value Tags relevant to the application file that the Data Authentication System 120 has digested.

Same Index Tag words from the Data Authentication System 120 and the Hash-Value Store 190 are simultaneously input into the bitwise XOR gate 3020. Example word sequences 1800 from the Data Authentication System 120 and 1810 from the Hash-Value Store are bitwise summed in XOR gate 3020 operative to output an example result sequence 1820. Any detected false bits, e.g., mistaken $D_{16}$ ($1101_2$) in sequence 1800 appeared instead of $9_{16}$ ($1001_2$) such that the detecting word $0004\ 0000_{16}$ is more than zero, and the "More than Zero" Comparator 3015 outputs a bit sequence 0100, denoting that the second word of data sequence 1820 is faulty.

Typical but not limiting uses of the efficient fast, low energy hashing functions of certain preferred embodiments, typically in conjunction with the stream cipher and true random number generation functions of certain preferred embodiments of this patent include:
   a) a Hash-Value Boot Tag 1900, to ascertain virus-free, typically perfect booting of a computing device;
   b) an automobile manufacturers keyed Tag 1905, assuring that rogue mechanics cannot enable damaging changes of automobile engine parameters;
   c) a Tag 1910 to enable secured downloading of television (TV) Messages;
   d) a Tag 1915 to certify initialization of business groups' (Corporation) mobile telephones; and,
   e) a Tag 1990 to protect rogue initialization of a communication link to a Corporation Hotline.

Vulnerable Word Manipulators are now described.

Figure 2A:
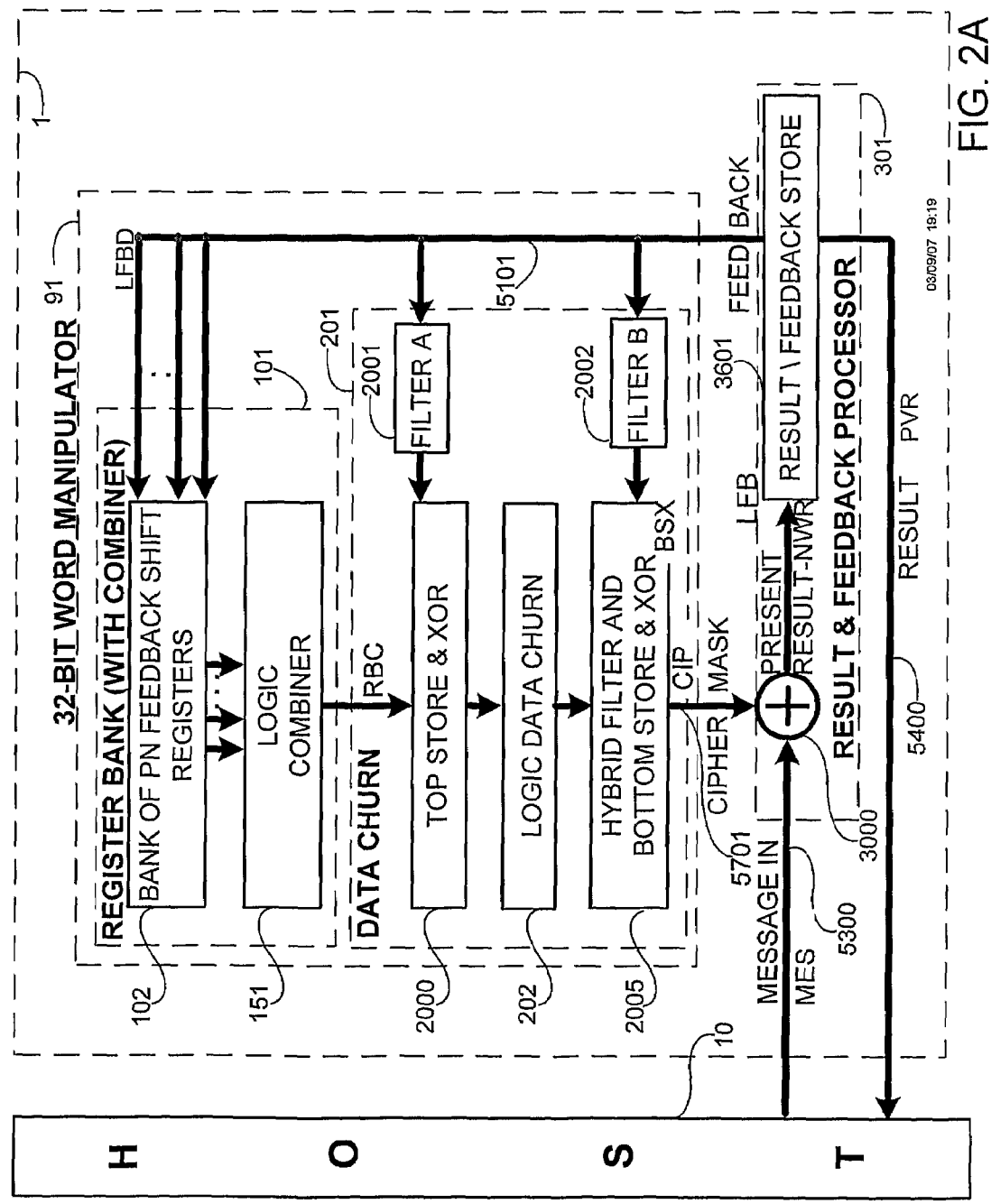
FIG. 2A is a simplified block diagram illustration of a class of hardware Word Manipulator apparatus which is typically susceptible to classical Message Word modification attacks.
Figure 2B:
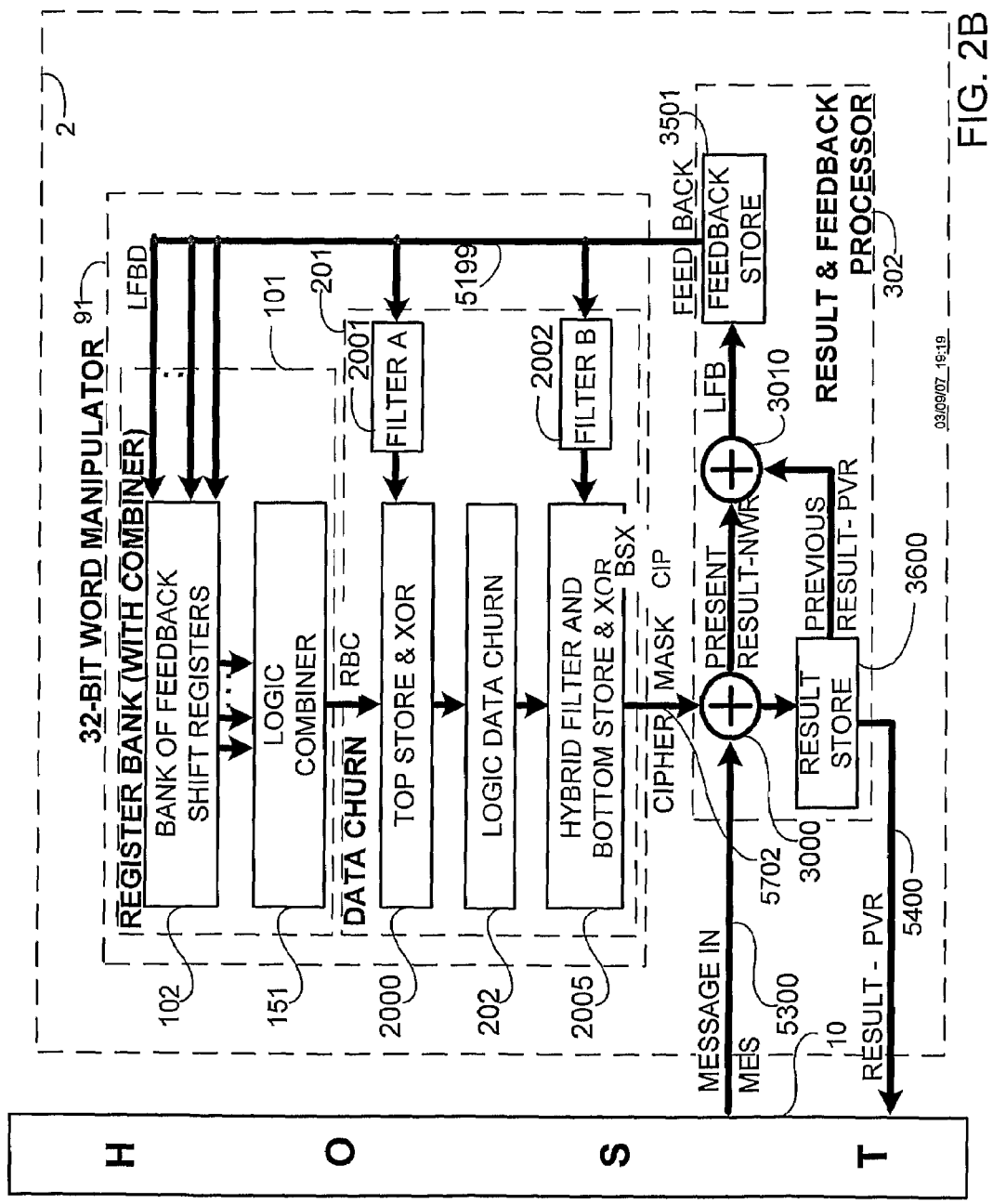
FIG. 2B is a simplified block diagram illustration of a configuration similar to FIG. 1 wherein the word Feedback is the XOR sum of the Previous and Present Results; it is appreciated that simple Message modification with complete short term reconciliation to valid states is impossible, even if an omniscient attacker can freely manipulate Message Words.

FIGS. 2A and 2B depict two simplified data authentication architectures, which are a subset of functions in certain preferred embodiment, with a single Message Word modifying feedback. The purpose of these two demonstration Engines is to intuitively present the dangers of single track feedback data authentication systems with massive diffusion, where the adversary can control feedback to the pseudo-random number generating Word Manipulators. It is assumed that the astute adversary who knows the architecture has chosen auspiciously, which Message Words can aberrate the Engine without affecting external parameters. A poor choice typically obviates any chance of success.

The 32 bit Word Manipulators 91 of Engines 1 and 2 of FIGS. 2A and 2B are identical.

FIG. 2A is a "Hash Attacker's Delight", as the adversary knows the method and apparatus of the simple Engine, and typically generates a meaningful pre-image attack by contriving four consecutive Message Words MESs (input via transmission lines 5300). In the Result and Feedback Processor 302 of FIG. 2B one memory buffer was added (not identical to Result and Feedback Processor 301 FIG. 2A), the Result Store 3600. Result Store 3600 in FIG. 2B cannot be in a valid state after a first falsified Message Word has been introduced; if subsequent Message Words are either reconciling words, or original valid words. If the last Hash/MAC Digest Result Store content is false, the Hash-Value/MAC Tag is false and the attack fails.

In both Engines 1 and 2, the attack starts with a true state space following valid initialization and a series of j valid 32 bit Message Words MESS, input via parallel transmission lines 5300. For simplicity it is assumed $1 \leq j$. The true Message Words MESs have been XORed to a true Cipher Mask, the output of Bottom Store & XOR 2005 BSX, to produce a feedback word to be stored in 3601 in FIG. 2A and Feedback Store 3501 in FIG. 2B. The output feedback word output (delayed) on the next cycle, LFBDs on transmission lines 5101 and 5199 in FIGS. 2A and 2B, is true, and is XOR summed into the valid state Register Bank 102 on the next clocked cycle. As Register Bank 102 is in a valid state, the deterministic Logic Combiner 151 of the Register Bank with Combiner 101, outputs a valid word RBC into the Data Churn 201. The Logic Combiners 151 have no memory, and the output RBC is only a function of its inputs. Therefore if an input is true, the output is also true; similarly, if the input is false, the output is typically but not provably false.

Simultaneously, feedbacks on transmission lines 5101 and 5199 (FIGS. 2A and 2B) are input into the Top and Bottom Store & XORs in 2000 and 2005, via Filters A and B, 2001 and 2002. Filters 2001 and 2002 in certain preferred embodiments are deterministic rotations of the input words. As the Filters are deterministic, if feedback words on transmission lines 5101 or 5199 are valid, Filters A or B outputs are valid respectively. If Filter A and B inputs are false, their outputs typically corrupt the binary state variables in the Data Churn 201.

Store & XOR buffers in all embodiments output XORed previously clocked input with a presently clocked input. A typical Store & XOR cell, 2205 is shown in FIG. 3B. In FIG. 3B the storage cell 6025 "waits to accept" the NXOR summed in 6015 input bit $X_{(i,t)}$ output from XOR 6013 of the Hybrid Filter of FIG. 3A, with a complemented feedback bit $F'_{(k,t)}$ at the next clock, where k≡i+7 mod 32; and during the present clock interval XOR 6010 generates the Store & XOR cell output $Y_{(i,t)}$ comprising XOR sums of $X_{(i,t-1)} \oplus F_{(k,t-1)}$ and $X_{(i,t)}$. Note that in certain preferred embodiments of FIGS. 6, 10 and 12, the LFBD feedback is not fed to the Bottom Store & XOR as shown in FIG. 3 to reduce correlation between the Cipher Mask word CIP and LFBD.

Assume at clock cycle j+1, a first false Message Word $MES_{j+1}$ in FIGS. 1 and 2 causes an immediate false $LFB_{j+1}$ word "waiting" to be input into Result\Feedback Store 3601 in FIG. 1 and into Feedback Store 3501 in FIG. 2. One clock later output $LFBD_{j+2}$ on lines 5101 and 5199 is "waiting" to corrupt the Register Banks 102 and the Data Churns 201 in FIGS. 1 and 2, at the start of the j+3'th clock cycle. During the j+1 and j+2 cycles, $CIP_{j+1}$ and $CIP_{j+2}$ Cipher Masks were true, as the 32 Bit Word Manipulators 91 in FIGS. 1 and 2 were in a valid state. At the j+3 clock $CIP_{j+3}$ is almost surely false, as the Register Banks 102 and the Data Churn 201 have been corrupted by feedback.

On the j+3'th clock we are sure that the active shift registers in the Register Banks 102 and that the Top 2000 and Bottom 2005 Store & XORs stores' outputs contents are false, as they are corrupted by the feedback word generated two cycles earlier, $LFB_{j+1}$. If the inputs into the Logic Combiners 151 and or the Logic Data Churns 202 are all true, the respective outputs are true. However, false inputs do not necessarily produce false outputs. The Data Churns 201 are corrupted by the feedback word $LFB_{j+2}$ as it was "aimed at the moving targets" in the Register Banks 102.

As seen in FIG. 3, a false $X_{(j,t)}$ or a false $F'_{(k-7,t)}$ input into Store & XOR cell 2200-i (caused by an $F_{(k,t-1)}$ false feedback bit into the Register Bank 101 or the shifted 7 left feedback bit) is operative to affect the result of the Storage Cell 6025 in the t+1 clock cycle; and a false input $X_{(i,t)}$ is operative to affect a false $Y_{(i,t)}$. If both the Storage Cell output and the Hybrid Filter 2100-i output are false, the cell output into the Cipher Mask output is true. If one or the other only is false the output is false. In very rare cases, are all the bits in the $Y_t$ outputs of the stores in FIGS. 1 and 2 true if one or more LFB bits were false. However, if all of the scrambled input bits into the filter cell 1650 emanating from the RBC output and all the feedback F' bits are true for four consecutive clock cycles, the Top and Bottom Store & XORs in 2000 and 2005, respectively can harbor no trace of previous false inputs. Note that complex permutations without memory are not real impediments for this Message modification attack.

We know that the Register Banks 102 are corrupted by a first false word. We are not sure if the outputs in FIGS. 1 and 2, $RBC_{j+3}$ are corrupted, neither do we know if an individual bit was or was not falsified in the Store & XORs. As in preferred embodiments, a single false feedback variable diffuses to 8 or 9 binary variable equations of an RBC word and to most of the binary equations of the Cipher Mask CIP. We know that the contents of at least two tiers in the bank of feedback shift registers of 102 have been corrupted by the first false feedback word, and we are reasonably sure that the contents of both the Top and Bottom Register Stores in 2000 and 2005 are corrupted. We know that the Cipher Mask CIP is almost certainly but not provably false. (Only a rare combination of at least 2 corrupt values typically leads to a true Cipher Mask CIP output from Bottom Store & XOR 2005.)

A determined attacker has the resources to make an intelligent guess (in a MAC application) or find a way (see FIG. 5) to contrive a j+2 second false Message Word MES (in a Hash Application) that can reconcile all corrupted bits in the Register Bank 102 state variables. If false state variables of the Register Bank have been reconciled, then all state (stored memory) variables of the Register Bank are true, and the outputs of the Register Banks 101, RBC, feeding the Data Churn are true.

As this second reconciling feedback was false, we typically assume that the contents of the storage memory of the Top and Bottom Store & XORs in 2000 and 2005 are probably false and in all probability the Cipher Masks $CIP_{j+3}$ are false. We are sure that the contents of Result\Feedback Store 3601 of FIG. 1, and Result Store 3600 of FIG. 2 were false for the j+1 and j+2 clock cycles, as the j+1 and j+2 Message Words $MES_{j+1}$ and $MES_{j+2}$ which generated the first false and reconciling (also false) feedback were false. Remember, a false Message Word affects the Register Bank and Data Churn delayed by two clock cycles.

In FIG. 1 the feedback word $LFB_t$ that are actively combined in the Word Manipulators 91, two clocks later, is the XOR sum $MES_t \oplus CIP_t$;
therefore the contrived Message when the hash hacker knows the expected or desired $LFB_t$ and $CIP_t$ is:

$MES_t = CIP_t \oplus LFB_t$, which is quite simple.

In FIG. 2 $LFB_t$ the feedback word that is actively combined two clocks later is the XOR sum of $MES_t \oplus CIP_t$ XORed to the Previous Result $PVR_t = (MES_{t-1} \oplus CIP_{t-1})$ therefore the contrived Message when the hash hacker knows $LFB_t$ and $CIP_t$ is:

$MES_t = CIP_t \oplus LFB_t \oplus PVR_t$–not simple, if $PRV_t$ contains "recent history"–

$MES_t = CIP_t \oplus LFB_t \oplus (MES_{t-1} \oplus CIP_{t-1})$.

The identical Word Manipulators 91 of FIG. 1 and FIG. 2 must typically be sustained in a valid condition for the remainder of the Hash digest, in order to produce a valid Hash-Value, see FIG. 11.

As described in the following demonstration steps the architecture of the Engine 1 of FIG. 1 is vulnerable, and that after four false Message Words, its Word Manipulator 91 is in a true state and able to continue the Hash/MAC digest with valid Message Words. The Engine 2 of FIG. 2 employs contrived Message words for every subsequent clock cycle until the completion of the Hash/MAC digest process to maintain the Word Manipulator 91 in a valid state. As a result, the subsequent contents of its Result Store, PVR are never true, and the process of FIG. 11C can never yield a valid Hash-Value Tag.

At the start of the falsification/reconciliation sequences of FIGS. 1 and 2, the j Valid Message Words generated a unique valid condition. We execute the next five steps and analyze the weaknesses of both architectures.

Step 1
The adversaries contrive an auspicious false Message Word, typically identical in both architectures, and the feedback is by definition false.
FIG. 1—$MES_{j+1} = CIP_{j+1} \oplus \overline{LFB_{j+1}}$; false feedback defines a contrived Message.
FIG. 2—$MES_{j+1} = \overline{(CIP_{j+1} \oplus LFB_{j+1}) \oplus (MES_j \oplus CIP_j)}$;
the Previous Result $PRV_{j+1} = (MES_j \oplus CIP_j)$ was true.

Step 2
The adversaries each contrive a reconciled Message Word. In both architectures the feedback and the Message Word are by definition false. In Step 1 the adversary carefully prepared a typically meaningful new Message Word, typically knowing what feedback is necessary to reconcile the Register Bank to a valid state.
FIG. 1—$\overline{MES_{j+2}} = CIP_{j+2} \oplus \overline{LFB_{j+2}}$; feedback defined false, the Message is contrived.
FIG. 2—$\overline{MES_{j+2}} = CIP_{j+2} \oplus \overline{LFB_{j+2}} \oplus (\overline{MES_{j+1}} \oplus CIP_{j+1})$; the Message Word compensates for two provably false variables;
the Previous Result $\overline{PRV_{j+1}} = (\overline{MES_{j+1}} \oplus CIP_j)$ was false.

Two clock periods later, typically, the Register Banks 102 are reconciled. $MES_{j+2}$ in FIG. 2 is provably false, because of the overlapping of Previous Result and Present Result false bits, caused by the moving nLFSRs, the moving target. This assures that the Present Result $\overline{NWR_{j+2}} = \overline{PRV_{j+3}}$ is provably false.

Step 3
The adversaries each contrive new Message Words $MES_{j+3}$. In both, the feedback must be true to maintain the Register Bank 102 in a reconciled state, and to continue, one level downwards to reconcile the Top Store & XOR 2000. The hacker knows (or guesses) the valid original feedback word $LFB_{j+3}$; remembers or guesses $PRV_{j+3}$ and learns or guesses the output $CIP_{j+3}$; he "remembers" that the reconciled Register Bank 101 output $RBC_{j+3}$ is true and the feedback into the Data Churn is true; as the inputs into the Top Store & XOR are true the output of the Top Store & XOR are true in this cycle, but the Bottom Store & XOR is typically false and causes the output $CIP_{j+3}$ to be typically false;
FIG. 1—$\overline{MES_{j+3}} = \overline{CIP_{j+3}} \oplus LFB_{j+3}$; feedback is true, the Message is probably false.
FIG. 2—$LFB_{j+3}$ is true and $\overline{PRV_{j+3}}$ is provably false; then $\overline{PRV_{j+4}}$ and future $PRV_s$ are false.
$\overline{LFB_{j+3}} = \overline{NWR_{j+3}} \oplus \overline{PRV_{j+3}}$; if one factor is false, the second must also be false. All future $NWR_{j+k}$s are false, assuming correctly that the feedback $LFB_{j+k}$s are true.

$LFB_{j+k} = \overline{NWR_{j+k}} \oplus \overline{PRV_{j+k}}$;

and therefore; future PRVs and NWRs are false (contrived) if the feedback is true.
$\overline{NWR_{j+3}} = \overline{PRV_{j+4}}$ both factors are provably false.
$\overline{MES_{j+3}} = \overline{CIP_{j+3}} \oplus LFB_{j+3} \oplus \overline{PRV_{j+3}}$ Step 4
Typically, the adversaries each contrive unique Message Words. The contrived feedback is by definition true to maintain the Register Bank 102 in a reconciled state, and to continue, one level downwards, as the output of the Top Store & XOR 2000 is true, to reconcile the Bottom Store & XOR 2005, to generate a true $CIP_{j+5}$ on the next clock.
FIG. 1—$\overline{MES_{j+4}} = CIP_{j+4} \oplus LFB_{j+4}$; the generated feedback is true, the Message is probably false.
FIG. 2—$\overline{MES_{j+4}} = CIP_{j+4} \oplus LFB_{j+4} \oplus (\overline{MES_{j+3}} \oplus CIP_{j+3})$; $\overline{PVR_{j+4}}$ is false.
On the next clock, the Bottom Store & XOR are typically reconciled and $CIP_{j+5}$ is true.

Step 5
Adversary of FIG. 1 now continues sending valid Message Words, knowing that his Engine is in a valid state.
Adversary of FIG. 2 has lost the game, as although his Word Manipulator 91 is in a valid state, his Result Store 3800

"remembers" a random false trace from each previous false Message Word and his Engine 2 cannot be reconciled to a completely valid state.

FIG. 1—$MES_{j+5}=CIP_{j+5}\oplus LFB_{j+5}$; the generated feedback is true, the Message is true. Clearly, if the hacker was astute, there are no traces in the Engine of FIG. 1 of any false Messages.

FIG. 2—$MES_{j+5}=CIP_{j+5}\oplus LFB_{j+5}\oplus PVR_{j+5}$. $PVR_{j+5}$ is shown herein to be false.

and therefore, if the Word Manipulator is in a valid k state; $CIP_{j+k}$ is true;

and the feedback $LFB_{j+k}$ is true, and the $PVR_{j+k}$ is false: $MES_{j+k}=CIP_{j+k}\oplus LFB_{j+k}\oplus PVR_{j+k}$. $\overline{PVR_{j+k}}$ the Message Word $\overline{MES_{j+k}}$ is contrived, and false.

Conclusion:

The architecture of FIG. 1 is extremely vulnerable to attack if the adversary can know the state of the Engine at any clock cycle. After the reconciliation cycle only two valid cycles were needed to remove any trace of a Message modification.

The architecture of FIG. 2 looks to be much less vulnerable; however it is subject to an adversary's gaining control over the Word Manipulator 91, which may be considered a weakness.

Note that if It is assumed that the externally driven permutations affecting the Data Churn 201 are valid; then the permutations affecting the Data Churn 201 typically cause seemingly intractable complex "scrambles"; but there are still many instances wherein all inputs are valid for just a few cycles, wherein the Data Churn 201 can be reconciled and later maintained in a valid state. It is assumed that the hacker is typically aware of the permutation changes affected by the Random Controller 70. As stated before, it is assumed that the adversary is astute, chooses a favorable word and flips the most auspicious bits.

Figure 9:
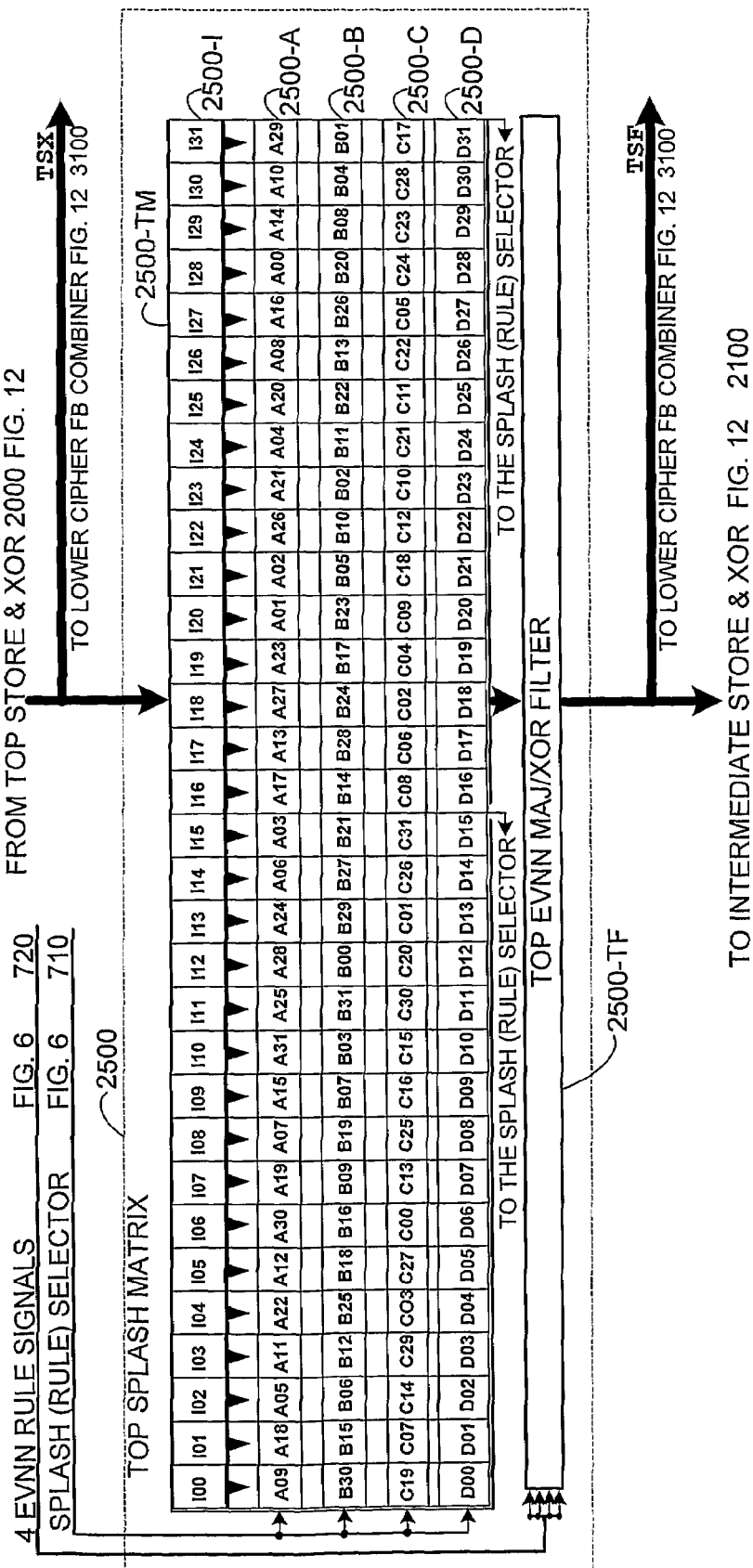
FIG. 9 is a simplified block diagram which illustrates the displacement architecture of the Top and Bottom Splash Matrices and the relations to the Random Controller architecture of the Data Churn.

FIGS. 3A and 3B together depict a single cell which inputs 6 binary variables at Primary Clock times t−1, and t from the Bottom Splash Matrix 2550-BM, FIG. 9 and from the Random Controller 70, and the LFBD i+7'th feedback bit from the vector on transmission lines 5100 of FIG. 6.

In FIG. 3A one sees how four near neighbors from identical to Splash Matrix 2500 FIG. 9; $H_{(i-2,t)}$, $H_{(i-1,t)}$, $H_{(i, t)}$ and $H_{(i+1, t)}$ from the Bottom Splash Matrix 2550 are diffused with one of four EVNN signals $E_{(j,t)}$ from the Random Controller 70 of FIG. 6 into the i'th cell of the hybrid filter 1650. Note-Bottom Splash Matrix 2550 and Top Splash Matrix 2500 are identical. Top Matrix 2500 is shown explicitly in FIG. 9.

The two "left hand" Splash Matrix variables $H_{(i-2,t)}$ and $H_{(i-1,t)}$ and the EVNN variable $E_{(j,t)}$ from the Random Controller 70 are input into the non-linear MAJ (2 of 3 Majority Gate) 6000 whose circuitry is depicted in FIG. 7C. The output of the MAJ gate $M_{(i,t)}$ is XOR summed in the 3 XOR gate 6013 with $H_{(i,t)}$ and $H_{(i+1,t)}$ into signal $X_{(i,t)}$ the output of the Hybrid Filter Cell. $X_{(i,t)}$ is the input into the i'th cell 2200-i of Store & XOR 2200 FIG. 9.

At Primary Clock t−1 Filter 1650 output $X_{(i,t-1)}$ is NXOR summed with $F'_{(k,t-1)}$ the LFBD i+7'th feedback bit from the vector on transmission lines 5100 of FIG. 6. At clock t, the modular sum $X_{(i,t-1)}$ NXOR $F'_{(k,t-1)}$ is output from the Store & XOR storage cell 6025 which is XOR summed in XOR 6010 to $X_{(i,t)}$ to generate the cell output $Y_{(i,t)}$. $Y_{(i,t)}$ is the i'th bit of the Bottom Store & XOR BSX which is also the Cipher Mask CIP.

Explicitly, $$Y_{(i,t)}=[MAJ_{t-1}\{E_{(j,t-1)},H_{(i-2,t-1)},H_{(i-1,t-1)}\}]\oplus[H_{(i,t-1)} \oplus H_{(i+1,t-1)} \oplus F_{(k,t-1)}]\oplus[MAJ_t\{E_{(j,t)},H_{(i-2,t)},H_{(i-1,t)}\}]\oplus[H_{(i,t)}\oplus H_{(i+1,t)}]; \text{ and that}$$

$Y_{(i,t)}$ is a function of 4+4 scrambled Data Churn bits; 1+1 Random Controller Bits and one Feedback bit; 5 variables from the present clock cycle, and 6 binary variables from the previous clock cycle. Note that in certain preferred embodiments of FIGS. 10 and 12, Data Churn 200, LFBD is fed into the Top 2000 and Intermediate 2100 Store & XORs only.

Figure 4A:
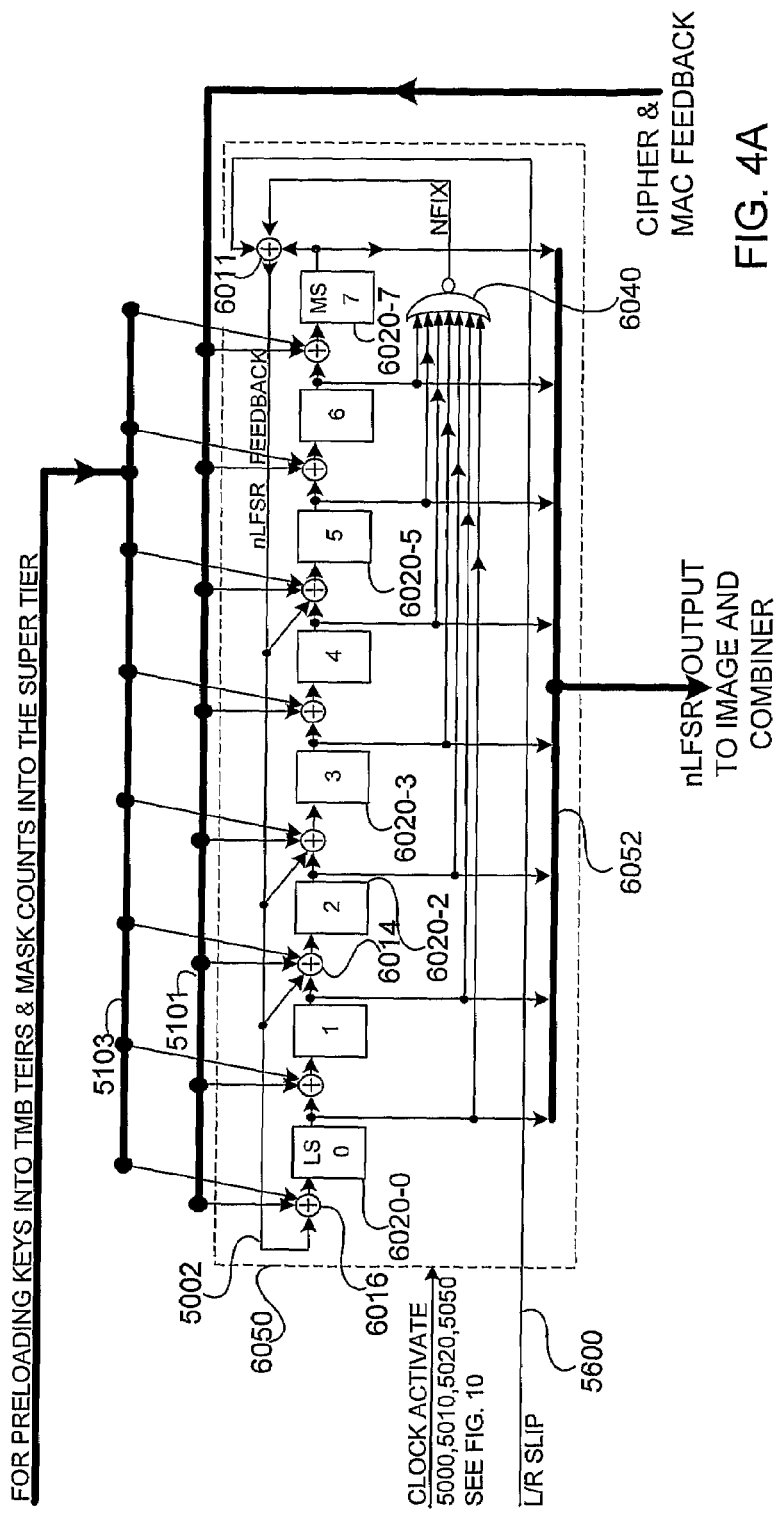
FIG. 4A is a simplified block diagram illustration of typical input and output variables; and the pseudo-random essentials of the 8 non-linear Feedback Shift Registers (nLFSRs) in certain preferred embodiments. The table of FIG. 4B documents the maximum length tap configurations of the left and right hand nLFSRs of the 4 tiers of the Register Bank.

FIG. 4A illustrates a design of a "One to Many" type non-Linear Feedback Shift Register, nLFSR 6050. As these shift registers generate maximum periodic length sequences they are often called pseudo-random number generators. FIG. 4A is a circuit paradigm for each of the eight nLFSRs incorporated in the four tiers of the Register Bank 100, see FIGS. 10 and 12, Super Tier 1000 and Top, Middle, and Bottom Tiers 1100, 1200 and 1300 (the TMB tiers 110) respectively. In each Tier there are two nLFSRs; a Left Hand and a Right Hand nLFSR. The fact that falsified bits in shift registers rotate helps us assure that feedback streams are orthogonal, in that the bits that an adversary tries to reconcile are illusive "moving targets".

The essential building block of feedback shift registers is the single bit memory cell 6020-m, where $0 \leq m \leq 7$ in FIG. 4A. Memory cells 6020-m are typically D flip-flops, wherein the input becomes the output when the cell is clocked, as in the storage cell 6025 in FIG. 3B.

Between the 6020-n memory cells are taps; e.g. 6014; wherein the nLFSR feedback signal output from 3XOR gate 6011 on 5002 is XORed to tapped data bits progressing left to right between the cells. Each of the eight nLFSRs has a unique construction, defined by the number of memory cells and the placement of feedback taps between cells, e.g., 8 cells and taps defined as 1, 2, 4, 7 feedbacks in the construction of FIG. 4A. At each activating clock signal on clock lines, 5000, 5010, 5020 and 5050 in FIG. 10, the data content of each cell moves one cell to the right; nLFSR feedback on signal line 5002 is XORed into XOR gates preceding memory cells 6020-0, 6020-2, 6020-3 and 6020-5, corresponding to taps defined as 1, 2, 4 and 7 in the typical nLFSR definition box 6053. Note that the MS cell 6020-7 is the rightmost cell. The MS output is the principal randomizing source of the nLFSRs. Two other inputs to 3XOR nLFSR feedback gate 6011 convert the basic module to a non-linear device.

The pseudo-random Left or a Right Hand Slip pulses on command line 5600 aberrates the normal output sequence states of the memory cells.

In an m bit nLFSR, if the m−1 LS cells have zero content, the NFIX NOR gate 6040 generates a "1". In such a case, the NFIX "1" output complements the normal nLFSR feedback. If the MS cell's polarity is "1", this "feeds back" a "0" which generates the all zero stage. If the MS bit value is "0" and the m−1 LS cells are in the all zero state, the NFIX generates a "1"; causing, the nLFSR Feedback to be "1", forcing a "1" into cell outputs 1,2,4 and 7, generating the $10110100_2$ register stage. Assuming the low probability that a single simple nLFSR, which receives feedback is in the all zero stage, and the low probability that a same cycle feedback word is also in the all zero stage, the NFIX NOR gate 6040 is typically superfluous.

A formal description of an nLFSR (without parallel feedback and load vectors):

a) Number of Cells (m)=8
b) Number of Taps=4
c) Sequence Length=$2^m$=256
d) Tap Sequence is 1, 2, 4, 7→Polynomial=0×96

The Cipher and MAC Mode feedbacks are circulated to the nLFSRs of the tiers via transmission lines 5101. At every clock activation, each bit of the Cipher or MAC feedback is XOR combined with the output of the previous memory cell, with the tapped nLFSR feedbacks (only into designated cells) and with the output of transmission lines 5103.

In keyed Hashing and in normal Stream Ciphering, the Top, Middle and Bottom Tiers are initially preloaded with key values from transmission lines 5103. In normal single Engine Hashing, a HAIFA counter input 5103 is XOR combined as depicted into the Super Tier, In multi-Engine configurations, see FIGS. 16 and 17, (see Super Tier feedback 5200 in FIG. 6) Super Tier feedback of Left Hand less significant Engines is "shared-XORed" with Right Hand neighbors via transmission lines 5103.

An nLFSR m celled output in output bus 6052 is juxtaposed with its 32-m celled nLFSR pair.

Tables 6050-L and 6050-R define the attributes of all of the nLFSRs in the Register Bank. Note that in the tables the longest bit interval between taps is 5, and most taps are located less than 3 bit intervals.

As shown, Random Controller 70 FIG. 6 generated Left or Right Slip permutation bit signals are operative to complement the "normal" MS feedback in the Left or Right TMB 110 Tiers' nLFSRs. The occasional Slip permutation signal affects a change of the normal nLFSR sequence. For example, if a present nLFSR stage is 01010100, the nLFSR feedback is typically "0", and the next stage is typically 00101010. However, if the Slip caused a "1" feedback, the next stage is typically 10011110; and typically includes 4 bits which differ from the normal bit value in the stage. This stage is randomly distanced in the sequence of stages.

Figure 4B:
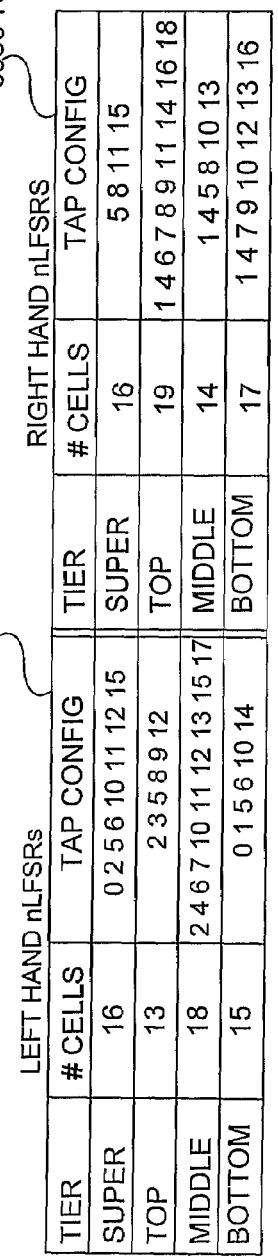

In the multi-tapped "One to Many" nLFSR 6050 as depicted in FIG. 4, with a probability of 0.5, a bit traversing from left to right is flipped at each tap. With multiple taps this generates local unpredictability of the parallel output. In the conventional "Many to One" nLFSR, the XOR taps are joined together externally. In the Many to One configuration a "1" or "0" travels from the left hand LS cell to the right hand MS cell unchanged leading to local predictability.

Figure 5:
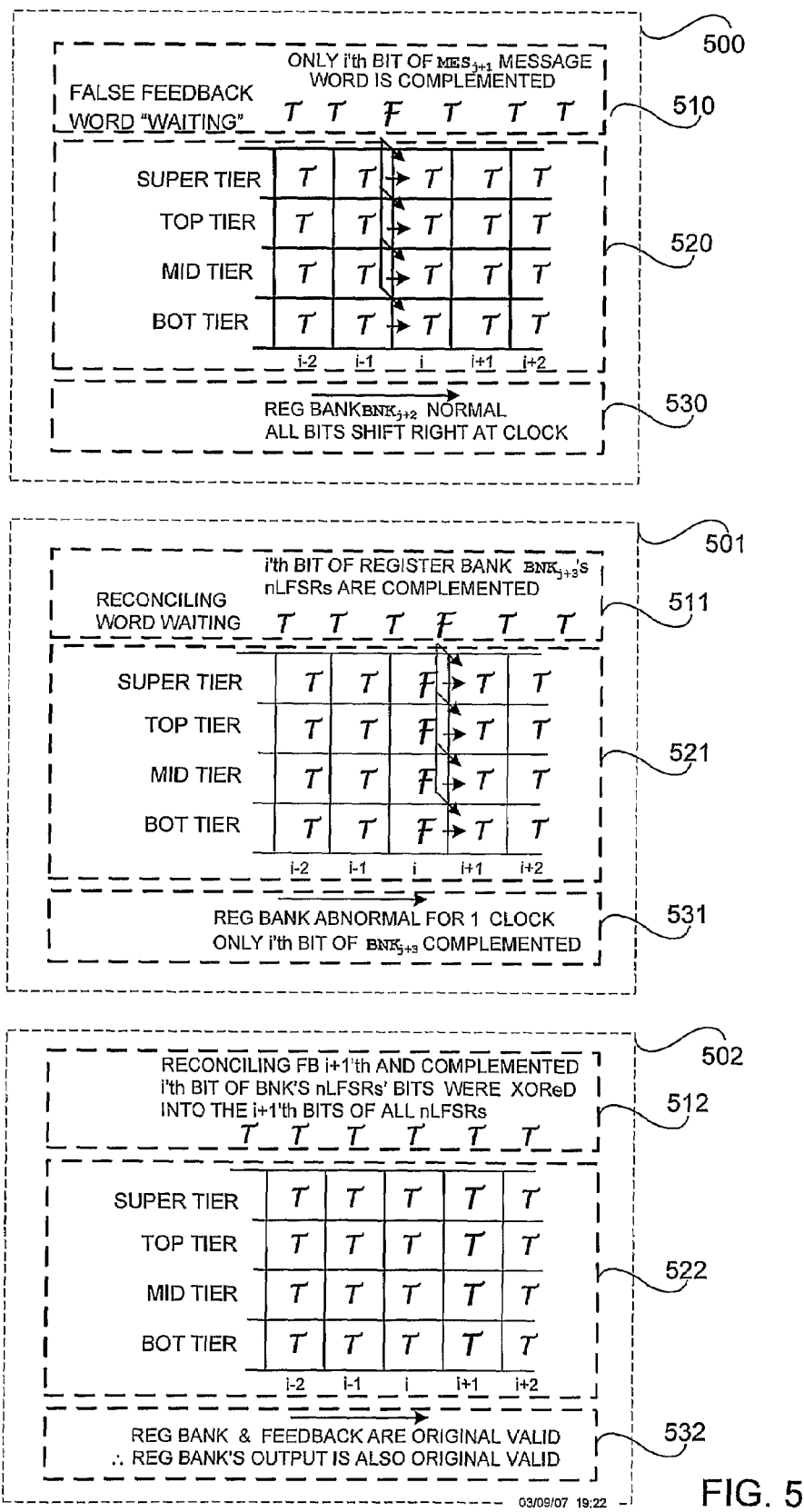
FIG. 5 is a simplified block diagram illustration showing how a faulty bit in a first Message Word via a single feedback configured Register Bank can, in auspicious circumstances, reconcile the Register Bank with a second faulty bit.

Methods for Smart Reconciliation of False Bits in the Architectures of FIGS. 2A and 2B are now described. FIG. 5 is a self explanatory set of three blocks, 500, 501 and 502 wherein the contents of four concatenated tier nLFSRs; the Super, Top, Mid(dle) and Bot(tom) in 520, 521 and 522, all are clocked simultaneously. A faulty i'th bit in 510 in block 500 is ready to be fed into the four registers of 520 on the next clock. Bit variables in 520 are all true at the present clock. The Register Bank output 530 from block 500 "sees" a valid state as all bits are true values.

In block 501, a false reconciliation bit in the i+1'th feedback cell of 511 is poised to "reconcile to true" bits in the four tiers of 521. The false content of the tiers in 521 causes a false output (for one clock cycle only) in the Register Bank output 531.

In block 502, at the third clock, feedback 512 is true, the false reconciliation bit XORed to the pinpointed false register bits in the four tiers of registers 521 has reconciled the faulty bits in register bank 521, such that the Register Bank output 532 is true. No trace of the false feedback is left in the Register Bank.

Up to 28 bits are candidates to be complemented and reconciled in a Message, under auspicious circumstances, e.g., if the MS bit of a feedback shift register, an nLFSR, is complemented; it uniquely falsifies one nLFSR in the Register Bank in a way that defies reconciliation. If the MS bits of all tiers are complemented, four nLFSRs are uniquely falsified; and all four uniquely falsified nLFSRs must be typically reconciled in the subsequent clock cycle. As all falsified feedback words can not be simultaneously reconciled, the attack fails.

Astute hackers may maintain valid feedback which neutralizes the Random Controller 70. The Engine 50 of FIG. 6 is a simplified block diagram of the Engine of certain preferred embodiments, showing the interface 5500 between with the Random Controller 70 and the 32 Bit Word Manipulator 100, and the interfaces between the three main modules, the Random Controller 70, the 32 Bit Word Manipulator 60 and the Result/Feedback Processor 300 and the Host interface 10.

It is assumed that the astute adversary developed a tactic that assured that all feedbacks in the interface 5500 were valid during the falsification, reconciliation process in the 32 Bit Word Manipulator 60. Hence, a reasonable assumption is that the Permutation Controls to the Register Bank 100, the signals emanating from the Splash Select 710 and the EVNN Dispersions 720 emanating from the Random Controller 70 are not perturbed. Obviously, the astute adversary does not interfere with the Host Initialization, or the Sample signals emanating from the Host 10. The 24 Bit Counter 712 output "HAIFA Count" signals emanating from the are known to the adversary, and typically signify the number of generated Cipher Masks CIPs, a non-secret integer, which, as is apparent in data authentication protocols prevents pre-imaging. Messages MESs are input and Results PRVs are output via transmission lines 5300 and 5400 respectively.

The Result/Feedback Processor 300, receives signals from the Data Churn 200 which are processed into two parallel feedback streams LFBD and SUPD on lines 5100 and 5200, and also outputs normal Results NWRs which are input into the Result Store 3600 and are output one clock later PRV on lines 5400 to the Host 10.

Lower Feedback LFBD on lines 5100 circulates two versions of feedback to the Data Churn 200. The top LFBD track into the Data Churn 200 is rotated 13 cells to the right; and the bottom LFBD track into the Data Churn 200 is rotated 7 cells to the left; the 3 LFBD tracks to the Register Bank 100 are not rotated. Super Tier Feedback SUPD is fed to the Super Tier of the Register Bank 100 via lines 5200.

Lower Cipher Feedback LWC is generated in the 32 3-bit AND gates in 3100. Super Tier Cipher Feedback SMX is transposed in the SuperMIX filter 3200.

Both Lower LWM and Super Tier MAC Feedbacks SUP in certain preferred embodiments are functions of the Message Word and one more parameter. The Lower MAC Feedback LFBD on transmission lines 5100 consists of the XORed sum in 3010 of the output of XOR combiner 3000, the Present Result NWR and the output of the Result Store PRV 3600. The Super Tier MAC feedback SUP is the 3030 XORed combination of the MAC MIX filter 3300 output MMX and the Super MIX filter 3200 output SMX.

The Super Tier Feedback Store 3650 accepts the output of the word XOR buffer 3030 during the formulation of the Super Tier feedback word SUP and outputs the feedback at the next clock. Similarly the Lower Feedback Processor 3500 accepts either the Lower Cipher Feedback LWC from 3100 when configured in Cipher Mode, or it accepts the Lower MAC Feedback LWM when configured in MAC Mode, in order to output Lower Feedback on the next clock cycle LFBD.

As we have assumed that the astute adversary has "neutralized" the relevance of the Random Controller 70 in our analysis of the adversarial attack, the future drawings and analysis typically disregards the Random Controller 70 and is more explicit in explaining the components of the 32 Bit Word Manipulator and the Result/Feedback Processor.

FIG. 7A depicts the basic architecture of the Register Bank 100 of certain preferred embodiments. The outputs of the TMB Tiers 110 (Top 1100, Middle 1200 and Bottom 1300

Tier) are combined in the 32 cells of the non-linear 2 of 3 Majority gates (MAJ in the drawings) depicted in FIG. 7B. FIG. 7C depicts a cell of the hybrid 4 tier combiner. All Tiers, Registers and Feedbacks output 32 bit words.

The Register Bank 100 contains two sets of tiers. The top tier set, the Super Tier 1000 accepts the Super Tier Feedback word SUPD which is a linear (without non-linear MAJ function 6000 components depicted in FIG. 7C) and is therefore dominant in assuring a balanced Register Bank Output RBC in 1665. The Top 1100, Middle 1200 and Bottom 1300 Tiers, (the TMB Tiers 110) are the least observable core parts of the 32 Bit Word Manipulator, are irregularly clocked and permuted. The outputs of the TMB Tiers 110 are combined in the 32 bit celled 2 of 3 Majority Combiner 1500; one cell of which is depicted in 6000 FIG. 7B and in FIG. 10 1650. The output of the 2 of 3 Majority Combiner is rotated 5 bits to the right into the image 1660 and XOR summed in the Super Tier to TMB TIERS combiner 1665 with itself; and also XORed with the output of the Super Tier 1000. The 4 Tier Combiner 150 processes the output to the Register Bank. One cell of the 4 Tier Combiner 150 is depicted in FIG. 7C, wherein the outputs of the four tiers are combined. The Super Tier 1000 output typically randomizes and balances the combined MAJ 6000 signals in FIG. 7C as it reasonable to assume and Die-Hard tests have proved that the combined outputs of the two sets of tiers are uncorrelated.

Note that the Super Tier also receives the "HAIFA" (Hash/MAC Count) input XOR summed to the SUPD Word. The "HAIFA" word is a simple count, and is not correlated to the SUPD word. This ploy was suggested by Eli Biham and Orr Dunkelman at the NIST Hash Forum, August 2006, is not related to the innovations of this patent. The latest update of the HAIFA article can be found in— www.cosic.esat.kuleuven.be/publications/article-934.pdf.

Figure 10:
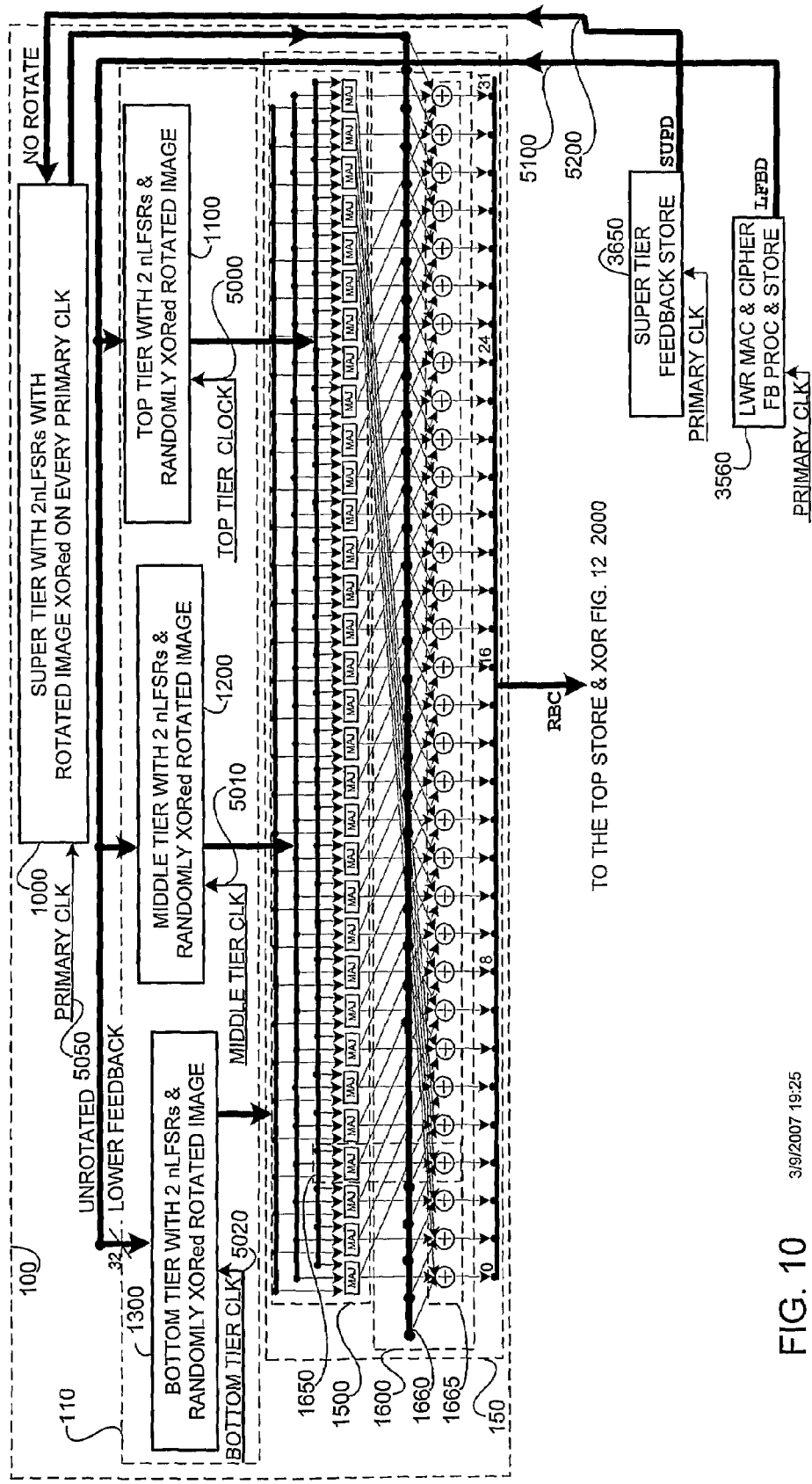
FIG. 10 is a is a simplified block and circuit diagram illustrating the interaction of the outputs of the 4 tiers of the Register Bank combined by the hybrid filter four tier combiner.

All four tiers are essentially the same construction, as described in FIG. 4. The Super Tier 1000 in FIG. 10 is activated on every clock, whereas the Top 1100, Middle 1200 and Bottom 1300 Tiers (the TMB Tiers 110) are randomly clocked.

Figure 8:
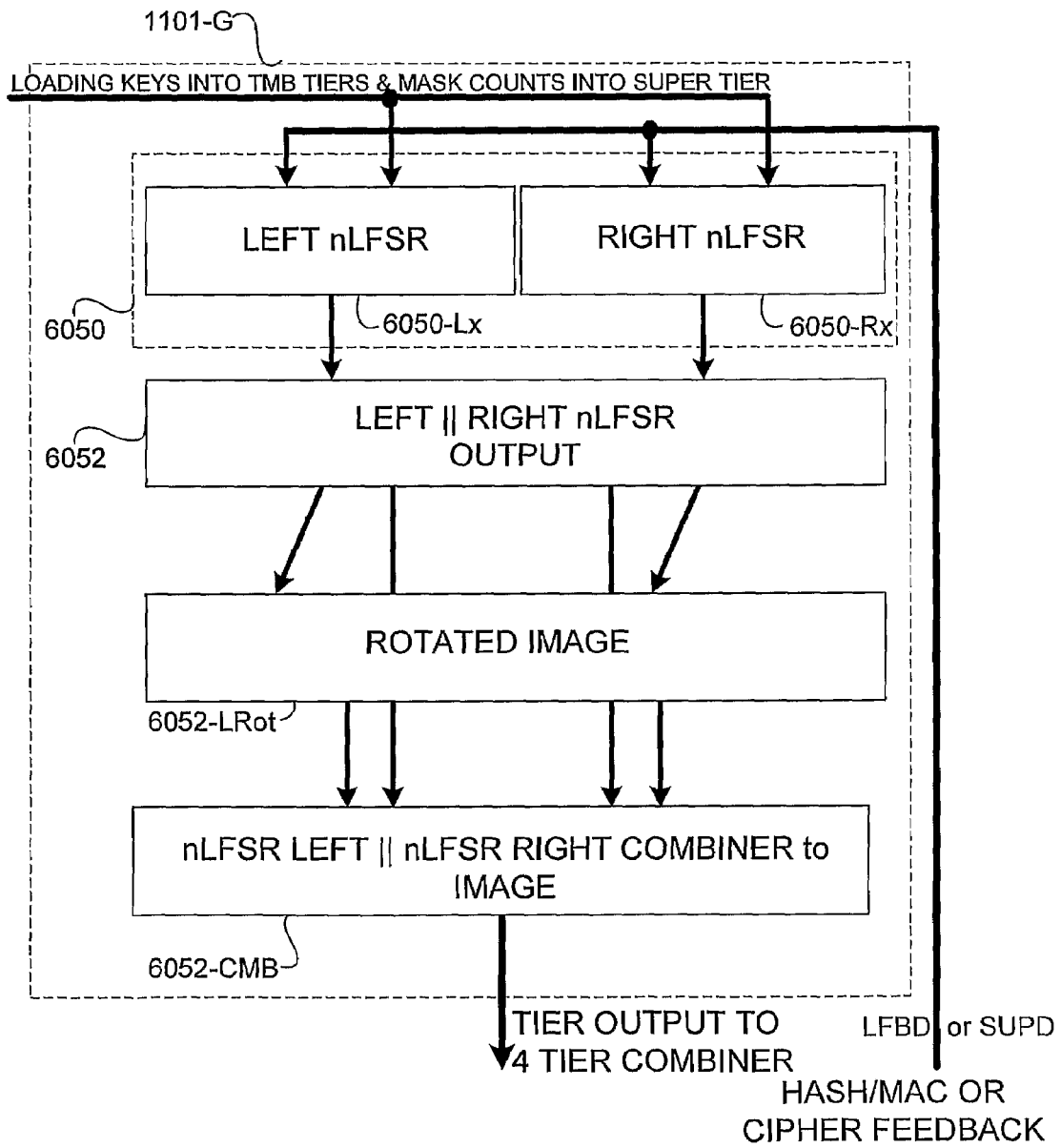
FIG. 8 is a simplified block diagram illustration of a structure of each of the four tiers of the Register Bank.

1101-G of FIG. 8 depicts the architecture of the four tiers of the Register Bank 100. In each of the four 32 bit tiers there are two non-linear feedback shift registers, nLFSRs, specified in tables 6050-L and 6050-R FIG. 4. The concatenated output of the nLFSR pair 6050 (6050-Lx∥6050-Rx) is left rotated. The rotated output is referred to as an Image 6052-LRot. The Super, Top, Middle and Bottom Tier Images are generated by left rotations of 7, 1, 3, or 5 bits, respectively.

At each clocked cycle a minimum of two of the four tiers is clocked at every cycle; wherein the Super Tier 1000 is clocked on every cycle and the Top, Middle and Bottom Tiers, 1100, 1200 and 1300 are each clocked on an average of about ⅚ of the cycles. A tier that is not clocked is stationary for the un-clocked cycle. The outputs of the nLFSRs are therefore unchanged and do not accept word feedback or Slips when a tier is not clocked.

Randomly XOR summing the Image 6052-LRot to the concatenated nLFSR output 6052 into the tier output combiner 6052-CMB; reduces the general Brownian motion type sense of left to right movement of data in the nLFSRs; and reduces local bias e.g., the occurrences of "1"s and "0"s are probably equal.

A left hand TMB 150 nLFSR 6050-Lx, receives an L/H Slip on line 5600 FIG. 4, on an average of about once in 9 Primary Clocks, which aberrates the feedback sequence as is shown in FIG. 4. Similarly, the right hand TMB tiers 6050-Rx, are R/H Slip affected on an average of about once in 9 Primary Clocks.

During initialization, the TMB tiers are parallel loaded. The Super Tier 1000 is not preloaded directly, and does not receive Slip signals to its nLFSRs. However, during data authentication processing the "HAIFA" Mask count is XOR summed to the SUPD feedback input to the Super Tier 1000.

The randomly combined Images of the TMB Tiers from 6052-CMB and the constantly XOR Image Combined output of the Super Tier are combined in the 4 Tier Combiner 1665 of FIG. 7A.

Figure 12:
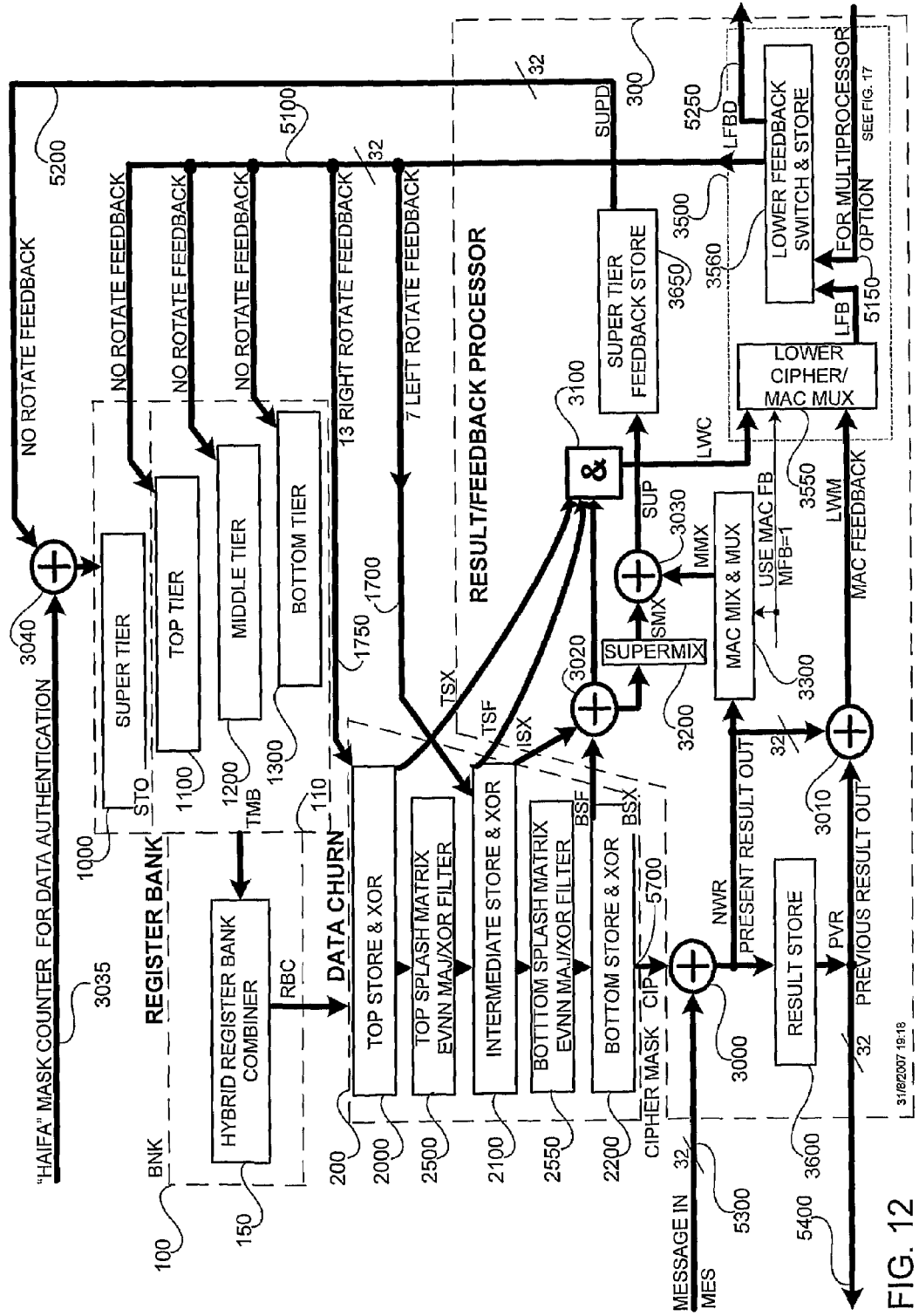
FIG. 12 is a simplified block diagram of the Register Bank, the Data Churn and the Result/Feedback Processor, wherein the word variable labels are shown to aid in understanding the description of orthogonality and of obviated Message modification.

The Splash Matrices Pseudo Randomly Scramble Data in the Churn. In FIG. 12 the Data Churn 200 receives:
a) the combined output of the Register Bank 100 RBC;
b) two rotated versions of the Lower Feedback LFBD,
  Right Rotate 13 bits>>>13 on lines 1750 into the Top Store & XOR 2000; and,
  Left Rotate 7 bits 7<<< on lines 1700 into the Intermediate Store & XOR.

Interspersed with 7 levels of processing, the Data Churn 200 outputs:
a) the Cipher Mask CIP; also the output of the Bottom Store & XOR 2200 and,
b) 4-32 bit words into the Result/Feedback Processor 300 as shown in FIGS. 10 and 12.

There are three Store & XOR processors, the Top 2000, Intermediate 2100 and Bottom 2200. A conceptual Store & XOR of the i'th cell 2200 of the Bottom Store & XOR is shown in FIG. 3B. At every clocked cycle, each Store & XOR receives a 32 bit data vector from one level above, with feedbacks (the Bottom Store & XOR does not receive Lower Feedback LFBD), and stores all inputs into its 32 memory cells. At the next clock cycle the output is the previous input value XORed with the present input value. In the Storage Cell 6025 of FIG. 3B, the stored previous bit output XORed to the present input decreases (immunizes) correlation between cycles.

The Top Splash Matrix/Top EVNN MAJ/XOR Filter shown explicitly in FIG. 9 is identical to the Bottom Splash Matrix/Bottom EVNN MAJ/XOR Filter in FIGS. 10 and 12.

The identical Top 2500-TM and the Bottom 2500-BM Splash Displacement Matrices accept the outputs from the Top 2000, and Intermediate 2100 Store & XORs.

Each matrix as shown in FIG. 9 is composed of one input 2500-I and four row rule based displacement vectors. The A vector 2500-A, the B vector 2500-B, and the C vector 2500-C each signify a different pseudo-random displacement rule for directing input bits into the output word. The D vector 2500-D causes the input word to be output without change; which is referred to as a "straight through" rule vector.

At each clock cycle, the Splash (Rule) Selector in the Random Controller enables one vector from the Top Matrix, e.g., the A vector 2500-A; and a different vector; e.g., the B vector 2550-B, for the Bottom Matrix. Note that in FIG. 9, that if the B rule vector is enabled, input bit I14 in 2500-I is displaced to output Index 27 by B27 (in column 14).

The Splash Selector in the FIG. 6 Random Controller 70's choice of a displacement vector is a function of the internal Noise Source (not shown), the 2 previous Splash Selector memory outputs and the Index 15 and 31 outputs from the Top Splash Matrix. The four selected Rule Pairs are A & B, B & C, C & D and D & A; in each case for the Top and Bottom Splash Matrices respectively. Likewise, the four uncorrelated EVNN Rule Signals regulate the MAJ filter cells shown in FIG. 3A.

The example follows four output bits of the Intermediate Store & XOR 2100; which are input into the Bottom Splash Matrix 2550-BM; which are displaced and, input into the Bottom EVNN MAX/XOR Filter 2550-BF, the Hybrid Filter of FIG. 3A; to be factors in the present cycle output CIP of the Bottom Store & XOR 2200.

Example

Follow the index bits (7, 22, 24 & 3) from the Intermediate Store & XOR 2100 which are input into the Bottom Splash Matrix 2550-BF; wherein, Splash Selector 710 "switched in" the B rule vector 2500-B; displacing, input bits to four near neighbors cells (9, 10, 11 and 12) on the output of the Matrix; as $$[I07 \rightarrow B09 \rightarrow H_{(9,t)}; I22 \rightarrow B10 \rightarrow H_{(10,t)}; I24 \rightarrow B11 \rightarrow \underline{H_{(11,t)}; \text{and } I03} \rightarrow B12 \rightarrow \underline{H_{(12,t)}}];$$

which are input/combined into the i'th Hybrid Filter cell 1650 FIG. 3A and FIG. 12; and are factors in the $Y_{(11,t)}$th CIP output of the Bottom Store & XOR 2200, see the Store & Store 2200-*i* cell in FIG. 3B.

One of four EVNN Rule Signals (Random Controller 70 FIG. 6) signals regulates each MAJ filter in the Bottom EVNN MAJ/XOR Filter 2550-BF, see EVNN Permutation $E_{(j,t)}$ in 1650 FIG. 3A.

Each cell in the Top Store & XOR 2000 of FIG. 12 receives a randomized diffusion of four bits from the Register Bank Combiner RBC of FIG. 10. The Top Store & XOR 2000 correlation immunizes the RBC input XORed to the 13 Right Rotated Lower Feedback LFBD which is then displaced by the Top Splash Matrix 2500. The Top Splash Matrix 2500 output is delinearized, balanced and diffused in the Top EVNN MAJ/XOR Filter. The Intermediate Store & XOR 2100 correlation immunizes the diffused output of the Top EVNN MAJ/XOR Filter XOR 2500-F summed to the 7 Left Rotated Lower Feedback LFBD. The Bottom Splash Matrix 2550-BM displaces the output of the Intermediate Store & XOR 2100 into the Bottom EVNN MAJ/XOR Filter 2550 which again delinearizes, balances and diffuses the input into the Bottom Store & XOR 2200. The Bottom Store & XOR 2000 output BSX which also is the Cipher Mask CIP on transmission lines 5700.

FIG. 10 illustrates the interaction of major components of the 4 Tier Register Bank 100. The Super Tier 1000 is clocked by the Primary Clock 5050. At every Primary Clock Super Tier Feedback Store 3650 and Lower MAC & Cipher Feedback Process & Store 3560 transmit Super Tier Feedback SUPD on transmission lines 5200 and Lower Feedback LFBD on transmission lines 5100 to the Super Tier 1000 and to the Top, Middle and Bottom (TMB) Tiers 1100, 1200 and 1300. The TMB Tiers 110 are clocked randomly on tier clocks 5000, 5010 and 5020. The outputs of each of the indexed TMB Tiers 110 outputs are combined into the MAJ circuits 1500. The output of the Super Tier on Bus 1660, and two outputs from each MAJ circuit are combined in the 3XOR vector 1665 to generate the RBC output to the Top Store & XOR. The MAJ 3rd index cell 1650 generates an output to the 3rd 3XOR of 1650 and also to the 8th 3XOR in the vector 1665. A single i'th cell of the Hybrid Filter 4 Tier Combiner 150 is shown in FIG. 7C. The 3XORed vector includes the MAJ vector 1500 output and a 5 cell right rotation Image 1660 in FIG. 7A.

FIG. 12 is succinct description of the feedback flow, wherein the word variables which appear in subsequent equations are clearly labeled, e.g., the output of the Intermediate Store & XOR 2100 ISX, to help the reader understand the preclusion of Message modification.

FIG. 11 illustrates the three main function TRNG 600, Stream Ciphering 610 and MAC/Hash Data Authentication 620 procedures and how they benefit from the use of the orthogonal feedback streams.

Figure 11A:
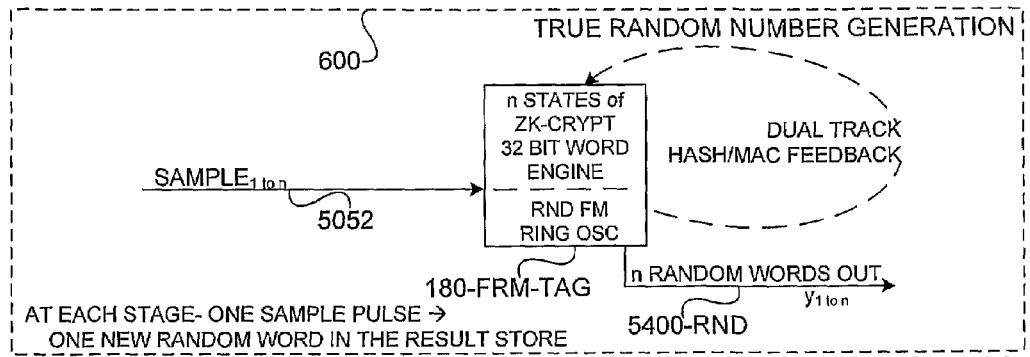
FIG. 11A is a simplified block diagram illustration of a preferred embodiment configured and initialized as a True Random Number Generator.

In the block diagrams of FIGS. 11A, B, and C are shown the essential configurations for True Random Number Generation, TRNG 600; Stream Ciphering 610; and Data Authentication processes 620, respectively.

An Engine is in MAC Mode, when the feedback streams are linear functions of the Cipher Mask XORed to the Message Word, where in some instances the Message Word is equal to zero; e.g., the Feedback Scrambles 700-SCR1 and 700-SCR2, which intend to be security buffers between sensitive Engine states.

In FIG. 11A 600 the TRNG generation process is typically a MAC Mode process where the feedback is a function of the Cipher Mask CIP and a Message Word, which typically is zero. In certain preferred embodiments, the Random Controller 70 is driven by an included free running oscillator and the configured Engine 180-FRM-TAG is cycled at a constant frequency by the Host 10. The configured Engine 180-FRM-TAG is Sampled during an initialization process, whence the Host 10 in FIG. 6 ascertains statistically and deterministically if the Engine is operative and "loaded with entropy". Typically after the Engine 180-FRM-TAG is initialized, at each Host cycle a valid Random Word is be read from 5400-RND. The MAC Mode feedback has added cryptocomplexity to the TRNG function.

Figure 11B:
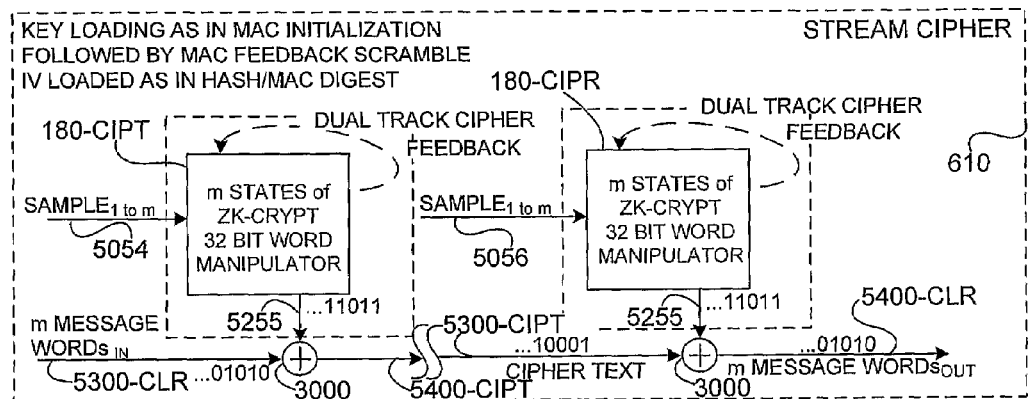
FIG. 11B is a block diagram of a pair of preferred embodiment Engines configured as stream ciphers.
Figure 11C:
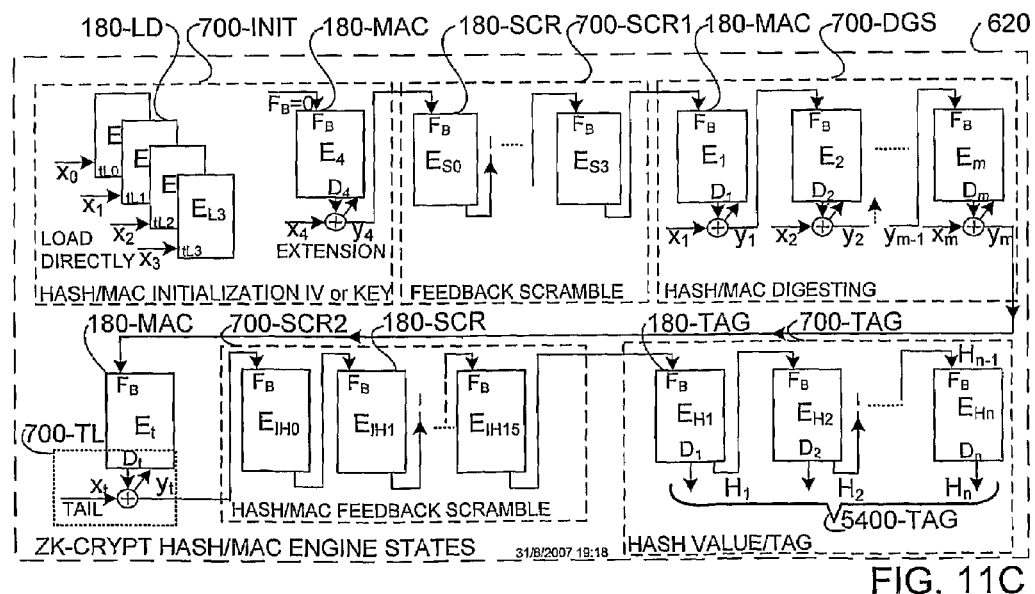
FIG. 11C depicts the Engine states operative to initialize, digest and output Hash/MAC Hash-Value/MAC Tags.

FIG. 11B 610 depicts a typical ciphering operation, subsequent to typically loading Engines with Secret Keys, see 180-LD and 180-MAC in FIG. 11C, Scrambling the Engine see 700-SCR2 in FIG. 11C, and loading IV (Initial masking Values); in transmitting ciphering Engine 180-CPT and receiving deciphering Engine 180-CPR. At each synchronized Sample the sender in 180-CPT inputs a Message Word 5300-CLR which is XOR summed in 3000 with the Cipher Mask CIP on 5255, wherein a Ciphered Word 5400-CIPT is transmitted. As the quality of the transmission environment is unknown, the received word 5300-CIPT possibly includes false bits. The synchronized Engine, 180-CIPR typically generates identical Cipher Masks which are XOR summed to the received Message Words 5300-CIPT, to produce Clear Text output 5400-CLR, which is typically a retrieved original Message.

The Stream Cipher initialization process is essentially a MAC Mode process, where the condition of the Engines 180-CIPT, the sender and 180-CIPR the receiver are scrambled by the Secret Key and Initial Value data introduced as Message Words.

The ciphering process utilizes internal Cipher Mode feedback, and the Engines operate as synchronized Deterministic Random Number Generators. At each clock both Engines typically generate the same Cipher Mask CIP word on lines 5255, which is XORed to the incoming Message Word.

The protocols for ciphering and data authentication advantageously use the direct 128 bit key loading sequence, and the MAC Mode for additional key and/or IV diffusion into certain preferred embodiment Engines. Effective diffusion of Secret Keys, IVs and Message Digests is enacted in the "MAC Feedback Scramble" process wherein the Cipher Mask output (Message In=0) is directly recirculated back into the Register Bank and the Data Churn in MAC Feedback Mode.

In Cipher Mode of FIG. 11B, the word Feedbacks to the Data Manipulator cannot be a function of the Message Word, therefore, the MAC MIX & MUX 3300 output, MMX, is set to zero, and the input to the Super Tier Feedback Store, SUP, is equal to SMX. See FIGS. 12, and 13 to follow the nomenclature of the variables.

In the simplified block diagram of FIG. 11C, each Engine block shows a stage in the Data Authentication process. The first process is initialization 700-INIT wherein the first 128 bits of Secret Key (MAC) or optional Initial Value are directly loaded into the TMB 110 and Random Controller state variables. Any key/IV extension is executed in 180-MAC configuration wherein MAC feedback is a function of the Message Word; e.g., $x_4$ is input and $y_4$ is the Dual Track Hash/MAC feedback into Engine stage S0 configured as 180-SCR in scrambling sequence 700-SCR. The 180-SCR configuration is identical to 180-MAC wherein the Message Word input is all zero. The Hash/MAC Digest sequence 700-DGS again inputs Message Words $MES_1$ to $MES_m$ with the Engine stages recirculating the dual feedback tracks in 180-MAC configuration. The Tail sequence 700-TL is an extension of the Message Digesting Sequence. An additional 16 clock Scramble in sequence 700-SCR2 prepares the Engine variables so that from state $H_1$ to $H_n$ it is operative to output the 5400-TAG, wherein, again, the Message Words are all zero.

Methods for Generating Cipher and MAC Feedback are now described. The i'th Cipher Feedback to the Super Tier is the SuperMIX transform on the outputs of the Intermediate Store & XOR, $ISX_i$, and the Bottom Splash Matrix Filter, $BSF_i$—

$$SUP_i = f_{SMX}[ISX_i \oplus BSF_i]$$

The table of FIG. 13C defines the 32 word input bits to the SuperMIX, SMX, displacement transformation, where if the input vector is—
[ABCD EFGH JKLM NPQR STUV WXYZ abcd efgh]; then the SMX displacement transform, $f_{SMX}$, reverses and rotates nibbles—
$f_{SMX}$[ABCD EFGH JKLM NPQR STUV WXYZ abcd efgh]; and outputs the displacement—
SMX=[dcba hgfe DCBA HGFE MLKJ RQPN VUTS ZYXW], as seen in FIG. 13C with a self defining flow chart for software simulation in FIG. 13D.

This dense feedback (an average of 16 "1"s in each feedback word) is an effective randomizing mask on the output of the Register Bank RBC, see FIG. 7A; operative to continue corrupting the 32 Bit Data Manipulator 90 two clock cycles later.

In certain preferred embodiment of FIG. 12 the Cipher Mode, LWC, the Lower Cipher Word, is simultaneously recirculated into the TMB Tiers and the Data Churn:

$$LWC_i = (ISX_i \oplus BSF_i)(TSX_i)(TSF_i) \text{ as shown in FIG. } \mathbf{12}.$$

If the 32 word input bits to the MAC MIX, MMX, transformation is—
[ABCD EFGH JKLM NPQR STUV WXYZ abcd efgh]; then the MMX displacement transform, $f_{MMX}$, as explained previously, with reversed nibbles—
$f_{MMX}$[ABCD EFGH JKLM NPQR STUV WXYZ abcd efgh] outputs the displacement—
MMX=[DCBA HGFE MLKJ RQPN VUTS ZYXW dcba hgfe].
as seen in FIG. 13A with a software equivalent in FIG. 13B.

The generated Result Word, $NWR_i$, in both ciphering and data authentication is the XORed sum of the Message Word, $MES_i$, and the Cipher Mask, $CIP_i$. At every Primary Clock cycle, in all operations, the Result Word is sampled into the Result Store. Therefore, at the present clock cycle, the output of the Result Store, $PVR_i$, is the $NWR_{i-1}$ value; so that: the Lower Feedback MAC Mode is composed of:

$$NWR_i = CIP_i \oplus MES_i; \text{ and } PVR_i = (CIP_{i-1} \oplus MES_{i-1});$$

and the i'th Lower Feedback to be recirculated to the Data Churn and to the TMB Tiers:

$$LWM_i = (NWR_i \oplus PVR_i) = (CIP_i - MES_i) \oplus (CIP_{i-1} \oplus MES_{i-1}).$$

Simultaneously, the Super Tier is fed the SMX, the Super Tier Cipher Feedback, XORed to the MMX nibble transformed Present Result (a function of the Message Word):

$$SUP_i = f_{SMX}[ISX_i \oplus BSF_i] \oplus f_{MMX}[CIP_i \oplus MES_i], \text{ analyzed in Appendix } B.$$

Therefore, if $MFB_i=1$, the two tracks of generated feedback at step i where:

$$LWM_i = (NWR_i \oplus PVR_i) = (CIP_i \oplus MES_i) \oplus (CIP_{i-1} \oplus MES_{i-1})$$

is the MAC feedback directed to the TMB Tiers and the Data Churn, and, $$SUP_i = f_{SMX}[ISX_i \oplus BSF_i] \oplus f_{MMX}[CIP_i \oplus MES_i]$$

is the MAC feedback which is input into the Super Tier.

The addition of the second feedback stream described in FIGS. 12 and 13C & D coupled with the Result Store of FIGS. 2 & 12 3600 assures orthogonality of the two streams and is a robust basis for intractable simple Message modification.

An Example of Orthogonal Feedback Tracks Flipping and Reconciling 4 Message Bits is described in FIGS. 14A and 14B showing how the 4 False Message bits index 4, 9, 19 and 28 in 800 can be reconciled in the Lower Feedback Stream LFB in FIG. 14A 800 and simultaneously diffuse into 12 false bits in the Super Tier Feedback Stream SUP in FIG. 14B 820.

In the initial step in word 8000 four falsified bits which appeared in the Message word two cycles earlier, corrupt the same bits in the TMB Tiers 110 in FIG. 12, in word 8010, and are transformed by the MAC MIX filter 3300, $f_{MMX}(\cdot)$ into the Super Tier in word 8060. (The aberrations of the SuperMIX transform $f_{SMX}(\cdot)$ are affective two clock cycles later.) Note that the φ rotated in feedback bits in word 8020 are true as the astute hacker assured that nLFSR internal feedbacks are typically true and where "1"s designate false bits and "0"s signify the true original bits.

In word 8020 the necessary falsified bits which the hacker needs to flip in the next reconciling step Message Word are shown in word 8020, in order to compensate for the residual false bits II' in the Result Store 3600 Previous Result output PVR and to reconcile the movement of the false bits in TMB 110, as in FIG. 5. In word 8030 the Lower Feedback is the fault XOR sum of the Previous Result PVR and the Present Result NWR generating the reconciling feedback word LWM which pinpoints the false bit which shifted one bit to the right in the TMB 110 as seen in false vector word 8040.

In word 8050 in FIG. 14A, note that the reconciling word 8030 "matched" the false bits of shifted word 8010 to output reconciled word 8050.

Meanwhile, the double number of false bits in the reconciling Message word 8020 transformed by the MAC MIX transform $f_{MMX}(\cdot)$ XORed comprise the Super Tier next clock SUP feedback word 8070. Word 8080 is the shifted word 8060 before the Super Tier Feedback XOR summing of false bits of word 8070.

In FIG. 14B the false bits in the "alleged reconciling" word 8070 XOR summed to the second clock rotated Super Tier word generates the word 8090 with 12 diffused false bits.

Now proceeding with a step by step formal example—similar to the analysis of the vulnerable Word Manipulator of FIGS. 1 & 2

1) All false or most probably false variable words are designated in Bold, e.g., $CIP_{j+1}$. Provably false variables, e.g., $MES_{j+1}$. are underlined.

2) Often it cannot be demonstrated that a single word variable is false (or true), but it can be shown that the composite expression is false, in which case the expression is underscored herein, e.g., $CIP_x \oplus MES_x$.

3) Remember, all words "false value vectors" where "1"s designate false bits and "0"s signify the true original bits.

For the first two cycle feedbacks, only generated false bits emanate from the first two false Message Words, as all 32 Bit Data Manipulator variables are in a true state, for the 0'th and 1'st cycles. Remember, a Result false vector of a present Message Word (Cipher Mask⊕Message Word), is "XORed into" a tier after two cycles; i.e., one cycle to load into a Feedback Store, a second cycle to XOR into TMB Tiers.

Explicitly, rotated falsified bits demonstrated in FIG. 5, generate the only false value words that can falsify and rectify the TMB Tiers:

I $MES_0 = NWR_0 = LFB_0$; as the Cipher Mask, CIP and a Previous $\overline{NWR} = \overline{PVR}$, are true, where the Message Word, $MES_0$, is an "auspicious" false vector that defines a unique subsequent rectifying vector, which returns the TMB Tiers to a true state. (There are typically many such auspicious words.)

II $LFB_1 = LFB_0 \oplus MES_1$; from I, the Lower Feedback false value vector, $\overline{LFB_0} = \overline{MES_0}$ and as the Cipher Mask, $CIP_1$ is still true, $MES_1$ is the second Present Result false vector, as $MES_1 = LFB_1 \oplus LFB_0$ III $LFB_1 = LFB_0/2 = MES_0/2$; the single valued second false $\overline{LFB}$ vector is a right shift (/2) of the first Lower Feedback vector; else first false shifted bits cannot be re-complemented, e.g., made true. Note that the left hand bits in all TMB Tiers are true, because the MS bits of all nLFSRs in the previous cycle were true; as the auspicious first false word was chosen so as not to complement MS bits of the nLFSRs.

IV $LBF_1 = MES_0/2 = MES_0 \oplus MES_1$; it has been shown herein that $(\overline{MES_0}/2)$ is the only possible reconciling feedback word, in II & III; and that that $MES_0 \oplus MES_1$ represents the false value i'th Lower Feedback vector as $CIP_0$ and $CIP_1$ are both true, as the LBF feedback is active, XORed into the TMB Tiers, with a delay of two clock cycles.

V $MES_1 = NWR_1 \neq LFB_1$; as the Result Store outputs the false $\overline{MES_0}$, and from equation II, as addition and subtraction are identical in modulo 2 arithmetic—

VI $MES_1 = LFB_0 \oplus LFB_1 = MES_0 \oplus MES_0/2$; the false bits in the contrived Message Word.

The falsified and reconciled results:
$TMB_0 = LFB_0 = MES_0$; $TMB_0$, the first false value superimposed into the TMB Tiers—where the false right shift value in the TMB registers—$TMB_0/2 = TMB_1$; and,
$TMB_1 \oplus LFB_1 = MES_0/2 \oplus LFB_1 = LFB_1 \oplus LFB_1 = 0$; (Reconciled).

Following above equations where false index bits of FIGS. 14A & 14B are 4, 9, 19 and 26:

$$(0000\ 1000\ 0100\ 0000\ 0001\ 0000\ 0010\ 0000);\quad MES_0 = LFB_0 \qquad \text{I}$$

$$\oplus$$

$$(0000\ 0100\ 0010\ 0000\ 0000\ 1000\ 0001\ 0000);\quad (MES_0)/2 = LFB_1 \qquad \text{II}$$

$$=$$

$$(0000\ 1100\ 0110\ 0000\ 0001\ 1000\ 0011\ 0000); \qquad \text{VI}$$

$\underline{MES_1}$ generates TMB reconciliation.

The Previous Result, PRV, is XORed into the Lower Feedback, LFB, but not into the Super Map Feedback, SUP, as depicted in FIG. 12.

Simultaneously "alleged reconciliation" to the Super Tier:

$SUP_0$, the first false vector is a function of the Present Result, only, as the SuperMIX feedback is still irrelevant; it is affected by $MES_0$ two cycles later; and as $CIP_0$ is true, the Present Result false vector, $PRV_0 = MES_0$.

VII $SUP_0 = f_{MMX}[MES_0] = STO_0$; $STO_0$ is the first falsified Super Tier falsified vector output which was superimposed into the Super Tier—(the MAC MIX filtered false-NWR Present Result), $SUP_1$, the next false vector is a function of the Present Result only, as the SuperMIX feedback is still true as it is affected by MES1 two cycles later; and as $CIP_1$ is true, the Present Result false vector, $PRV_1 = MES_1$ VIII $SUP_1 = f_{MMX}[MES_1]$; as the Cipher Mask, $CIP_1$, was still true when the second false (reconciling the TMB Tier) Message was generated, then the SuperMIX output was also true, and the second Super Tier false feedback vector is the $f_{MMX}$ transform on the second false Message Word. and the falsified bits simultaneously generated with the TMB reconciliation—

IX $STO_1 = STO_0/2 \oplus SUP_1$; $STO_0$ moved one bit to the right is XORed to the second MMX'd feedback. In this example $STO_1$ is not all zeroed (reconciled),
i.e., $\underline{STO_0/2} \neq \underline{SUP_1} \neq \underline{STO_1} \neq 0$.

$$(0000\ 0001\ 0010\ 0000\ 1000\ 0000\ 0100\ 0000); \qquad \text{VII}$$

$SUP_0 = STO_0 = f_{MMX}[\underline{\mathbf{MES_0}}]$, $$(0000\ 0011\ 0110\ 0000\ 1000\ 0001\ 1100\ 0000); \qquad \text{VIII}$$

$SUP_1 = f_{MMX}[\underline{MES_1}]$, $$\oplus$$

$$(0000\ 0000\ 1001\ 0000\ 0100\ 0000\ 0010\ 0000);$$

$\underline{STO_0/2}$, shifting $\underline{STO_0}$, $$=$$

$$(0000\ 0011\ 1111\ 0000\ 1100\ 0001\ 1110\ 0000); \qquad \text{IX}$$

$\mathbf{STO_1 = STO_0/2 \oplus SUP_1 \neq 0}$.

The example shows a case where a false $MES_0$ is followed by (the only possible) TMB Tier 100 reconciling $MES_1$ which leaves 12 random false traces in the Super Tier 1000. This disparate feedback feature is doubly important, as the dual track feedback obviates simple simultaneous logic manipulation of the Super Tier and the TMB tiers. We show two programs the first is generic for any nLFSR, as shown in the flow chart of FIG. 15, or extending the for an same length shift register, wherein nLFSRs are a subset, with substituted constants; e.g., imax, simple increment, the MS bit of register does not generate LFSR type feedback and may potentially be falsified and reconciled.

The following C code programs follow the flow chart of FIG. 15, and prove that the same orthogonal transformations are operative to obviate Message modification wherein the Register Bank comprises any combination of nLFSRs with or without the NFIX NOR gates 6040 in FIG. 4A, simple shift registers without feedback, and simple rotating registers. THE MAC FEEDBACKS ARE ORTHOGONALLY FED TO ANY SIMPLE REGISTER OR TO ANY COMBINATION OF LINEAR FEEDBACK SHIFT REGISTERS OR NON-LINEAR FEEDBACK SHIFT REGISTERS

```
#include <iostream.h>
#include <stdio.h>
#include <stdlib.h>
typedef unsigned long int dword;
dword i = 2;// for simple shift registers i=2
dword badfalswrdcnt = 0;
dword imax = 0xfffffffe; // for simple shift registers imax = 0xffffffff
dword mmm = 0, supx = 0;
const dword m8 = 0x88888888;
const dword m4 = 0x44444444;
const dword m2 = 0x22222222;
const dword m1 = 0x11111111;
dword
sup1,sup2,lfb1,lfb2,nwr1,nwr2,supclk2,supclk2xorsup2,gdfalswrdcnt;
dword fmmx(dword nwrx)
{
    mmm = (nwrx & m8) / 8;
    mmm = ((nwrx & m4) / 2) | mmm;
    mmm = ((nwrx & m2) * 2) | mmm;
    mmm = ((nwrx & m1) * 8) | mmm;
    supx = mmm;
    return supx;
}
void print( )
{
        printf("                          i = %x\n",i );
        printf(" [8510]     nwr1 = %x\n",nwr1);
        printf(" [8540]     lfb1 = %x\n",lfb1);
        printf(" [8550]     lfb2 = %x\n",lfb2);
        printf(" [8560]     nwr2 = %x\n",nwr2);
        printf(" [8565]     sup1 = %x\n",sup1);
        printf(" [8570]     sup2 = %x\n",sup2);
        printf(" [8575]     supclk2 = %x\n",supclk2);
        printf(" [8585]          is supclk2xorsup2 = %x more
than zero\n",supclk2xorsup2);
        printf(" [8590]     GOOD WORD COUNT =
%x\n",gdfalswrdcnt);// x2 for simple shift
        print("          BAD WORD COUNT = %x\n",badfalswrdcnt);
        printf(" IF  BAD  WORD  COUNT  IS  ZERO,  ALL
VECTORS    ARE ORTHOGONAL");
}
void main( )
{
    badfalswrdcnt = 0;
    FILE *bad = fopen("badword.txt","w");
      for (i = 2; ((i != 0) && (i <= (imax))); i += 2) { // for simple shift
        registers increment
        // by 1 - note the strange increment command - as C has
        trouble counting
        // large positive hexadecimal integers
        nwr1 = i;
        lfb1 = nwr1;
        lfb2 = lfb1 / 2;
        nwr2 = lfb2 ^ lfb1;
        sup1 = fmmx(nwr1);
        sup2 = fmmx(nwr2);
        supclk2 = sup1 / 2;
        supclk2xorsup2 = (supclk2 ^ sup2);
        if (supclk2xorsup2 <= 0) {
             badfalswrdcnt ++;
             gdfalswrdcnt = (i / 2) - badfalswrdcnt;// i - badfalswrdcnt
             fprintf(bad,"nwr1 = %x",nwr1);
        }
        gdfalswrdcnt = (i / 2) - badfalswrdcnt;
        //for simple shift gdfalswrdcnt = i - badfalswrdcnt;
        //if (i == imax);
        //erase "//" before "if" to scroll print results- "PAUSE"
        freezes screen
            print( );
    }
    fclose(bad);
    _sleep(43200000); //freezes last screen for up to 12 hours
}
```

The following program shows that the orthogonal transform works on rotating registers wherein divide by two is replaced by 1 bit right rotate.
THE SAME ORTHOGONAL FEEDBACKS OBVIATE WORD MODIFICATION ON SIMPLE ROTATING REGISTERS

```
#include <iostream.h>
#include <stdio.h>
#include <stdlib.h>
typedef unsigned long int dword;
dword l=2, imax = 0xfffffffe, mmm = 0, supx = 0, badfalswrdcnt = 0;
const dword m8 = 0x88888888;
const dword m4 = 0x44444444;
const dword m2 = 0x22222222;
const dword m1 = 0x11111111;
dword
sup1,sup2,lfb1,lfb2,nwr1,nwr2,supclk2,supclk2xorsup2,gdfalswrdcnt;
dword fmmx(dword nwrx)
{
    mmm = (nwrx & m8) / 8;
    mmm = ((nwrx & m4) / 2) | mmm;
    mmm = ((nwrx & m2) *2) | mmm;
    mmm = ((nwrx & m1) * 8) | mmm;
    supx = mmm;
    return supx;
}
void print( )
{
        printf("                          i = %x\n",i );
        prinff(" [8510]     nwr1 = %x\n",nwr1);
        printf(" [8540]     lfb1 = %x\n",lfb1);
        printf(" [8550]     lfb2 = %x\n",lfb2);
        printf(" [8560]     nwr2 = %x\n",nwr2);
        printf(" [8565]     sup1 = %x\n",sup1);
        printf(" [8570]     sup2 = %x\n",sup2);
        printf(" [8575]     supclk2 = %x\n",supclk2);
        printf(" [8585]   is supclk2xorsup2 = %x more than
zero\n",supclk2xorsup2);
        printf(" [8590]     GOOD WORD COUNT =
                           %x\n",gdfalswrdcnt);
        printf("              BAD WORD COUNT =
                           %x\n",badfalswrdcnt);
        printf(" IF BAD WORD COUNT IS 0, VECTORS ARE
        ORTHOGONAL");
}
void main( )
{
    badfalswrdcnt = 0;
    FILE *bad = fopen("badword.txt","w");
      for (i = 2; ((i != 0) && (i <= (imax))); i += 1) { // C has trouble
      counting
        //hexadecimals
        nwr1 = i;
        lfb1 = nwr1;
        lfb2 = lfb1 /2;
        nwr2 = lfb2 ^ lfb1;
```

-continued

```
        sup1 = fmmx(nwr1);
        sup2 = fmmx(nwr2);
        supclk2 = sup1 / 2;
        supclk2xorsup2 = (supclk2 ^ sup2);
        if (supclk2xorsup2 <= 0) {
            badfalswrdcnt ++;
            gdfalswrdcnt = (i / 2) - badfalswrdcnt;
            fprintf(bad,"nwr1 = %x",nwr1);
        }
        gdfalswrdcnt = (i / 2) - badfalswrdcnt;
        //if (i == imax)
            print( );
    }
    fclose(bad);
    _sleep(43200000);
}
```

Note that a false Message Word index bit 12 typically causes an internal feedback error in the top left nLFSR in the Register Bank. The false feedback typically falsifies bits 0,3, 4,6,9 and 10 in the nLFSR at the next clock cycle, see FIG. 4 table 6050-L. This aberration is unique to one nLFSR, irreconcilable without corrupting the Middle and Bottom Tiers 1200 and 1300 in FIG. 12. Subsequent simultaneous reconciliation of this single register and the whole Register Bank with MAC feedback is typically impossible.

The two step reconciliation of the TMB Tiers leaves behind a false value in the Super Tier, which indicates also there is a false output from the Register Bank Combiner, RBC. It is assumed that at least either the Top or Intermediate Store & XOR output values are immediately false. If both Store & XORs are true then as described in Step V herein, the attack fails sooner than expected.

Following falsification and reconciliation of the Register Bank, true feedback must be sustained to both the Super Tier and the TMB Tiers, else the condition of the Register Bank and eventually the Random Controller typically obviates short term reconciliation. There is no Message Word generated feedback that can sustain the Register Bank in a true condition for more than two cycles, following reconciliation.

As the intention is to find, even with lowest probability, an attack that succeeds, falsification and reconciliation are performed in two successive clock cycles. Reconciling in a third, fourth or up to the 12th cycle is possible, it entails constant falsification of Message Words, and lowers any chance of reconciling the Register Bank for even one clock cycle. The last reconciling word is orthogonal, just as in the example. The delayed reconciliation has a very low chance of even reconciling the TMB Tiers 110 as:

a) $MES_0$ could include fewer false bits, lest a false bit complements an MS nLFSR feedback bit, (unless a longer sequence of false Message Words MESs reconciles the Result Store at each step);
b) as TMB tiers are randomly clocked; therefore it is less likely that affected tiers be clocked simultaneously;
c) at the first delayed reconciliation cycle the Super Tier feedback includes false feedback from the Data Churn (not only from the Result/Feedback Processor); so that,
d) the Super Tier is further convoluted (and less reconcilable) at every step, with the more distinct possibility that the Super Tier transmits false signal bits to the Top Control Unit of the Random Controller.

The Super Tier and Lower Feedback Words are Orthogonal. As shown in FIGS. 14A and 14B, no lone false bit can be reconciled in both the Super Tier and TMB Tier sets.

The above nine step description is formalized in the self-explaining flow chart of FIG. 15. Remembering that index bit 31, the MS bit, cannot be flipped, progressing from 2 to $2^{32}-2$, when incrementing by 2, perform an exhaustive search of all the possible flipped words. (The Generic nLFSR/LFSR test assumes all equal length registers, with the feedback bit in the MS position.) There is no MS bit feedback constraint if the registers are simple right shift registers. A second program proves that the feedbacks are also orthogonal on simple rotating registers. If the result, BADFALSWRD=0, the program demonstrates the efficacy of the feedback methods shown and described herein for repulsing the classic Message Modification attack in a two step procedure. Therefore, there is no combination of false flipped bits in a preferred embodiment Message Word that can be reconciled in two cycles, in both the Super Tier and the TMB Tiers.

Note the "Optional Check" in the flow chart of FIG. 15 is valid for the defined length configurations of certain preferred embodiments of FIG. 4 and is a subset of typically all shifting configurations. Eliminating testing of Message Words that trigger false nLFSR feedback, shortens the generic test by a factor of 32. The generic test takes less than 10 minutes; the option is irrelevant. The search, performed exhaustively over all of the $2^{31}-1$ or $2^{32}-1$ possible complemented feedback word pairs, yields the conclusion that there is no falsified word pair that simultaneously complements and reconciles both the TMB Tiers 110 and the Super Tier 1000 in certain preferred embodiments, or in any of the combinations of nLFSRs, simple shift register, and or simple rotating registers.

As described herein, using the variable labels of FIG. 12, a 2 step fraudulent word reconciliation methods for certain preferred embodiments does not work because the TMB and the Super Tiers of the Register Bank cannot be sustained in the short term in a valid state. Invalid Lower Feedback corrupts both the TMB Tiers and the Data Churn and typically obviates reconciliation, as described herein. One random word XORed to the Super Tier typically can reconcile the tier's condition for one clocked step. If a false bit or a multiplicity of bits corrupts MS bit(s) of one or any nLFSRs in the TMB Tiers, reconciliation is impossible as the tiers have typically non-equal false vectors obviating future false Message Word reconciliation.

Reviewing the feedback variables in certain preferred embodiments, remembering that these equations relate to false word vectors; e.g., if $CIP_x=0$, all bits of $CIP_x$ are true. The MAC MIX output, MMX, is the $f_{MMX}$ transformation of the Present Result, NWR of FIG. 13A;

A) $MMX_x=f_{MMX}[CIP_x \oplus MES_x]$; $MMX_x$ is true if $CIP_x \oplus MES_x$, the Present Result, is true; else $MMX_x$ is a pseudo-random number.

The SuperMIX output SMX is the $f_{SMX}$ transformation of the XORed sum of the output of the Intermediate Store & XOR, ISX, and the output of the Bottom Splash EVNN MAJ/XOR filter, B S F.

BSX is the output of the Bottom Store & XOR and is also by definition, the Cipher Mask, CIP☐BSX.

B) $SMX_x=f_{SMX}[ISX_x \oplus BSF_x]$; the $SMX_x$ is true if the sum, $ISX_x \oplus BSF_x$, is true; else, $SMX_x$ is a pseudo-random number.

C) The Super Tier Feedback, $SUP_x$, is true, only if the sum, $MMX_x \oplus SMX_x$, is true.

D) RBC, the Register Bank Combiner, is provably true, only if the Register Bank 100, (BNK in the FIGS.) all four tiers' (3 in the TNB and I in the STO) outputs are true.

E) $ISX_x$ & $BSF_x$ are provably true, only if RBC and the Top and Intermediate Store & XOR outputs are true, TSX and ISX respectively.

It is appreciated that the classic Fraudulent Word Attack cannot succeed, as shown in FIG. 2 for the demonstrated Word Manipulator wherein at each cycle after the first false cycle the Result Store output PRV remains corrupted.

In order to demonstrate that the Register Bank 100 cannot be reconciled in the short term, it is assumed that the Adversary is extremely lucky in Steps III to VI. Then, in Step VII it is shown that such an improbable "lucky" scenario does not exist. All variable names refer to labels in FIG. 12.

First, assess the situation at the j'th word, prior to the adversary's first attack word.

All is well—certain preferred embodiment is processing a valid Message; and all variables are true.
The Register Bank 100 is true, therefore the combiner output, $RBC_j$ is true.
Top Store output $TSX_j$ is true; Intermediate Store output $ISX_j$ is true; and, Bottom Store output BSX☐$CIP_j$ is true.
The Message Word=$MES_j$ is true; the Present Result=$NWR_j$ is true;
the Previous Result=$PRV_j$ is true; generated and Stored Feedback $LFB_j$=$LWM_j$ and, $LFBD_j$ are the true original "historic" values.

There are many conditions involved in the choice of an "auspicious" falsifying word in Step I. There are many j'th words, and in each of the candidate j'th words there are up to $2^{28}$ candidate false Message Words. An adversary who knows the device and its contents can find illusive solutions (if they exist) to Steps I to V, but to no avail. As described herein, there is no auspicious word that leads to a successful attack on the Register Bank 100, therefore the specific choice is irrelevant.

In the following, variables that are provably false appear in Bold and are underlined; e.g., $\underline{\mathbf{(CIP_{j+1} \oplus MES_{j+1})}}$. Variables that it are probably false, but do not prove false, appear in Bold face type, but are not underlined, e.g., $\mathbf{CIP_n}$. Instants where both variables in a composite variable are suspect false, but where it can be shown that the composite is false, the whole composite function is underlined:

e.g., $\underline{\mathbf{(CIP_{j+3} \oplus MES_{j+3})}}$.

Other words are assumed to be true (if only for argument's sake), and are not emboldened.

Step I—The adversary chooses an "auspicious" falsifying Message Word, $MES_{j+1}$.

The generated $\overline{Lower}$, $\overline{LFB_{j+1}}$, feedback is provably false—
$\overline{LFB_{j+1}}$=$\underline{\mathbf{(CIP_{j+1} \oplus MES_{j+1})}} \oplus CIP_j \oplus MES_j$, and also the—
(Generated Lower FB=Present Result NWR XOR Previous Result)
$SUP_{j+1}$=$f_{MMX}[CIP_{j+1} \oplus MES_{j+1}] \oplus f_{SMX}[ISX_{j+1} \oplus BSF_{j+1}]$ is false. $\overline{LFBD_{j+1}}$, $TMB_{j+1}$, $STO_{j+1}$, $RBC_{j+1}$, $TSX_{j+1}$, $ISX_{j+1}$, $BSX_{j+1}$ & $SMX_{j+1}$ are true.

The first false feedbacks are "waiting to" be stored into Lower and Super Tier Feedback Stores, 3560 and 3650 respectively.

Step II—The adversary computes a Message Word, $MES_{j+2}$ that generates Lower Feedback to complement the one bit rotated to the right fraudulent bits in the TMB Tiers. This reconciliation word reconciles the TMB Tiers to a true state and provably falsifies the Super Tier. The Adversary typically has no degree of freedom in his choice of $MES_{j+2}$.

The generated feedbacks—

$LFB_{j+2}$=$CIT_{j+2} \oplus MES_{j+2} \oplus CIP_{j+1} \oplus MES_{j+1}$ is provably false; it isn't the original Generated Feedback=Present Result XORed to the Previous Result as it must reconciliate false bits; and,
$SUP_{j+2}$=$f_{MMX}[CIP_{j+2} \oplus MES_{j+2}] \oplus f_{SMX}[ISX_{j+2} \oplus BSF_{j+2}]$ is also provably false. $\overline{TMB_{j+2}}$, $STO_{j+2}$, $RBC_{j+2}$, $TSX_{j+2}$, $ISX_{j+2}$, $BSX_{j+2}$ & $SMX_{j+1}$ are provably still true.
$LFBD_{j+2}$ is false as $\overline{LFB_{j+1}}$ was false.
$\overline{SUPD_{j+2}}$ is false as $\overline{SUP_{j+1}}$ was false.
$\overline{LFBD_{j+2}}$ and $\overline{SUPD_{j+2}}$ are "waiting" to falsely complement the Register Bank and the Data Churn.
$\overline{LFB_{j+2}}$ is "waiting" to follow $\overline{LFBD_{j+2}}$ to reconcile the TMB Tiers to a true value.
$\overline{SUP_{j+2}}$ is "waiting" to follow $\overline{SUPD_{j+2}}$ to further falsify the Super Tier.

Step III—In the following steps an adversary must guess or contrive Message Words (MES's) that compensates for a false Previous Result and/or false Present and/or Previous Cipher Masks, in order to generate a true Lower Feedback, LFB, to sustain the TMB Tiers (two clocks hence).

In this step, $\overline{SUPD_{j+2}}$ was XORed into the STO (FIG. 12), thereby corrupting the Super Tier—and $\overline{LFBD_{j+2}}$ was XORed into the TMB and Data Churn, corrupting with an auspicious word—
$\overline{LFBD_{j+3}}$, $\overline{SUPD_{j+3}}$, $\mathbf{TMB_{j+3}}$, $\mathbf{STO_{j+3}}$, $\mathbf{RBC_{j+3}}$, $\mathbf{TSX_{j+3}}$, $\mathbf{ISX_{j+3}}$, $\mathbf{CIP_{j+3}}$, $\mathbf{MMX_{j+3}}$, $\mathbf{SMX_{j+3}}$ are either assumed or shown to be false,
and it is assumed (as the $MES_1$ was chosen auspiciously) that the TMB can be and typically is reconciled on the next clock cycle.
The Generated Feedbacks—
$LFB_{j+3}$=$\underline{\mathbf{(CIP_{j+3} \oplus MES_{j+3})}} \oplus CIP_{j+2} \oplus MES_{j+2}$ is true, as the "contrived"
Message Word $MES_{j+3}$ probably compensates two false variables.
The Super Tier Feedback—
$SUP_{j+3}$=$f_{MMX}[CIP_{j+3} \oplus MES_{j+3}] \oplus f_{SMX}[ISX_{j+3} \oplus BSF_{j+3}]$
is a random number. With extreme luck it reconciles the Super Tier in the 5'th step.
$\mathbf{SUP_{j+3}}$ is not the valid feedback, it is the assumed feedback that reconciles.
$\overline{LFBD_{j+3}}$ is false as $\overline{LFB_{j+2}}$ was false.
$\overline{LFBD_{j+3}}$ is "waiting" to reconcile the variables in the TMB Tiers, TMB, to a true state.
$\mathbf{SUPD_{j+3}}$ is "waiting" with a number that provably cannot reconcile the Super Tier into a true state.
$LFB_{j+3}$ is "waiting" with true Feedback, to "sustain" the TMB Tiers in a true state.

Step IV—In this step, reconciling feedback is XORed into the TMB Tiers, thereby recovering all TMB variables into a true state. The reconciling feedback further corrupts the Data Churn. As described herein, both logically and with reference to an exhaustive search, the Super Tier Feedback is not reconciled, so that the Register Bank 100 and the Data Churn 200 are both false. Typically, The adversary continues contriving or guessing compensating words to generate "historic" original LFBs.

In this step, $\overline{LFBD_{j+3}}$ was XORed into the TMB and Data Churn, reconciling the TMB.

The $\mathbf{SUPD_{j+3}}$ was XORed into the STO thereby further randomizing the Super Tier. $\mathbf{SUPD_{j+4}}$, $\mathbf{STO_{j+4}}$, $\mathbf{RBC_{j+4}}$, $\mathbf{TSX_{j+4}}$, $\mathbf{ISX_{j+4}}$, $\mathbf{CIP_{j+4}}$, $\mathbf{MMX_{j+4}}$ & $\mathbf{SMX_{j+4}}$ assumed false, and $TMB_{j+4}$ and $LFBD_{j+4}$ are true.

$LFB_{j+4}$=$\underline{\mathbf{(CIP_{j+4} \oplus MES_{j+4})}} \oplus \underline{\mathbf{(CIP_{j+3} \oplus MES_{j+3})}}$ is true,
as the contrived Message Word $\overline{MES_{j+4}}$ probably compensates three false variables.

The Super Tier Feedback—
$SUP_{j+4}=f_{MMX}[CIP_{j+4}\oplus MES_{j+4}]\oplus f_{SMX}[ISX_{j+4}\oplus BSF_{j+4}]$
$SUP_{j+4}$ is a random number. With extreme luck it is assumed that it is the true Super Tier feedback which can sustain the Super Tier in a valid state in Step VI. $LFBD_{j+4}$ is true as $LFB_{j+3}$ was true and is waiting to sustain TMB to a true state. $SUPD_{j+4}$ is random and "waiting" with, a low probability to reconcile the $STO_{j+5}$. $LFB_{j+4}$ "waiting" with true Feedback, to "sustain" TMB Tiers in a true state in Step VI.

Step V—In this step the TMB remains true, it is again temporarily assume that the STO is reconciled by a lucky $SUPD_{j+4}$, Super Tier feedback. The Data Churn remains false. The Result Store (Previous Result) remains false. For argument's sake "assume" that the adversary was very lucky. The adversary continues contriving or guessing compensating words to generate "historic" original LFBs. If $SUPD_{j+4}$ does not reconcile $STO_{j+5}$, the attack fails here, as $SUPD_{j+4}$ is single valued for $MES_1$.

In this step, $LFBD_{j+4}$ was XORed into the TMB and Data Churn, sustaining a true TMB, and pseudo-random $SUPD_{j+4}$ was XORed into and "luckily" reconciled the STO.

Now the Register Bank 100 variables, BNK and RBC are true. If on the next cycle RBC is still true, TSX is true. (If LFB and RBC are true for 3 more cycles, consecutively, TSX, ISX and BSX are reconciled).

$TSX_{j+5}$, $ISX_{j+5}$, $CIP_{j+5}$, $MMX_{j+5}$ & $SMX_{j+5}$ it is assumed are false, $TMB_{j+5}$, $STO_{j+5}$, $RBC_{j+5}$ are true, as the random SUP (it is assumed) reconciled the Super Tier.

$LFBD_{j+4}$ & $SUPD_{j+4}$ were assumed to be true, to sustain a valid Register Bank. And the Lower Feedback
$LFB_{j+5}=(CIP_{j+5}\oplus MES_{j+5})\oplus(CIP_{j+4}\oplus MES_{j+4})$ is true,
as the "contrived" Message Word $\overline{MES_{j+5}}$ compensates at least one false variable.

The Super Tier Feedback—
$SUP_{j+5}=f_{MMX}[CIP_{j+5}\oplus MES_{j+5}]\oplus f_{SMX}[ISX_{j+5}\oplus BSF_{j+5}]$
is a random number. With extreme luck it is assumed it may sustain true $STO_{j+7}$ in Step VII.
$LFBD_{j+5}$ is true as $LFB_{j+4}$ was true and is "waiting" to sustain TMB to a true state in Step VI.
$SUPD_{j+5}$ is "waiting" with a number it is assumed (improbably) reconciles STO in Step VI.
$LFB_{j+5}$ is "waiting" with true Feedback, to sustain the TMB Tiers in a true state in Step VII.

Step VI—In this step the TMB remains true, a true STO is sustained by a "lucky" $SUPD_{j+5}$, Super Tier feedback. The Data Churn, except for the TSX remains false. The Result Store (Previous Result) remains false. It is assumed that the adversary was very lucky. The adversary continues contriving or guessing compensating words to generate "historic" original LFBs.

In this step, $LFBD_{j+5}$ was XORed into the TMB and Data Churn, thereby sustaining a true TMB, and pseudo-random $SUPD_{j+5}$ was XORed into and "luckily" reconciled the STO. The Register Bank 100 variables BNK and RBC remain true. As the $RBC_{j+5}$ and $LFBD_{j+5}$ are true for a second time, TSX is true. (If LFB and RBC are true for 1 more cycle, ISX and BSF are reconciled).

$ISX_{j+6}$, $CIP_{j+6}$, $MMX_{j+6}$ & $SMX_{j+6}$ are false,
$TMB_{j+6}$, $STO_{j+6}$, $RBC_{j+6}$ & $TSX_{j+6}$, are true, as the random SUP again reconciled the Super Tier.
$SMX_{j+6}$ is false as described herein.
$LFBD_{j+6}$ & $SUPD_{j+6}$ are assumed to be true, And the Lower Feedback
$LFB_{j+6}=CIP_{j+6}\oplus MES_{j+6}\oplus CIP_{j+5}\oplus MES_{j+5}$ is true,
as the "contrived" Message Word $MES_{j+6}$ compensates three false variables.

The Super Tier Feedback—
$SUP_{j+6}=f_{MMX}[CIP_{j+6}\oplus MES_{j+6}]\oplus f_{SMX}[ISX_{j+6}\oplus BSF_{j+6}]$
$SUP_{j+6}$ is a random number. With extreme luck she could reconcile STO in Step VIII.
$LFBD_{j+6}$ is true as $LFB_{j+5}$ was true and is "waiting" to sustain TMB to a true state in Step VII.
$SUPD_{j+6}$ is "waiting" with a number it is assumed sustain a true STO in Step VII.
$LFB_{j+6}$ is "waiting" with true Feedback, to sustain the TMB Tiers in a true state in Step VIII.

Step VII—In this step the TMB remains true with a luckily contrived Message Word♦, the STO is again reconciled by a lucky $SUPD_{j+5}$, Super Tier feedback. The Data Churn is true, except for BSX☐CIP which probably remains false. ISX and BSF are true as RBC, TOP and ISX are true. The Result Store (Previous Result) remains false. We will question if the adversary could have been very lucky. We also see, also, that the attack could not work, without the anomalies described herein.

In this step, $LFBD_{j+6}$ was XORed into the TMB and Data Churn, thereby sustaining a true TMB, and pseudo-random $SUPD_{j+6}$ was XORed into and "luckily" reconciled STO.

The Register Bank 100 variables, BNK and RBC remain true. As the $RBC_{j+6}$ and $LFBD_{j+6}$ were true for a third time, both TSX and ISX are true.

$CIP_{j+7}=BSX_{j+7}$ is still false, and there exists an anomaly with $MMX_{j+6}$ & $SMX_{j+6}$. $TMB_{j+6}$, $STO_{j+6}$, $RBC_{j+6}$, $TSX_{j+6}$, $ISX_{j+7}$, $BSF_{j+7}$ & $SMX_{j+7}$ are true, as SUP once again reconciled the Super Tier $ISX_{j+7}$ is true, making $BSF_{j+7}$ true so that $SMX_{j+7}$ is now true.
And the Lower Feedback can Typically be Contrived:
$LFB_{j+7}=(CIP_{j+7}\oplus MES_{j+7})\oplus(CIP_{j+6}\oplus MES_{j+6})$ is true,
where the Present Result cannot be true, if the Previous Result was not true.

The Super Tier Feedback can No Longer be True—
$SUP_{j+7}=f_{MMX}[CIP_{j+7}\oplus MES_{j+7}]\oplus f_{SMX}[ISX_{j+7}\oplus BSF_{j+7}]$
where both $\overline{ISX_{j+7}}$ & $\overline{BSF_{j+7}}$ have been reconciled and are true.

If $f_{SMX}[ISX_{j+7}\oplus BSF_{j+7}]=SMX_{j+7}$ is true, and $SUP_{j+7}$ were true, then $f_{MMX}[CIP_{j+7}\oplus MES_{j+7}]$ and $[CIP_{j+7}\oplus MES_{j+7}]=NWR_{j+7}$ is also true.
$\overline{CIP_{j+6}\oplus MES_{j+6}}=PVR_{j+7}$ is by definition false—then, $LFB_{j+7}=NWR_{j+7}\oplus PVR_{j+7}$,
the valid feedback to sustain the TMB could not also be simultaneously true.

Despite the aforesaid, assume that it was possible to maintain the Register Bank 200 in a true sequence, obviously with false Message Words, as the Previous Result is typically false—

The generated feedback at the final tail word step can only be—
$LFB_T=(CIP_T\oplus MES_T)\oplus(CIP_{T-1}\oplus MES_{T-1})$ is again true.
The T'th Message Word in a valid sequence is a meaningful Tail not the random $MES_T$, necessary to compensate for false $MES_{T-1}$.
$LFB_T=CIP_T\oplus MES_T\oplus CIP_{T-1}\oplus MES_{T-1}$ where $T>j+7$. A true Tail word has typically generated, $LFB_T$, a false feedback.

In the tag/hash value scramble process all Messages Words after the T'th word are, by definition, "all zeroes". The adversary has no degree of freedom. If Message Words are equal to zero, then Cipher Mask values constitute Previous and Present Results.

The First MAC Feedback Scramble is False—
$LFB_{T+1}=CIP_{T+1}\oplus[00 \ldots 0]\oplus CIP_T\oplus MES_T=CIP_{T+1} \oplus PRV_T$, as the Tail word was false;
but the second MAC Feedback Scramble is true, as false feedback corrupts two cycles later—
$LFB_{T+2}=CIP_{T+2}\oplus CIP_{T+1}$, now the false vector of $LFBD_{T+2}=$ the false vector of $LFB_{T+1}$,
the third MAC Feedback Scramble feedback is false, as $LFB_{T+1}$ is combined into the Register Bank 100 variables $BNK_{T+3}$,
corrupting $RBC_{T+2}$ and the Data Churn—
$LFB_{T+3}=CIP_{T+3}\oplus CIP_{T+2}$.
at this stage, $BNK_{T+4}$ remains false as true $LFB_{T+2}$ feedback cannot reconcile a false Register Bank 100 state.

Conclusion: In certain preferred single Engine embodiments, reconciling the Register Bank into a valid state following the insertion of a false Message Word is provably not possible in the short term. The Register Bank may include of the following moving registers, The registers may include any combination of nLFSRs, LFSRs, NFIX simple shift registers, or simple rotated registers.

The Super Tier feedback track logically obviates adversarial Message Words from simultaneous logic manipulation of the Super Tier and the TMB tiers. As in the description of the Engine in FIG. 2, in the event that a first false Message Word is inserted in a string, every subsequent Message Word must be falsified if either a reconciling Message Word is inserted and/or if future valid feedback is generated to "sustain" the Register Bank in a valid condition.

Figure 16:
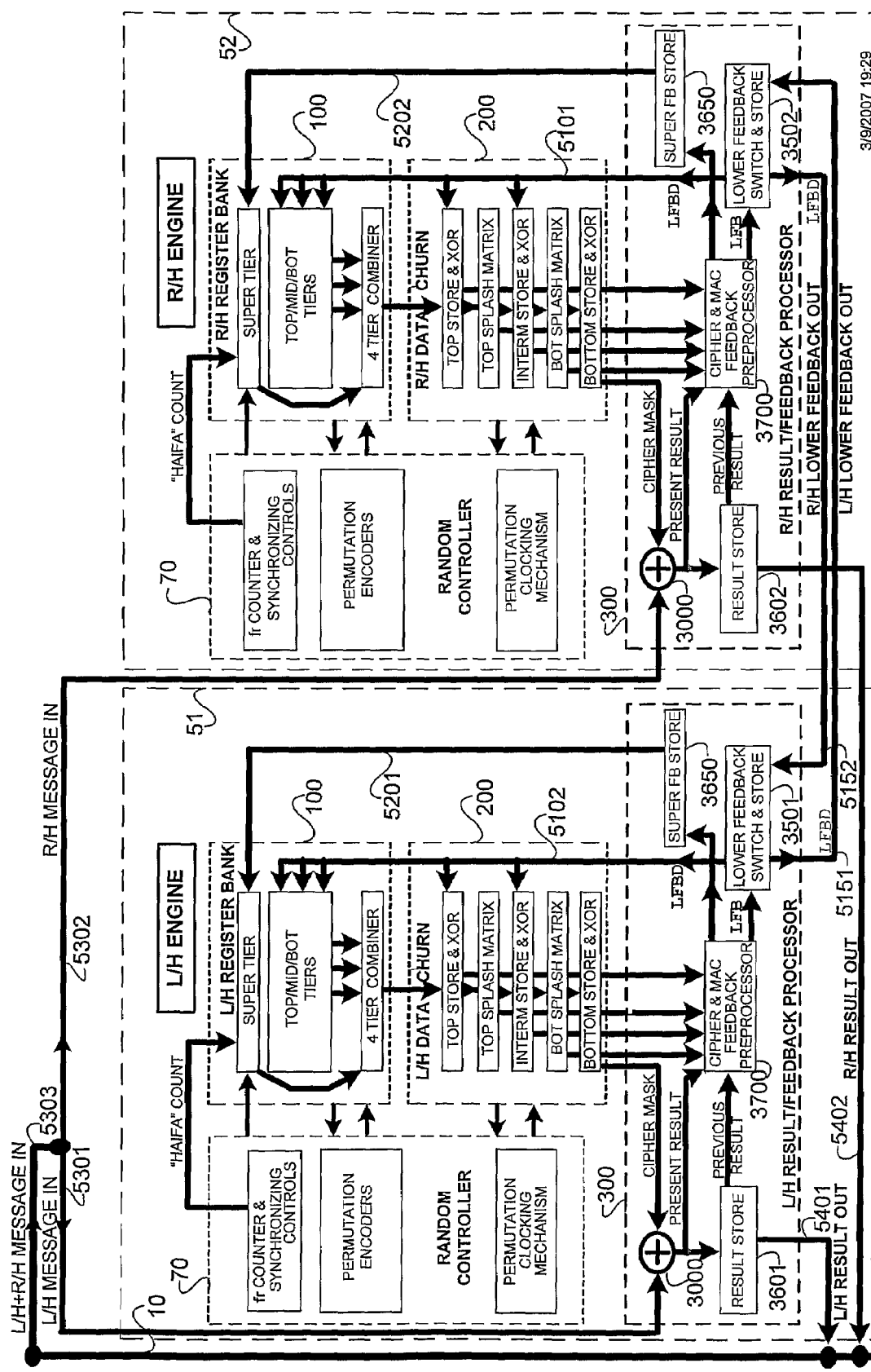
FIG. 16 is a simplified block diagram illustration of a concatenation of two preferred embodiment Engines operative to optionally "swap" the pair's Lower Feedback, e.g., the R/H (Right Hand) Lower Feedback is switched into the L/H Lower Feedback Store, and the L/H Lower Feedback is switched into the R/H Lower Feedback Store. As the units are identical, in one configuration the Engines operate separately, without shared feedback, wherein one Engine deciphers while the second Engine typically is operative to authenticate the same encrypted Message file.
Figure 17:
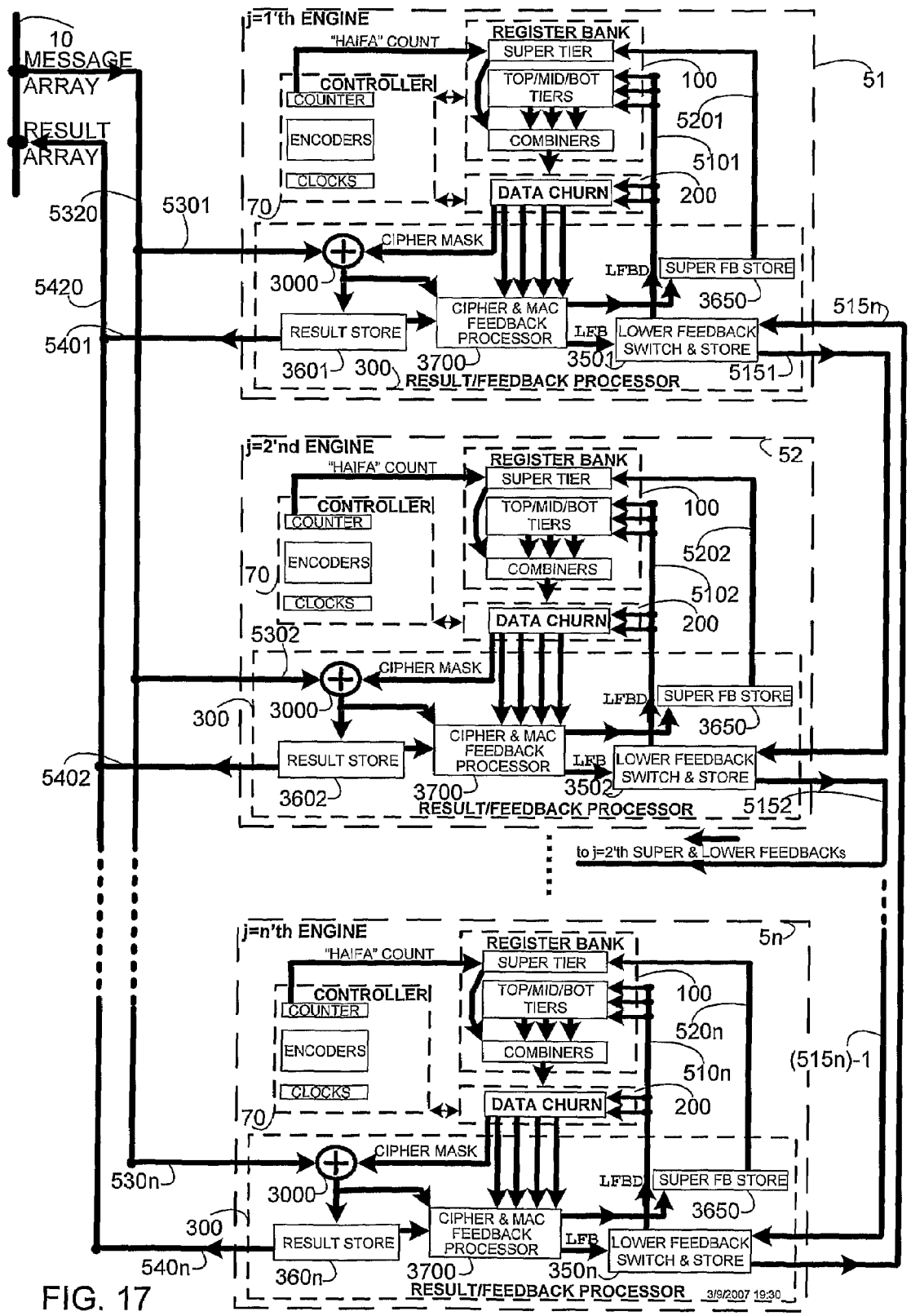
FIG. 17 is a simplified block diagram illustration of a concatenated structure of n typically identical Engines, wherein the Lower Feedback generated in the j'th Engine is switched into the Lower Feedback Store of the (j+1 mod n)'th Engine. The concatenated Engine's throughput typically is increased n times at the same clock speed, and is more crypto-complex than n concatenated Engines without shared feedback. Each Engine's Super Tier feedback is self-recirculated as in the single Engine preferred embodiment.
Figure 18:
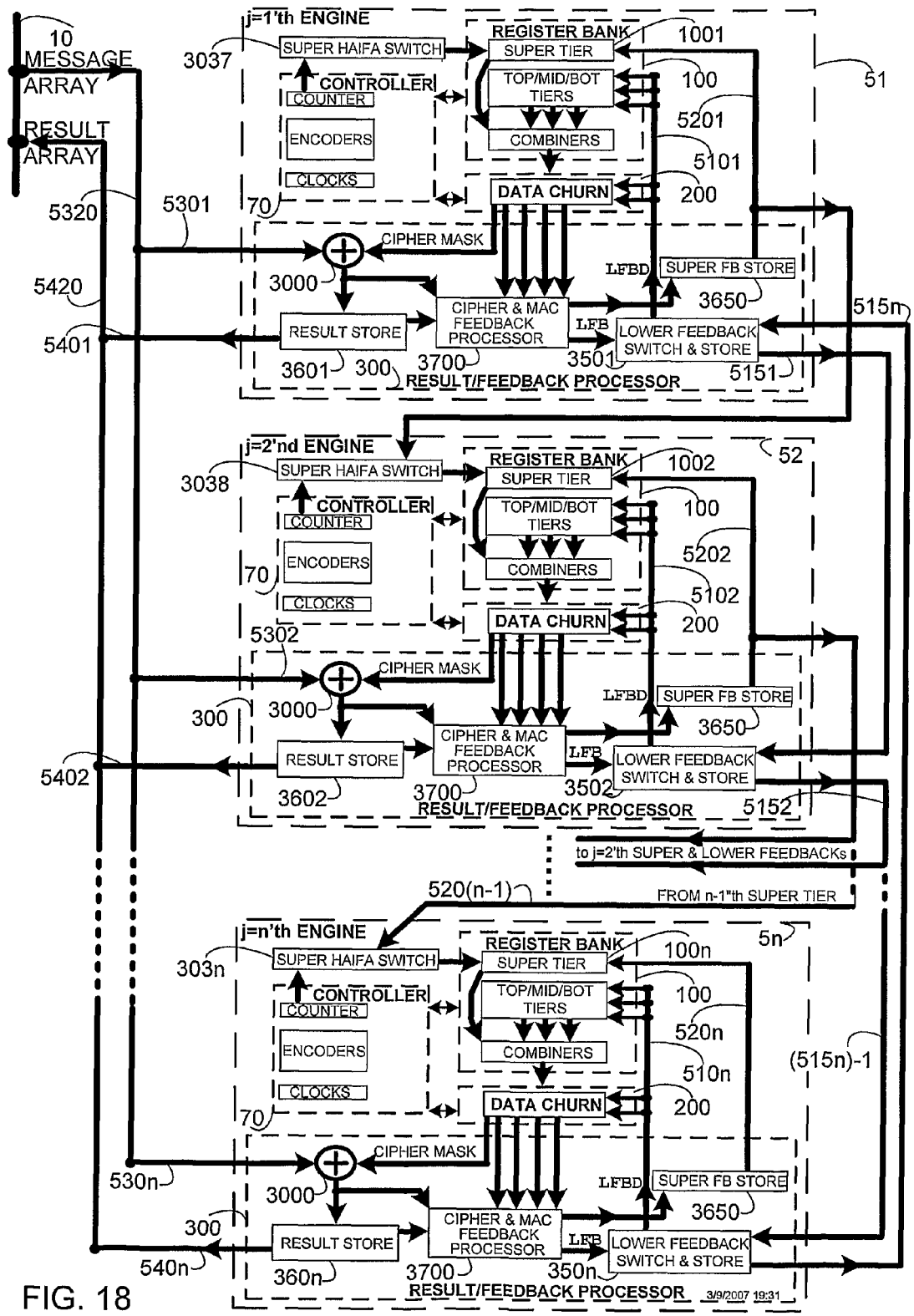
FIG. 18 is a simplified block diagram illustration of a concatenated structure of n typically identical Engines, wherein the Lower Feedback generated in each j'th Engine is switched into the Lower Feedback Store of the (j+1 mod n)'th Engine; and each Engine's Super Tier feedback is self-recirculated as in the single Engine preferred embodiment; and simultaneously the orthogonal Super Tier feedback of each of the first of the (n−1)'th concatenated Engine's Super Tier is also XOR combined into its next near neighbor's Super Tier. The concatenated Engines throughput typically is increased n times faster at the same clock speed, and is more robust than n concatenated Engines without shared feedback.

FIGS. 16, 17 and 18 depict three concatenated configurations of certain preferred embodiments, wherein the Engines are linked typically for high security ciphering or data authentication and/or accelerated ciphering or data authentication.

FIG. 16 shows a concatenation of two preferred embodiment Engines operative to optionally "swap" the pair's Lower Feedback, e.g., the R/H (Right Hand) Lower Feedback LFB is switched into the L/H Lower Feedback Store 3501, and the L/H Lower Feedback LFB is switched into the R/H Lower Feedback Store 3502. In this configuration, the Lower Feedback Switch & Stores 3501 and 3502 are configured to transmit the same Engine generated Lower Feedback LFB, on lines 5151 and 5152 respectively and to store the received neighbor's feedback in the included stores of the Lower Feedback Switch & Stores 3502 and 3501. This link typically increases cryptocomplexity and multiplies the potential speed of the combination.

As the units are identical, they are operative to function separately, without shared feedback, wherein one Engine deciphers while the second Engine typically is operative to authenticate the same encrypted Message file. In order to further increase speed and security, preferably, two multiple concatenations of Engines are operative to simultaneously decipher and authenticate typically long Messages or alternately; for a first Engine or concatenation of Engines to encipher a Message Word on one cycle, and on a following clock cycle for the second Engine or a multiple concatenation of typically similar Engines to digest the output of the previous multiplicity of at least one Engine in preparation of a tag or hash value, see Message Digestion FIG. 11C 700-DGS.

The orthogonality of vectors is described above and examples apply to obviation of Message modification in the concatenations of FIGS. 16, 17 and 18. The auspicious constraint of having same TMB tiers activated during falsification and reconciliation; the danger of falsifying any of the LFSRs' MS cell; and the danger of false feedbacks to the Splash Select in the Random Controller 70 causing non-valid Splash Matrix sequences increasingly obviate any attempt to modify Messages with concatenated Engines.

In any of certain preferred concatenation embodiments, XOR sunning the "HAIFA" Mask Count from the Random Controller 70 to more than one of the concatenated Engines 51 is superfluous. These inputs into the nLFSRs can add another 32 variable binary bits to each Engine in Data Authentication, as in the asymmetric configuration of FIG. 18, wherein the Super Tiers in all but the first Engine 51, are operative to XOR sum its previous neighbor's SUPD output with its own SUPD output into its own Super Tier 100$j$ (where $1\leq j \leq n$ in the figures).

Double Word Messages are input from the Host 10 from double input lines 5303 in FIG. 16. Results to the Host 10 are returned via transmission lines 5401 and 5401. In FIGS. 17 and 18 inputs and outputs are multi-word transmission arrays 5320 and 5420.

FIG. 17 shows a concatenated structure of n typically identical Engines 51, 52, ..., j, ... 5n. The Lower Feedback LFB generated in each j'th Engine is optionally switched from the j'th Engine into the j+1'th Lower Feedback Store 350j+1 of the (j+1 mod n)'th Engine. The concatenated Engine's throughput typically is increased n times at the same clock speed.

The concatenation with shared feedback is more robust than n concatenated Engines without shared feedback. Each Engine stores its neighbor's LFB feedback in its Lower Feedback Switch & Store 3501 to 350n, but not its own store in the concatenation.

FIG. 18 shows a concatenated structure of a multiplicity of n preferred embodiment typically identical Engines 51, 52 ... j, ... 5n. The output of the Cipher Mask Counter of the Random Controller 70's is input into each of the Super Haifa Switches 3037, 3038, ... 3037+j, ... 3037+n along with the outputs of the previous neighboring output of the Super Feedback Stores 5201, 5201, ... 520j, ... 5209. The HAIFA Counter is input to the first Engine 51 only.

All Super Haifa Switches are Typically Configurable to Connect:

a) the null vector, for typical lower power Stream Ciphering and True Random Number Generation; or, b) the "HAIFA" Cipher Mask Counter vector to discourage attempts to fabricate meaningful collisions where each Message Word is virtually numbered, to prevent displacing sequences; or, c) the output of the near neighbor's Engine's Super Tier Feedback Store's 3650. output;

to transmission lines 5103 FIG. 4 to be combined to the input of the clocked tiers' nLFSRs.

In either Data Authentication mode, the Super Haifa Switch 3037 of the first Engine 51 is typically configured to connect the output or the Cipher Mask Counter into the Super Tier 1001. In Data Authentication modes, the remaining switches in Engines 52 to 5n, are configured to XOR to combine the outputs of the previous neighbor's SUPD to its own SUPD.

Digital devices to which the apparatus described in this patent can advantageously be appended are described in co-pending published PCT patent applications, WO 2005/101975 and WO 2007/0949628, also termed herein "975" and "628".

A study of diffusion of a single changed feedback bit into more than 160 binary state variables, "A Security Analysis of the ZK-Crypt", is available on the applicant's World Wide Website located at fortressgb.com.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

Features of the present invention which are described in the context of separate embodiments may also be provided in combination in a single embodiment. Conversely, features of the invention which are described for brevity in the context of a single embodiment may be provided separately or in any suitable subcombination.

The invention claimed is:

1. A data hashing engine operative to hash an incoming string of message words, thereby to generate a hash value tag comprising a deterministic random number string which uniquely identifies the incoming string of message words, the engine comprising:
   at least first and second register arrays in a section of the engine;
   at least one 1-way functionality in a pseudo-randomizing section of the engine; and
   a set of at least first and second orthogonal feedback word stream generators operative to generate a set of at least first and second orthogonal feedback streams of message words respectively, including applying respective permutations to the incoming string of message words, wherein said first and second feedback streams are combined into the first and second register arrays respectively;
   wherein said at least pseudo-randomizing function section accepts input from the register arrays and generates at least pseudo-random output which, in combination with a present word in the incoming string, is provided to said stream generators;
   and wherein said orthogonal feedback streams are characterized in that every possible modified incoming string of message words which differs by at least a single word from an original incoming string of message words has at least one of the following two characteristics (a) and (b):
   (a) the modified incoming string causes a corrupting first feedback stream generated by applying a permutation to said modified incoming string, when combined into said first register array, to corrupt said first register array, relative to the same first register array into which a non-corrupting first feedback stream, generated by applying said permutation to said original incoming string, has been combined;
   (b) the modified incoming string includes at least one reconciling word which enables the modified incoming string, when permuted to form one first feedback stream which is combined into said first register array, to reconcile said first register array relative to the same first register array into which a modified first feedback stream, formed by permuting said original incoming string of message words, has been combined, however said at least one reconciling word in said modified incoming string of message words causes a corrupting second feedback stream generated by applying a permutation to said modified incoming string, when combined into said second register array, to corrupt said second register array, relative to the same second register array into which a non-corrupting second feedback stream, generated by applying said permutation to said original incoming string, has been combined.

2. The engine according to claim 1 and also comprising first and second functionalities associated with the first and second register arrays respectively, wherein at least one of said first and second functionalities comprises a one-way randomizing functionality.

3. The engine according to claim 1 wherein said first and second feedback streams are XOR summed into the first and second register arrays respectively.

4. The engine according to claim 1 wherein at least one of said first and second register arrays comprises at least one non-linear feedback register.

5. The engine according to claim 4 wherein an output of the non-linear feedback register is rotated, thereby to form an image of the output which is recombined with the output of the non-linear feedback register.

6. The engine according to claim 5 wherein the image of the output is randomly recombined with the output of the non-linear feedback register.

7. The engine according to claim 1 wherein said first feedback stream is a first function of a present word in said incoming stream and wherein said second feedback stream is a second function of the present word, and of a previous word, in said incoming stream.

8. The engine according to claim 1 wherein at least one of said first and second register arrays comprises a set of at least one non-linear feedback shift registers.

9. The engine according to claim 1 wherein at least one of said first and second register arrays comprises six different non-linear feedback registers arranged in three concatenated pairs.

10. The engine according to claim 9 wherein, for each of the three pairs, an output of the pair of non-linear feedback registers is rotated, thereby to form an image of the output which is recombined with said output of the pair of non-linear feedback registers, thereby to generate three tiers, each comprising a respective one of the three concatenated pairs of non-linear feedback registers.

11. The engine according to claim 10 wherein an output of said three tiers is combined in a 2-of-3 majority combiner.

12. The engine according to claim 1 and also comprising a message counter generating a binary output which is XOR-summed to at least one of said first and second feedback streams.

13. A pair of interacting first and second engines according to claim 1, wherein at least one of the first and second feedback streams is swapped between the first and second interacting engines such that at least one feedback stream entering at least one of the register arrays in the first engine is generated by the second engine whereas at least one feedback stream entering at least one of the register arrays in the second engine is generated by the first engine.

14. The engine according to claim 1 further comprising a sequence of interacting engines, wherein at least one feedback stream entering at least one of the register arrays in each engine in the sequence is generated by the previous engine in the sequence and wherein at least one feedback stream entering at least one of the register arrays in the first engine in the sequence is generated by the last engine in the sequence.

15. The engine according to claim 1 wherein said at least one 1-way functionality in said pseudo-randomizing function of the engine comprises a stream cipher function.

16. The engine according to claim 15 wherein said feedback word stream generators receive inputs from said stream cipher functionality and are independent of the incoming stream of message words.

17. An engine according to claim 1 and also comprising clock apparatus which randomly regulates at least one of said register arrays, said randomizing functionality, and said feedback stream generators, thereby to provide True Randomness.

18. The engine of claim 1 wherein the engine is a personal computer processor, a workstation, a programmable computing device, or combinations thereof.

19. A data hashing method which is carried out by a semi-conductor circuit, said circuit being adapted to perform said method which hashes an incoming string of message words, thereby to generate a hash value tag comprising a deterministic random number string which uniquely identifies said incoming string of message words, the method comprising:
  providing at least one 1-way functionality in a pseudo-randomizing function section of the semi-conductor circuit; and
  using a set of at least first and second orthogonal feedback word stream generators to generate a set of at least first and second orthogonal feedback streams of message words respectively, including applying respective permutations to the incoming string of message words, wherein said first and second feedback streams are combined into first and second register arrays, in the section of the semi-conductor circuit, respectively;
  wherein said at least pseudo-randomizing function section accepts input from the register arrays and generates at least pseudo-random output which, in combination with a present word in the incoming string, is provided to said stream generators; and
  wherein said orthogonal feedback streams are characterized in that every possible modified incoming string of message words which differs by at least a single word from an original incoming string of message words has at least one of the following two characteristics (a) and (b):
    (a) the modified incoming string causes a corrupting first feedback stream generated by applying a permutation to said modified incoming string, when combined into said first register array, to corrupt said first register array, relative to the same first register array into which a non-corrupting first feedback stream, generated by applying said permutation to said original incoming string, has been combined; and/or
    (b) the modified incoming string includes at least one reconciling word which enables the modified incoming string, when permuted to form one first feedback stream which is combined into said first register array, to reconcile said first register array relative to the same first register array into which a modified first feedback stream, formed by permuting said original incoming string of message words, has been combined, however said at least one reconciling word in said modified incoming string of message words causes a corrupting second feedback stream generated by applying a permutation to said modified incoming string, when combined into said second register array, to corrupt said second register array, relative to the same second register array into which a non-corrupting second feedback stream, generated by applying said permutation to said original incoming string, has been combined.

20. The method of claim 19 wherein the semi-conductor circuit is a personal computer processor, a workstation, a programmable computing device, or combinations thereof.

21. A data hashing method which is carried out by a semi-conductor circuit, said circuit being adapted to perform said method which hashes an incoming string of message words, thereby to generate a hash value tag comprising a deterministic random number string which uniquely identifies said incoming string of message words, the method comprising:
  providing at least one 1-way functionality in a pseudo-randomizing function section of the semi-conductor circuit; and
  using a set of at least first and second orthogonal feedback word stream generators to generate a set of at least first and second orthogonal feedback streams of message words respectively, including applying respective permutations to the incoming string of message words, wherein said first and second feedback streams are combined into first and second register arrays, in the semi-conductor circuit, respectively,
  wherein said at least pseudo-randomizing functionality section accepts input from the register arrays and generates at least pseudo-random output which, in combination with a present word in the incoming string, is provided to said stream generators; and
  wherein said first feedback stream is a first function of a present word in said incoming stream and wherein said second feedback stream is a second function of the present word, and of a previous word, in said incoming stream.

22. The method of claim 21 wherein the semi-conductor circuits a personal computer processor, a workstation, a programmable computing device, or combinations thereof.

23. A semi-conductor based data hashing circuit operative to hash an incoming string of message words, thereby to generate a hash value tag comprising a deterministic random number string which uniquely identifies said incoming string of message words, the circuit comprising:
  at least first and second register arrays in a section of the circuit;
  at least one 1-way functionality in a pseudo-randomizing function section of the circuit; and
  a set of at least first and second orthogonal feedback word stream generators operative to generate a set of at least first and second orthogonal feedback streams of message words respectively, including applying respective permutations to the incoming string of message words, wherein said first and second feedback streams are combined into the first and second register arrays respectively;
  wherein said at least pseudo-randomizing function section accepts input from the register arrays and generates at least pseudo-random output which, in combination with a present word in the incoming string, is provided to said stream generators; and
  wherein said first feedback stream is a first function of a present word in said incoming stream and wherein said second feedback stream is a second function of the present word, and of a previous word, in said incoming stream.

24. The circuitry of claim 23 wherein the semi-conductor circuit is a personal computer processor, a workstation, a programmable computing device, or combinations thereof.

* * * * *